United States Patent
Hirotsune et al.

(10) Patent No.: US 7,570,575 B2
(45) Date of Patent: *Aug. 4, 2009

(54) INFORMATION RECORDING MEDIA, A METHOD FOR RECORDING/REPRODUCING INFORMATION, AN APPARATUS FOR RECORDING/REPRODUCING INFORMATION

(75) Inventors: Akemi Hirotsune, Urawa (JP); Harukazu Miyamoto, Higashimurayama (JP); Takeshi Maeda, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/046,064

(22) Filed: Mar. 11, 2008

(65) Prior Publication Data

US 2008/0159100 A1    Jul. 3, 2008

Related U.S. Application Data

(63) Continuation of application No. 11/439,337, filed on May 24, 2006, now Pat. No. 7,391,710, which is a continuation of application No. 10/921,325, filed on Aug. 19, 2004, now Pat. No. 7,072,283, which is a continuation of application No. 09/931,762, filed on Aug. 20, 2001, now Pat. No. 6,856,589.

(30) Foreign Application Priority Data

Oct. 10, 2000    (JP)    ............................. 2000-309746

(51) Int. Cl.
    *G11B 7/24*    (2006.01)

(52) U.S. Cl. ................................ 369/275.4; 369/275.3
(58) Field of Classification Search ............. 369/53.17, 369/275.1–275.5, 47.27, 47.28, 53.2, 44.13, 369/44.36, 47.22, 53.41, 47.31, 53.11, 279, 369/277

See application file for complete search history.

(56) References Cited

U.S. PATENT DOCUMENTS

| | | | |
|---|---|---|---|
| 5,835,478 A | 11/1998 | Kobayashi et al. | |
| 6,097,695 A | 8/2000 | Kobayashi | |
| 6,128,273 A | 10/2000 | Horie et al. | |
| 6,201,778 B1 | 3/2001 | Sensyu | |
| 6,233,219 B1 | 5/2001 | Hori et al. | |
| 6,434,095 B1 * | 8/2002 | Nishiuchi et al. | 369/44.27 |
| 6,603,729 B1 | 8/2003 | Van Den Enden | |
| 6,714,508 B1 | 3/2004 | Spruit et al. | |
| 6,856,589 B2 | 2/2005 | Hirotsune | |
| 7,072,283 B2 | 7/2006 | Hirotsune | |
| 2002/0150032 A1 | 10/2002 | Nishiuchi et al. | |
| 2004/0095876 A1 | 5/2004 | Abe | |

FOREIGN PATENT DOCUMENTS

| | | |
|---|---|---|
| JP | 61-210541 | 9/1986 |
| JP | 5-101398 | 4/1993 |

* cited by examiner

*Primary Examiner*—Ali Neyzari
(74) *Attorney, Agent, or Firm*—Antonelli, Terry, Stout & Kraus, LLP.

(57) ABSTRACT

An information recording medium including a plurality of layers for recording or reproduction of information by irradiation of light and information for identifying a tracking error signal for determining a layer number being recorded in each of the plurality of layers. A modulation of the tracking error signal is different in each of the plurality of layers.

4 Claims, 46 Drawing Sheets

- 20 (protective substrate)
- 19 (L1 reflective layer)
- 18 (L1 upper protective layer)
- 17 (L1 recording film)
- 16 (L1 lower protective layer)
- 15 (spacer layer)
- 14 (L0 upper protective layer)
- 13 (L0 recording film)
- 12 (L0 lower protective layer)
- 11 (substrate)

FIG.4
step 1 (spreading out photoresist)
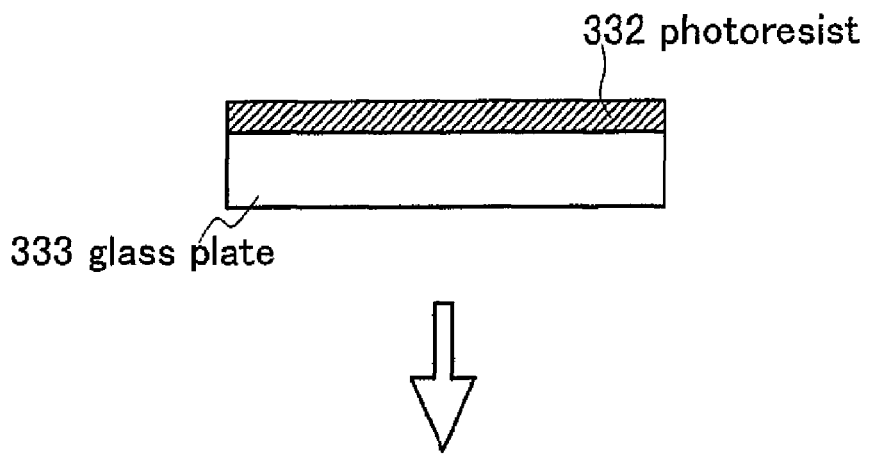
step 2 (exposure)
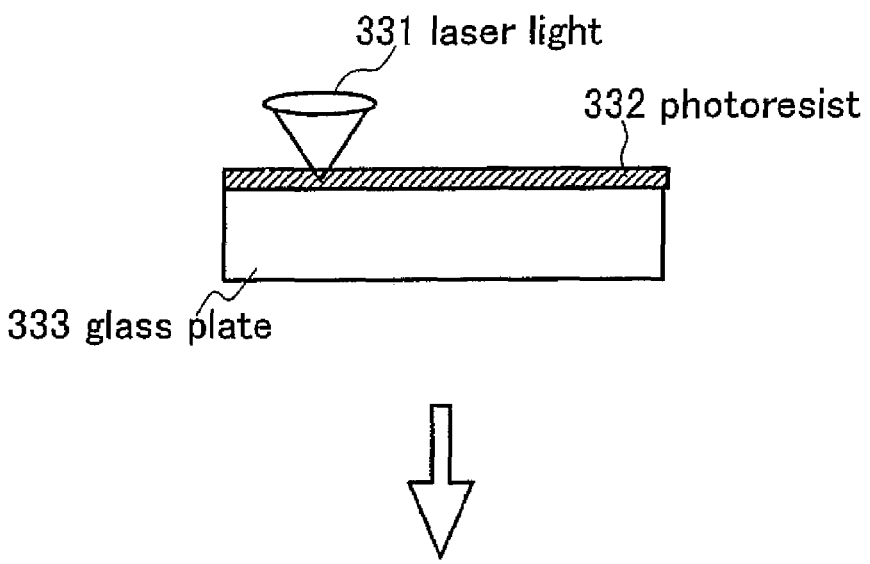
step 3 (development)
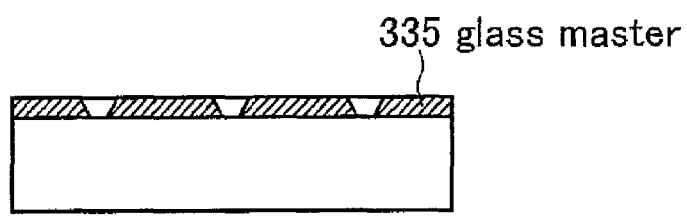

FIG.5
step 4 (stamper)
336 nickel stamper for injection of substrate
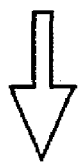
step 5 (injection)
337 substrate
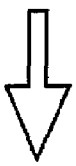
step 6 (remove)
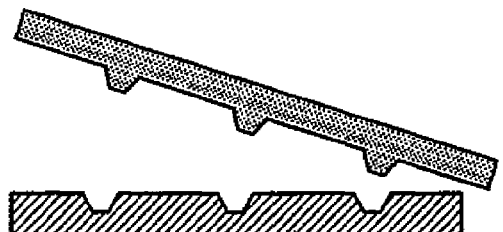
337 substrate

FIG.11
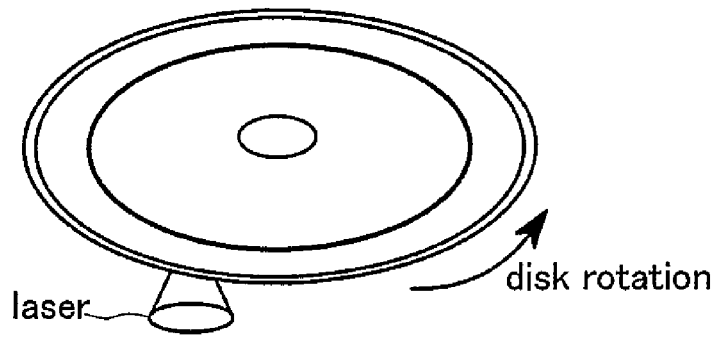
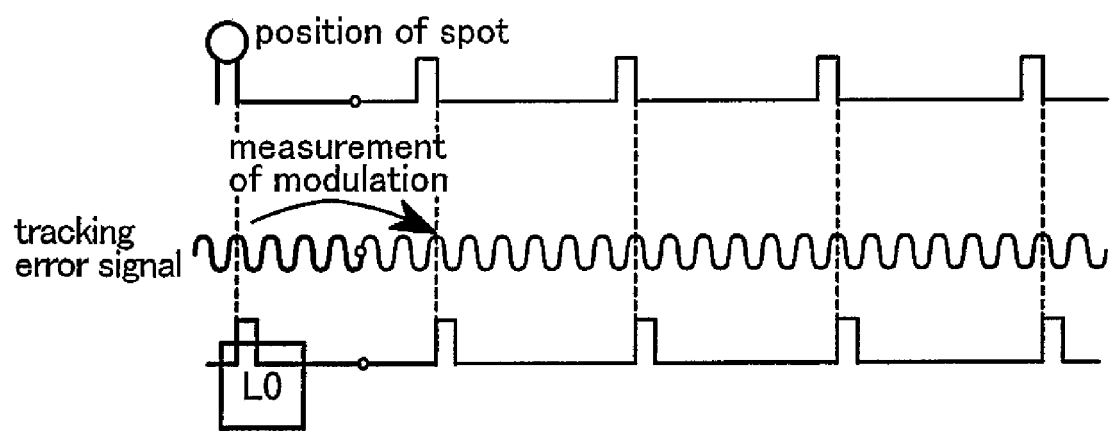
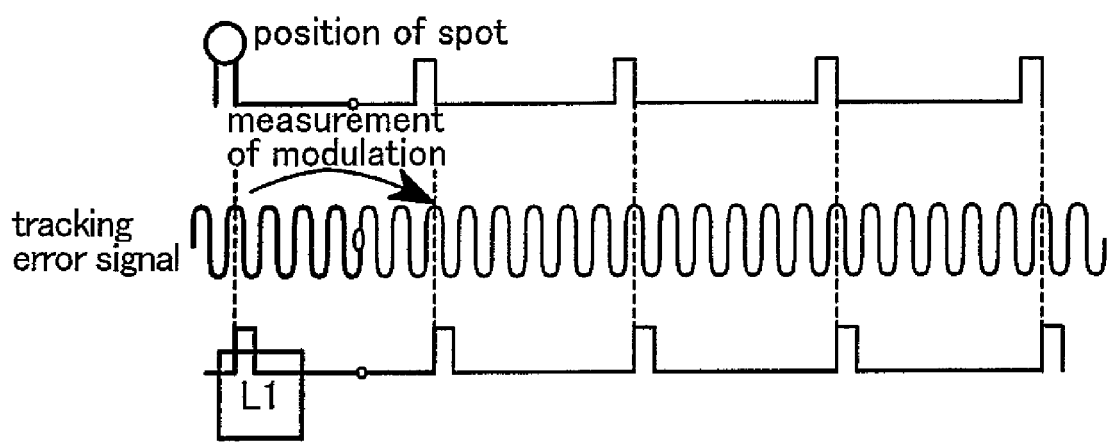

FIG.20
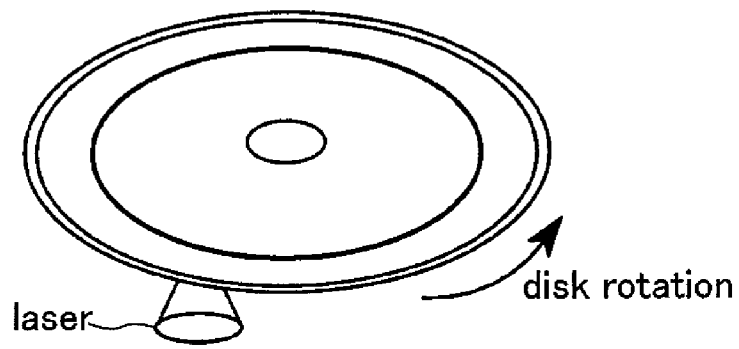
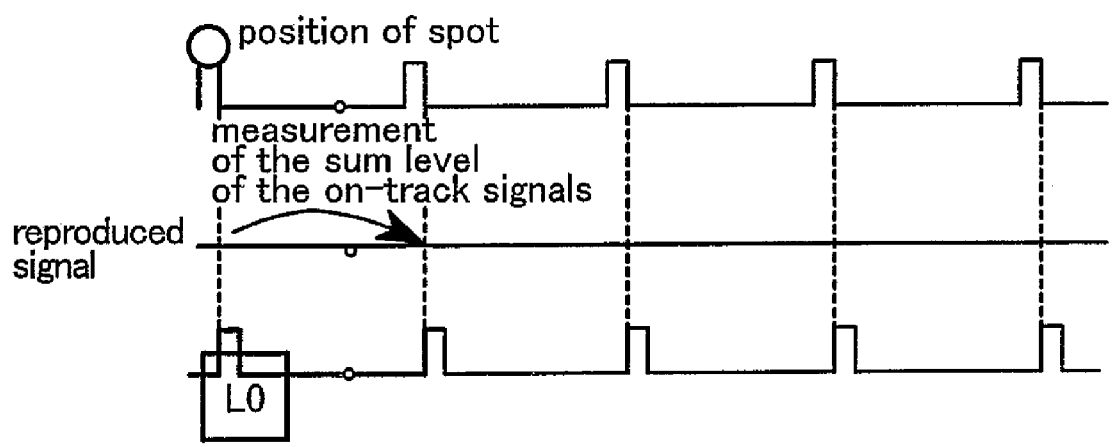
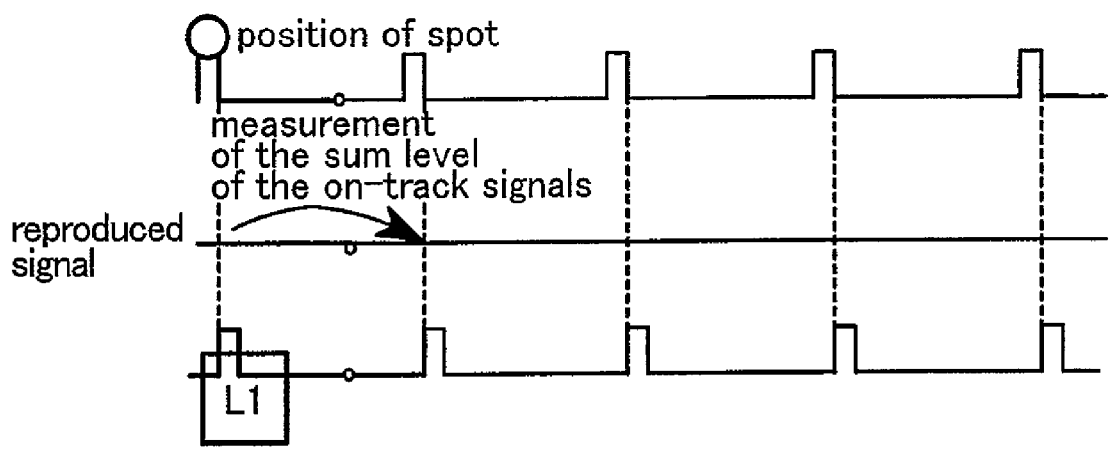

FIG.22
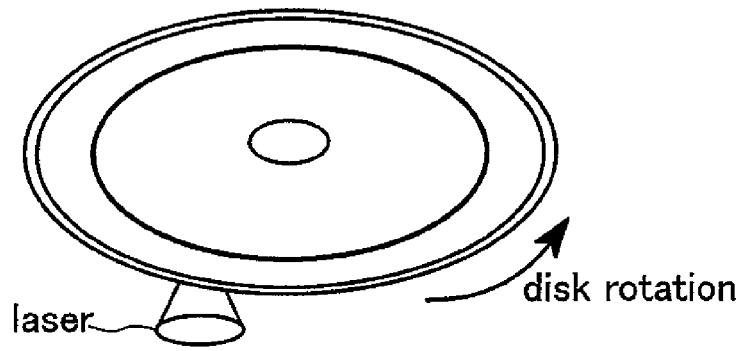
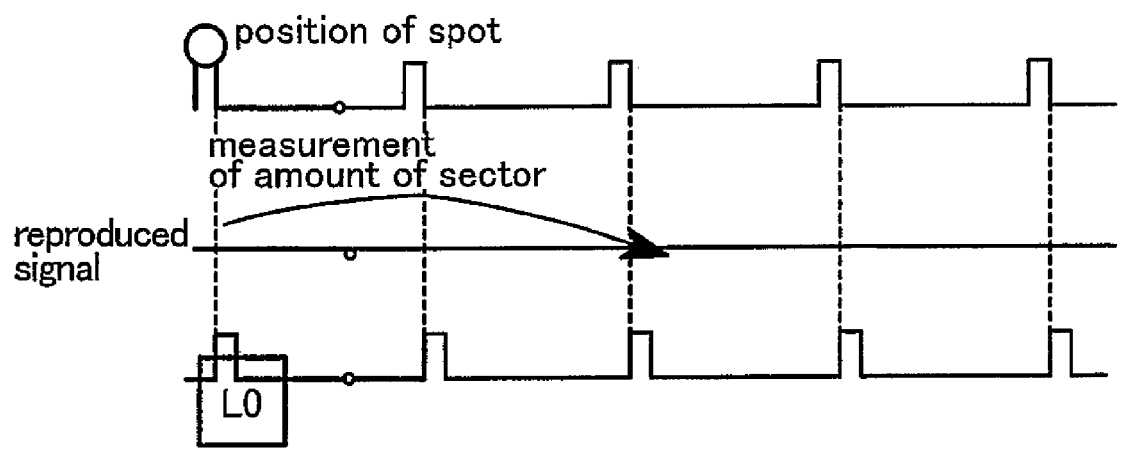
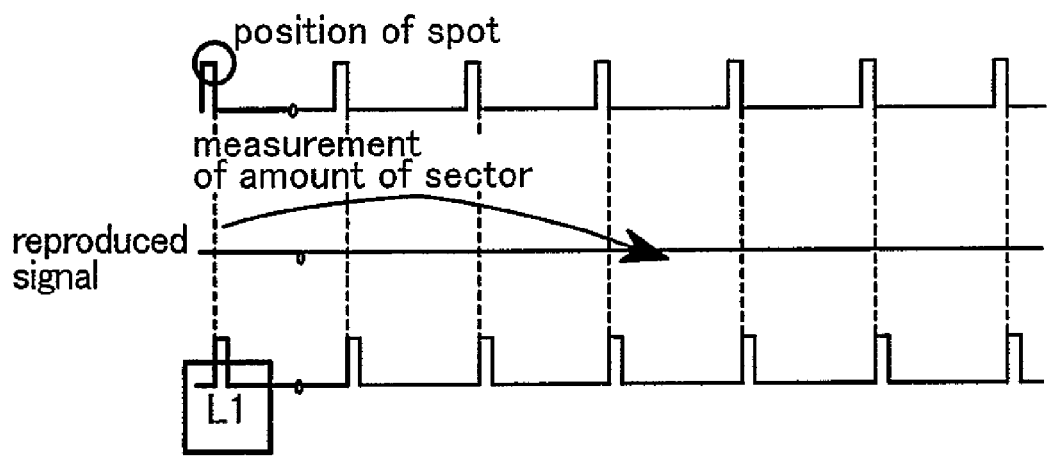

FIG.25
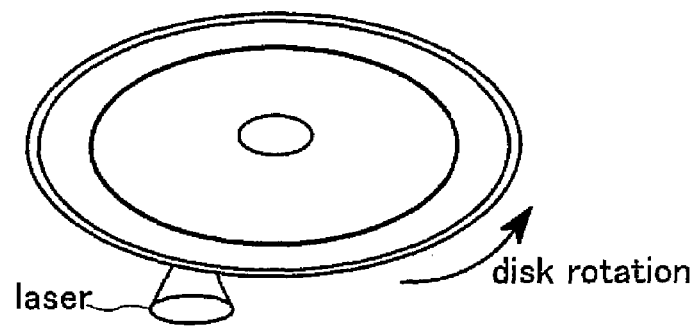
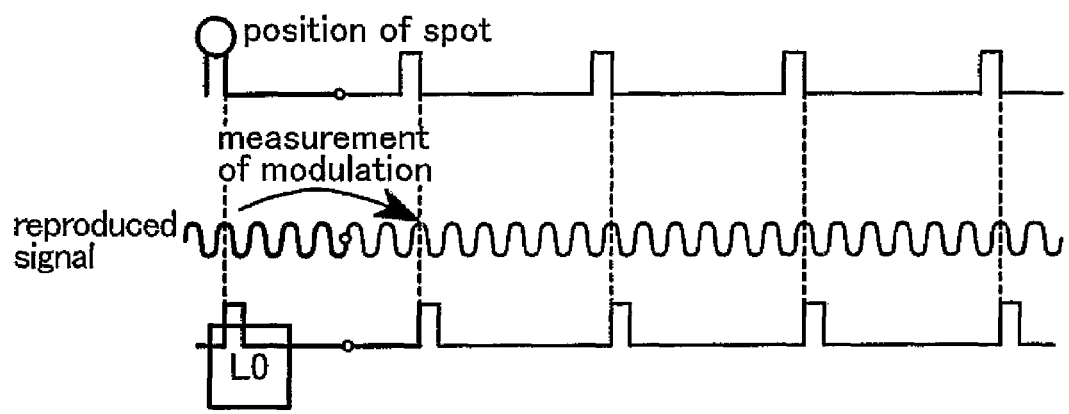
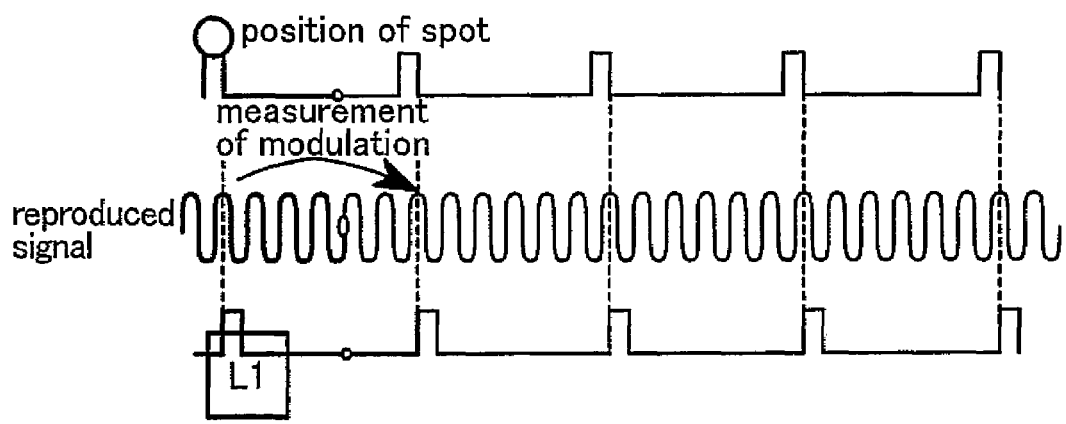

FIG.35
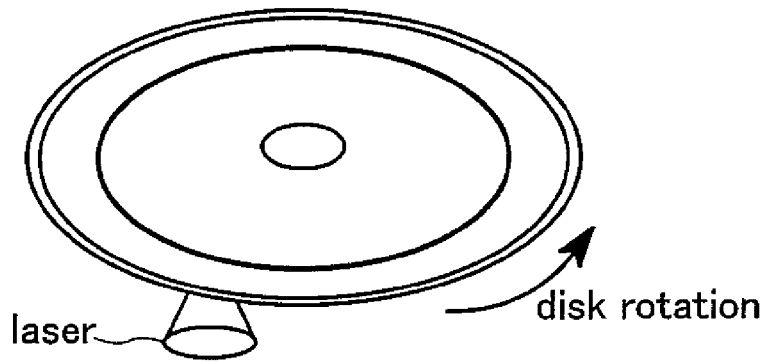
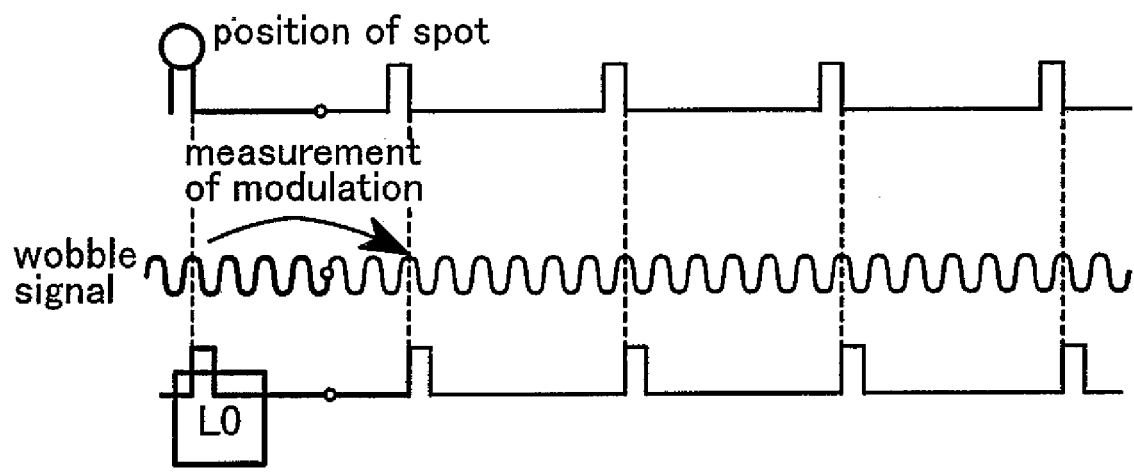
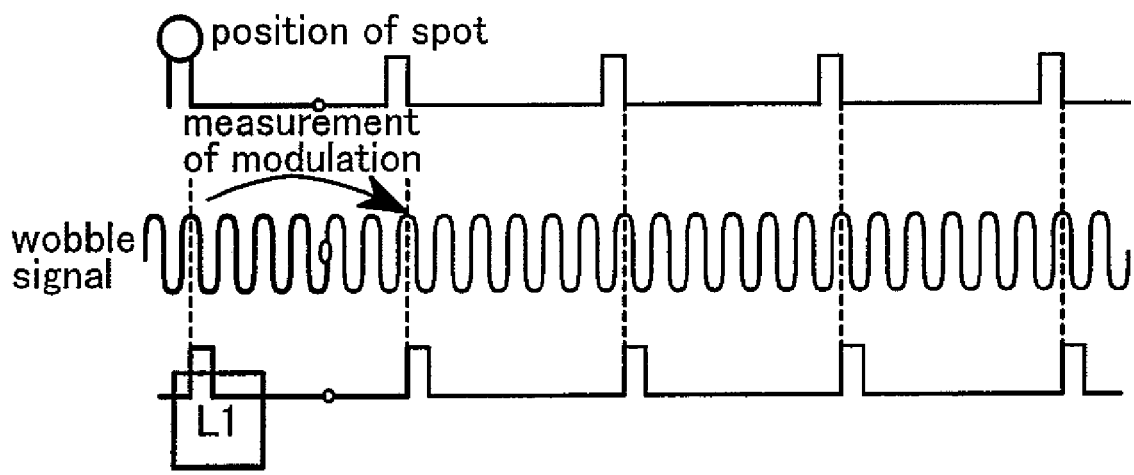

FIG.40
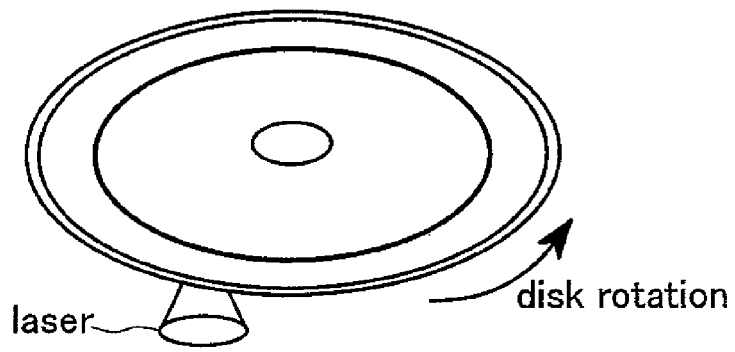
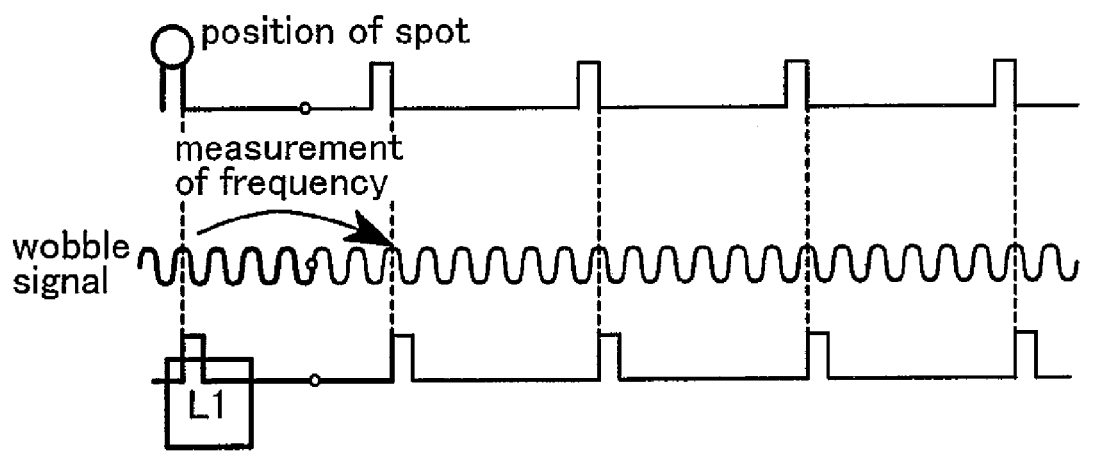
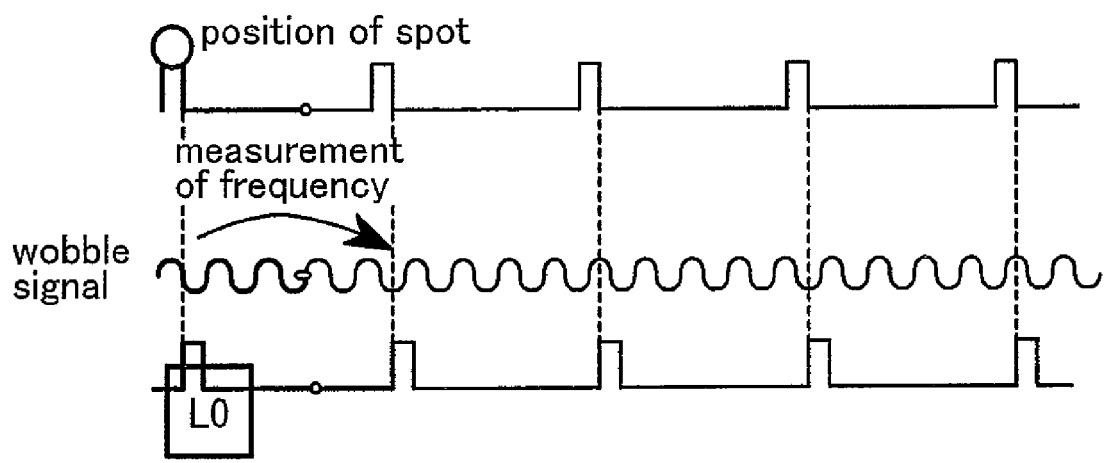

INFORMATION RECORDING MEDIA, A METHOD FOR RECORDING/REPRODUCING INFORMATION, AN APPARATUS FOR RECORDING/REPRODUCING INFORMATION

CROSS REFERENCE TO RELATED APPLICATION

This is a continuation of U.S. Ser. No. 11/439,337, filed May 24, 2006, now U.S. Pat. No. 7,391,710, which is a continuation of U.S. Ser. No. 10/921,325, filed Aug. 19, 2004, now U.S. Pat. No. 7,072,283, which is a continuation of U.S. application Ser. No. 09/931,762, filed Aug. 20, 2001, now U.S. Pat. No. 6,856,589, the subject matter of which is incorporated by reference herein.

BACKGROUND OF THE INVENTION

1. Field of the Invention

The invention relates to a multilayer information recording medium intended for an optical disk, and a method and apparatus for recording/reproducing the multilayer information recording medium.

2. Description of the Prior Art

There have been known a variety of principles for recording information on a thin film (recording film). Of these, ones that utilize changes in atomic arrangements resulting from laser light irradiation, such as a phase change (also referred to as phase transition) and photo darkening, involve little deformation of the thin film. This means an advantage that two disk members can be directly bonded together to obtain an information recording medium of double-sided disk structure, or a multilayer information recording medium having a plurality of information planes.

A document 1 (Japanese Patent Laid-Open Publication No. Hei 5-101398) describes a method of reproducing information from a multilayer information recording medium, in which a reproducing head is moved to a constant distance from the information plane to reproduce. In this method, a deviation in the amount of movement of the head can preclude precise focusing on the information plane, making the accurate reproduction of information difficult.

For multilayer ROM disks, as described in a document 2 (DVD Specifications for Read-Only Disc), there has been used a method of recording layer numbers, or address information, to pits formed on the respective information planes, and reproducing the same. In this method, each layer is put under focus and then tracked to reproduce the address information, which is subjected to signal processing before the layer number can be determined. As a result, it takes much time before information is reproduced with accuracy.

As employed in this specification document, an optical disk refers to a disk on which information reproducible through light irradiation is recorded, and/or an apparatus for reproducing information through light irradiation.

In conventional multilayer information recording media, it is hard to accurately determine an information plane for reproduction. Moreover, in the method intended for multilayer ROM, in which each layer is put under focus and then tracked to reproduce address information and the address information is subjected to signal processing before the layer number is determined, it takes much time before information is reproduced with accuracy.

SUMMARY OF THE INVENTION

In view of the foregoing, it is an object of the present invention to provide a multilayer information recording medium having a plurality of information planes, and a method and apparatus for recording/reproducing the multilayer information recording medium, wherein which information plane is irradiated with light can be quickly determined to record/reproduce information with accuracy.

The foregoing object of the present invention has been achieved by the provision of the following means:

(1) An information recording medium comprising a plurality of layers to be irradiated with light for information recording/reproduction, the plurality of layers each having asperities made of continuous or discontinuous grooves, the information recording medium including at least two types of layers on which the asperities have different shapes or the grooves constituting the asperities make different changes in their longitudinal directions.

(2) The information recording medium set forth in (1), wherein the layers are layers for multi-valued recording.

(3) The information recording medium set forth in (1) or (2), including at least two layers having the asperities of different depths and/or widths.

(4) The information recording medium set forth in (3), wherein a layer or layers farther from a light incident side is/are greater than a layer or layers closer to the light incident side in the depth and/or width of the asperities.

(5) The information recording medium set forth in (1) or (2), the asperities being meandered or deformed at predetermined modulations in the longitudinal directions of the grooves, the information recording medium including at least two types of layers differing from each other in the modulation of the meandering or deformation.

(6) The information recording medium set forth in (5), wherein a layer or layers farther from a light incident side is/are greater than a layer or layers closer to the light incident side in the modulation of the meandering or deformation.

(7) The information recording medium set forth in (1) or (2), the asperities being meandered or deformed at predetermined modulations in the longitudinal directions of the grooves, the information recording medium including at least two types of layers differing from each other in the period of the meandering or deformation.

(8) The information recording medium set forth in (7), wherein a layer or layers farther from a light incident side is/are smaller than a layer or layers closer to the light incident side in the period of the meandering or deformation.

(9) An information recording medium having a plurality of layers to be irradiated with light for information recording/reproduction, the plurality of layers being divided into respective predetermined numbers of sectors, the information recording medium including at least two types of layers having different numbers of the sectors.

(10) An information recording medium having a plurality of layers to be irradiated with light for information recording/reproduction, the plurality of layers being divided into respective predetermined numbers of sectors, the information recording medium including at least two types of layers having the sectors of different lengths.

(11) The information recording medium set forth in (10), wherein a layer or layers farther from a light incident side is/are smaller than a layer or layers closer to the light incident side in the length of the sectors.

(12) The information recording medium set forth in (10), wherein a layer or layers farther from a light incident side is/are greater than a layer or layers closer to the light incident side in the number of the sectors.

(13) An information recording medium having a plurality of layers to be irradiated with light for information recording/reproduction, the plurality of layers being divided into respective predetermined numbers of sectors, the sectors each having at least a pit area and a data area, the information recording medium including at least two types of layers having different ratios between the modulations of reproduced signals at the pit area and the data area.

(14) The information recording medium set forth in (13), wherein a layer or layers farther from a light incident side is/are greater than a layer or layers closer to the light incident side in the ratio between the modulations of reproduced signals at the pit area and the data area.

The ratio between the modulations of reproduced signals at the pit area and the data area is (the modulation of a reproduced signal at a data area)/(the modulation of a reproduced signal at a pit area).

(15) An information recording medium comprising a first layer for generating a tracking error signal of a first modulation and a second layer for generating a tracking error signal of a second modulation when irradiated with light in operation, the second modulation being different from the first modulation.

(16) An information recording medium comprising a first layer for generating a data area reproduced signal of a first modulation and a second layer for generating a data area reproduced signal of a second modulation when irradiated with light in operation, the second modulation being different from the first modulation.

(17) An information recording medium comprising a first layer for generating a wobble signal of a first modulation and a second layer for generating a wobble signal of a second modulation when irradiated with light in operation, the second modulation being different from the first modulation.

(18) An information recording medium comprising a first layer for generating a pit area reproduced signal of a first frequency and a second layer for generating a pit area reproduced signal of a second frequency when irradiated with light in operation, the second frequency being different from the first frequency.

(19) An information recording medium comprising a first layer for generating a wobble signal of a first frequency and a second layer for generating a wobble signal of a second frequency when irradiated with light in operation, the second frequency being different from the first frequency.

(20) An information recording medium comprising a first layer for generating a first sum level of signals and a second layer for generating a second sum level of signals when irradiated with light in operation, the second sum level being different from the first sum level.

(21) An information recording medium comprising a first layer for generating a sector detection signal at first time intervals and a second layer for generating a sector detection signal at second time intervals when irradiated with light in operation, the second time intervals being different from the first time intervals.

(22) An information recording medium comprising a first layer for generating a first number of sector number detection signals and a second layer for generating a second number of sector number detection signals within a predetermined time when irradiated with light in operation, the second number being different from the first number.

(23) A method for recording information by irradiating with light a recording track on an information recording medium having a plurality of layers to be irradiated with light for information recording, the method comprising the step of identifying a layer to record information on by the modulation of a tracking error signal generated in tracking the recording track.

Each layer has asperities made of continuous or discontinuous grooves. A tracking error signal of a predetermined modulation is generated from these asperities.

(24) A method for recording information by irradiating with light a recording track on an information recording medium having a plurality of layers to be irradiated with light for information recording, the method comprising the step of identifying a layer to record information on by the sum levels of signals reproduced from the layers.

(25) A method for recording information by irradiating with light a recording track on an information recording medium having a plurality of layers to be irradiated with light for information recording, the layers being divided into respective predetermined numbers of sectors, the method comprising the step of identifying a layer to record information on by the time between the detection of one sector and the detection of the next sector.

(26) A method for recording information by irradiating with light a recording track on an information recording medium having a plurality of layers to be irradiated with light for information recording, the layers being divided into respective predetermined numbers of sectors, the method comprising the step of identifying a layer to record information on by the number of sectors detected within a predetermined time.

(27) A method for recording information by irradiating with light a recording track on an information recording medium having a plurality of layers to be irradiated with light for information recording, the method comprising the step of identifying a layer to record information on by the modulations of reproduced signals from the layers.

(28) A method for recording information by irradiating with light a recording track on an information recording medium having a plurality of layers to be irradiated with light for information recording, the plurality of layers being divided into respective predetermined numbers of sectors, the sectors each having at least a pit area and a data area, the method comprising the step of identifying a layer to record information on by the ratio between the modulations of reproduced signals at the pit area and the data area.

(29) A method for recording information by irradiating with light a recording track on an information recording medium having a plurality of layers to be irradiated with light for information recording, the layers having recording tracks with asperities made of continuous or discontinuous grooves, the asperities being meandered or deformed at predetermined modulations in the longitudinal directions of the grooves, the method comprising the step of identifying a layer to record information on by the modulation of signals resulting from the meandering or deformation.

(30) A method for recording information by irradiating with light a recording track on an information recording medium having a plurality of layers to be irradiated with light for information recording, the layers having recording tracks with asperities made of continuous or discontinuous grooves, the asperities being meandered or deformed in the longitudinal directions of the grooves at periods predetermined layer by layer, the method comprising the step of identifying a layer to record information on by the frequency of signals resulting from the meandering or deformation.

(31) A method for reproducing information by irradiating with light a recording track on an information recording medium having a plurality of layers to be irradiated with light for information reproduction, the method comprising the step of identifying a layer to reproduce information from by the modulation of a tracking error signal generated in tracking the recording track.

Each layer has asperities made of continuous or discontinuous grooves. A tracking error signal of a predetermined modulation is generated from these asperities.

(32) A method for reproducing information by irradiating with light a recording track on an information recording medium having a plurality of layers to be irradiated with light for information reproduction, the method comprising the step of identifying a layer to reproduce information from by the sum levels of signals reproduced from the layers.

(33) A method for reproducing information by irradiating with light a recording track on an information recording medium having a plurality of layers to be irradiated with light for information reproduction, the layers being divided into respective predetermined numbers of sectors, the method including the step of identifying a layer to reproduce information from by the time between the detection of one sector and the detection of the next sector.

(34) A method for reproducing information by irradiating with light a recording track on an information recording medium having a plurality of layers to be irradiated with light for information reproduction, the layers being divided into respective predetermined numbers of sectors, the method comprising the step of identifying a layer to reproduce information from by the number of sectors detected within a predetermined time.

(35) A method for reproducing information by irradiating with light a recording track on an information recording medium having a plurality of layers to be irradiated with light for information reproduction, the method comprising the step of identifying a layer to reproduce information from by the modulations of reproduced signals from the layers.

(36) A method for reproducing information by irradiating with light a recording track on an information recording medium having a plurality of layers to be irradiated with light for information reproduction, the plurality of layers being divided into respective predetermined numbers of sectors, the sectors each having at least a pit area and a data area, the method comprising the step of identifying a layer to reproduce information from by the ratio between the modulations of reproduced signals at the pit area and the data area.

(37) A method for reproducing information by irradiating with light a recording track on an information recording medium having a plurality of layers to be irradiated with light for information reproduction, the layers having recording tracks with asperities made of continuous or discontinuous grooves, the asperities being meandered or deformed in the longitudinal directions of the grooves at modulations predetermined layer by layer, the method comprising the step of identifying a layer to reproduce information from by the modulation of signals resulting from the meandering or deformation.

(38) A method for reproducing information by irradiating with light a recording track on an information recording medium having a plurality of layers to be irradiated with light for information reproduction, the layers having recording tracks with asperities made of continuous or discontinuous grooves, the asperities being meandered or deformed in the longitudinal directions of the grooves at periods predetermined layer by layer, the method comprising the step of identifying a layer to reproduce information from by the frequency of signals resulting from the meandering or deformation.

(39) An apparatus for recording information for recording information by irradiating with light a recording track on an information recording medium having a plurality of layers to be irradiated with light for information recording, the apparatus comprising: light irradiation means for irradiating the information recording medium with light; light detecting means for detecting light reflected from the information recording medium; tracking error signal modulation detecting means for detecting the modulation of a tracking error signal for tracking the recording track by using a detection signal from the light detection means; and layer judging means for judging a layer under tracking based on the modulation detected by the tracking error signal modulation detecting means.

(40) An apparatus for recording information for recording information by irradiating with light a recording track on an information recording medium having a plurality of layers to be irradiated with light for information recording, the apparatus comprising: light irradiation means for irradiating the information recording medium with light; light detecting means for detecting light reflected from the information recording medium; and layer judging means for judging a layer based on the sum level of light detected by the light detecting means.

(41) An apparatus for recording information for recording information by irradiating with light a recording track on an information recording medium having a plurality of layers to be irradiated with light for information recording, the layers of the information recording medium being divided into respective predetermined numbers of sectors, the apparatus comprising: light irradiation means for irradiating the information recording medium with light; light detecting means for detecting light reflected from the information recording medium; time measuring means for measuring the time between the detection of one sector and the detection of the next sector by using a detection signal from the light detecting means; and layer judging means for judging a layer based on the time detected by the time detecting means.

(42) An apparatus for recording information for recording information by irradiating with light a recording track on an information recording medium having a plurality of layers to be irradiated with light for information recording, the layers of the information recording medium being divided into respective predetermined numbers of sectors, the apparatus comprising: light irradiation means for irradiating the information recording medium with light; light detecting means for detecting light reflected from the information recording medium; sector number detecting means for detecting the number of sectors detected within a predetermined time by using a detection signal from the light detecting means; and layer judging means for judging a layer based on the number of sectors detected by the sector number detecting means.

(43) An apparatus for recording information for recording information by irradiating with light a recording track on an information recording medium having a plurality of layers to be irradiated with light for information recording, the apparatus comprising: light irradiation means for irradiating the information recording medium with light; light detecting means for detecting light reflected from the information recording medium; signal modulation detecting means for detecting the modulation of a reproduced signal detected by the light detecting means; and layer judging means for judging a layer based on the modulation detected by the signal modulation detecting means.

(44) An apparatus for recording information for recording information by irradiating with light a recording track on an information recording medium having a plurality of layers to be irradiated with light for information recording, the layers of the information recording medium being divided into predetermined numbers of sectors, the sectors each having at least a pit area and a data area, the apparatus comprising: light irradiation means for irradiating the information recording medium with light; light detecting means for detecting light reflected from the information recording medium; signal modulation ratio detecting means for detecting the ratio between the modulations of reproduced signals at the pit area and the data area by using a detection signal from the light detecting means; and layer judging means for judging a layer based on the value of the ratio detected by the signal modulation ratio detecting means.

(45) An apparatus for recording information for recording information by irradiating with light a recording track on an information recording medium having a plurality of layers to be irradiated with light for information recording, the layers having recording tracks with asperities made of continuous or discontinuous grooves, the asperities being meandered or deformed in the longitudinal directions of the grooves at modulations predetermined layer by layer, the apparatus comprising: light irradiation means for irradiating the information recording medium with light; light detecting means for detecting light reflected from the information recording medium; wobble modulation detecting means for detecting a wobble modulation out of a detection signal from the light detecting means; and layer judging means for judging a layer based on the wobble modulation detected by the wobble modulation detecting means.

(46) An apparatus for recording information for recording information by irradiating with light a recording track on an information recording medium having a plurality of layers to be irradiated with light for information recording, the layers having recording tracks with asperities made of continuous or discontinuous grooves, the asperities being meandered or deformed in the longitudinal directions of the grooves at periods predetermined layer by layer, the apparatus comprising; light irradiation means for irradiating the information recording medium with light; light detecting means for detecting light reflected from the information recording medium; wobble frequency detecting means for detecting a wobble frequency out of a detection signal from the light detecting means; and layer judging means for judging a layer based on the wobble frequency detected by the wobble frequency detecting means.

(47) An apparatus for reproducing information for reproducing information by irradiating with light a recording track on an information recording medium having a plurality of layers to be irradiated with light for information reproduction, the apparatus comprising: light irradiation means for irradiating the information recording medium with light; light detecting means for detecting light reflected from the information recording medium; tracking error signal modulation detecting means for detecting the modulation of a tracking error signal for tracking the recording track by using a detection signal from the light detection means; and layer judging means for judging a layer under tracking based on the modulation detected by the tracking error signal modulation detecting means.

(48) An apparatus for reproducing information for reproducing information by irradiating with light a recording track on an information recording medium having a plurality of layers to be irradiated with light for information reproduction, the apparatus comprising: light irradiation means for irradiating the information recording medium with light; light detecting means for detecting light reflected from the information recording medium; and layer judging means for judging a layer based on the sum level of light detected by the light detecting means.

(49) An apparatus for reproducing information for reproducing information by irradiating with light a recording track on an information recording medium having a plurality of layers to be irradiated with light for information reproduction, the layers of the information recording medium being divided into respective predetermined numbers of sectors, the apparatus comprising: light irradiation means for irradiating the information recording medium with light; light detecting means for detecting light reflected from the information recording medium; time measuring means for measuring the time between the detection of one sector and the detection of the next sector by using a detection signal from the light detecting means; and layer judging means for judging a layer based on the time detected by the time detecting means.

(50) An apparatus for reproducing information for reproducing information by irradiating with light a recording track on an information recording medium having a plurality of layers to be irradiated with light for information reproduction, the layers of the information recording medium being divided into respective predetermined numbers of sectors, the apparatus comprising: light irradiation means for irradiating the information recording medium with light; light detecting means for detecting light reflected from the information recording medium; sector number detecting means for detecting the number of sectors detected within a predetermined time by using a detection signal from the light detecting means; and layer judging means for judging a layer based on the number of sectors detected by the sector number detecting means.

(51) An apparatus for reproducing information for reproducing information by irradiating with light a recording track on an information recording medium having a plurality of layers to be irradiated with light for information reproduction, the apparatus comprising: light irradiation means for irradiating the information recording medium with light, light detecting means for detecting light reflected from the information recording medium; signal modulation detecting means for detecting the modulation of a reproduced signal detected by the light detecting means; and layer judging means for judging a layer based on the modulation detected by the signal modulation detecting means.

(52) An apparatus for reproducing information for reproducing information by irradiating with light a recording track on an information recording medium having a plurality of layers to be irradiated with light for information reproduction, the layers of the information recording medium being divided into predetermined numbers of sectors, the sectors each having at least a pit area and a data area, the apparatus comprising: light irradiation means for irradiating the information recording medium with light; light detecting means for detecting light reflected from the information recording medium; signal modulation ratio detecting means for detecting the ratio between reproduced signal modulations between the pit area and the data area by using a detection signal from the light detecting means; and layer judging means for judging a layer based on the value of the ratio detected by the signal modulation ratio detecting means.

(53) An apparatus for reproducing information for reproducing information by irradiating with light a recording track on an information recording medium having a plurality of layers to be irradiated with light for information reproduction, the layers having recording tracks with asperities made of continuous or discontinuous grooves, the asperities being meandered or deformed in the longitudinal directions of the grooves at modulations predetermined layer by layer, the apparatus comprising: light irradiation means for irradiating the information recording medium with light; light detecting means for detecting light reflected from the information recording medium; wobble modulation detecting means for detecting a wobble modulation out of a detection signal from the light detecting means; and layer judging means for judging a layer based on the wobble modulation detected by the wobble modulation detecting means.

(54) An apparatus for reproducing information for reproducing information by irradiating with light a recording track on an information recording medium having a plurality of layers to be irradiated with light for information reproduction, the layers having recording tracks with asperities made of continuous or discontinuous grooves, the asperities being meandered or deformed in the longitudinal directions of the grooves at periods predetermined layer by layer, the apparatus comprising; light irradiation means for irradiating the information recording medium with light; light detecting means for detecting light reflected from the information recording medium; wobble frequency detecting means for detecting a wobble frequency out of a detection signal from the light detecting means; and layer judging means for judging a layer based on the wobble frequency detected by the wobble frequency detecting means.

BRIEF DESCRIPTION OF THE DRAWINGS

These and other objects and advantages of the present invention will become clear from the following description with reference to the accompanying drawings, wherein:

FIG. 4 is a diagram showing the steps for fabricating substrate asperities;

FIG. 5 is a diagram showing the steps for fabricating substrate asperities;

FIG. 11 is a principle diagram showing an example of the method for recording/reproducing an information recording medium according to the present invention;

FIG. 20 is a principle diagram showing another example of the method for recording/reproducing an information recording medium according to the present invention;

FIG. 22 is a principle diagram showing another example of the method for recording/reproducing an information recording medium according to the present invention;

FIG. 25 is a principle diagram showing another example of the method for recording/reproducing an information recording medium according to the present invention;

FIG. 35 is a principle diagram showing another example of the method for recording/reproducing an information recording medium according to the present invention;

FIG. 40 is a principle diagram showing another example of the method for recording/reproducing an information recording medium according to the present invention;

DETAILED DESCRIPTION OF THE PREFERRED EMBODIMENTS

Hereinafter, the present invention will be described in detail in conjunction with preferred embodiments thereof.

Embodiment 1

(Composition and Fabrication Method for Information Recording Medium)

Figure 1:
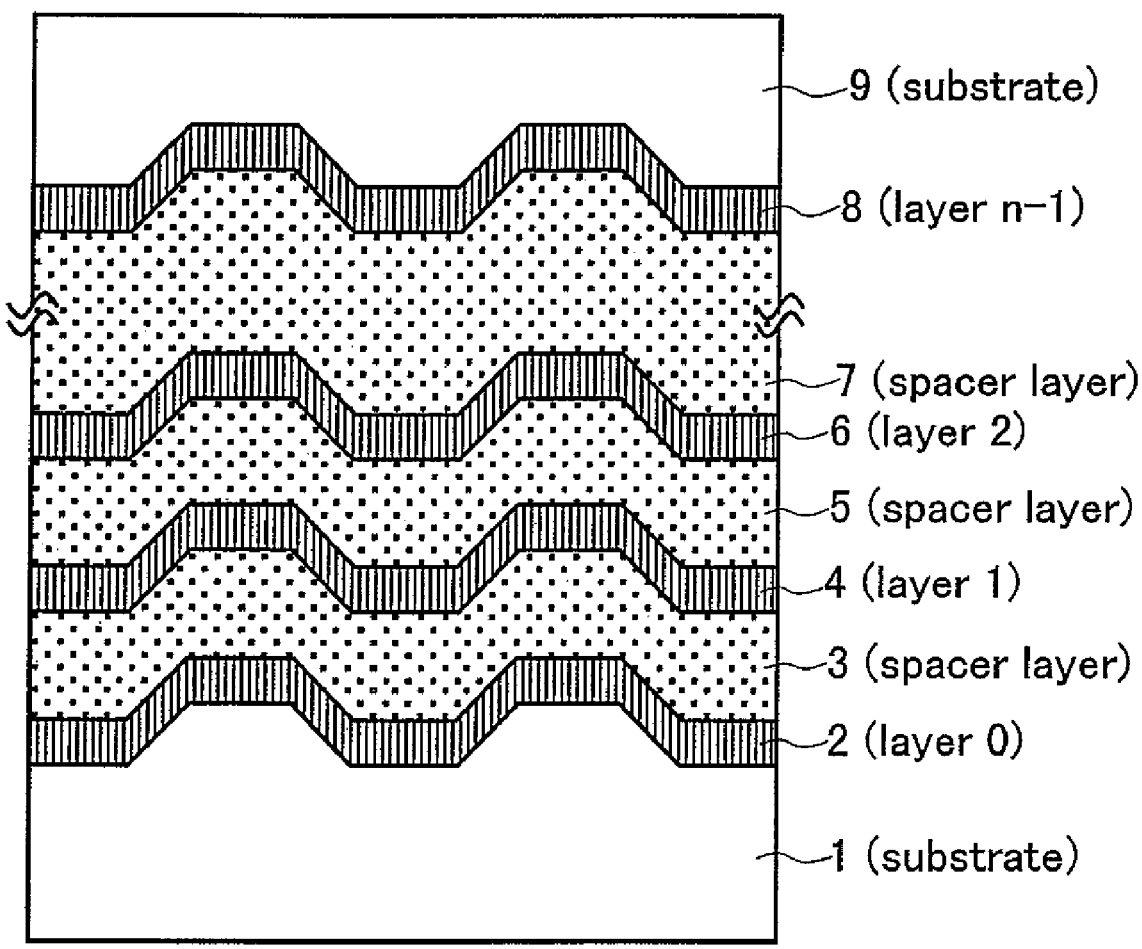
FIG. 1 is a schematic sectional view of an example of the information recording medium according to the present invention.

The present invention relates to a multilayer information recording medium having a plurality of layers consisting of a layer 0 through a layer n−1, or n layers (n is an integer not smaller than 2), as shown in FIG. 1 and to a method for recording/reproducing the same. The light for use in the recording/reproduction comes from the direction of smaller layer numbers, or the layer-0 side.

Figure 2:
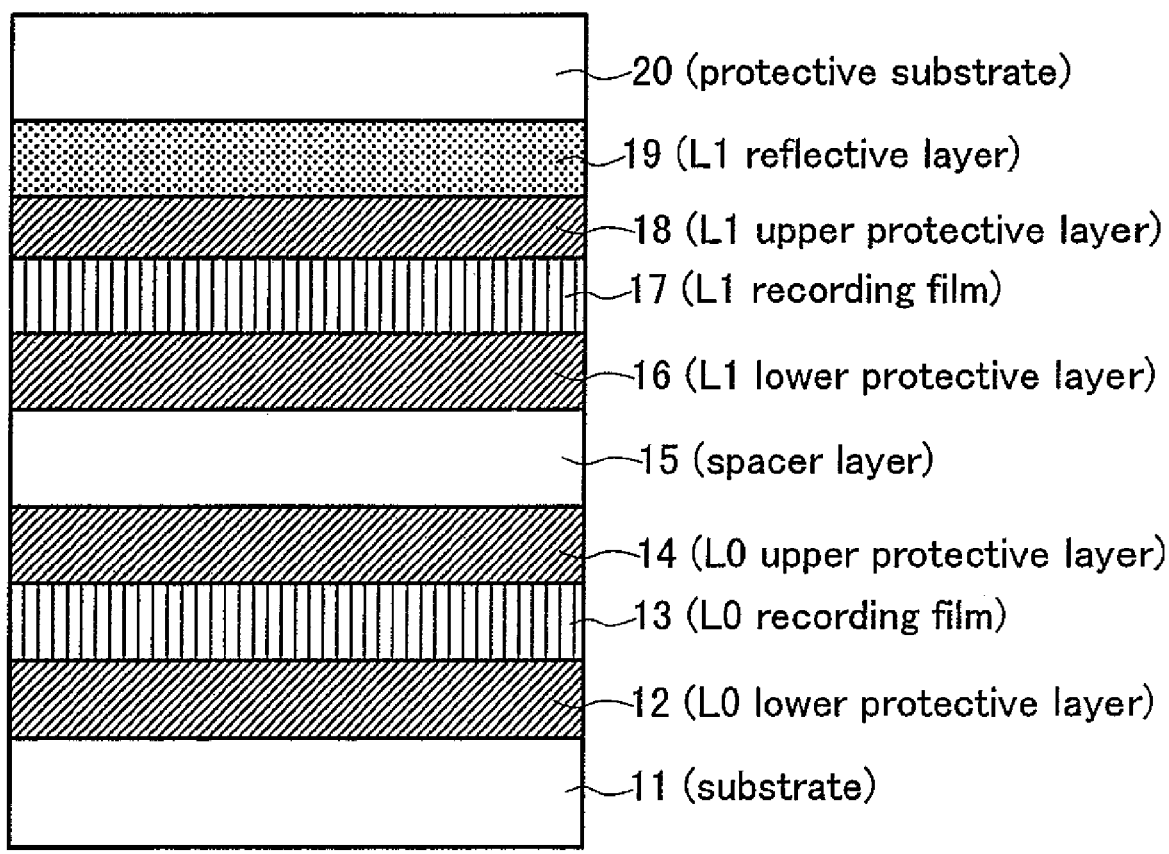
FIG. 2 is a schematic sectional view of an example of the information recording medium according to the present invention.

FIG. 2 is a schematic diagram showing the cross-sectional structure of a disklike information recording medium according to a first embodiment of the present invention for the case of n=2. This medium was fabricated as described below. Initially, an L0 lower protective layer 12, an L0 recording film 13, and an L0 upper protective layer 14 were successively formed on a 12-cm-diameter 0.6-mm-thick polycarbonate substrate 11 which had tracking grooves in its surface. The L0 lower protective layer 12 consisted of a $(ZnS)_{80}(SiO_2)_{20}$ film of approximately 100 nm in thickness, laminated with a $Cr_{40}O_{57}N_3$ film of approximately 5 nm in thickness. The L0 recording film 13 was made of $Ge_5Sb_2Te_8$ in a thickness of approximately 6 nm. The L0 upper protective layer 14 consisted of a $Cr_2O_3$ film of approximately 5 nm in thickness, laminated with a $(ZnS)_{80}(SiO_2)_{20}$ film of approximately 95 nm in thickness. The laminated films were formed in a magnetron sputtering system. Thereby, a first disk member was obtained.

In the meantime, a second disk member having composition different from that of the first disk member was obtained by the same sputtering method. The second disk member was a polycarbonate protective substrate 20 on which an L1 reflective layer 19, an L1 upper protective layer 18, an L1 recording film 17, and an L1 lower protective layer 16 were formed in succession. The L1 reflective layer 19 consisted of an $Ag_{98}Pd_1Cu_1$ film of approximately 80 nm in thickness. The L1 upper protective layer 18 consisted of a $(ZnS)_{80}(SiO_2)_{20}$ film of approximately 80 nm in thickness, laminated with a $Cr_2O_3$ film of approximately 5 nm in thickness. The L1 recording film 17 was made of $Ge_5Sb_2Te_8$ in a thickness of approximately 18 nm. The L1 lower protective layer 16 consisted of a $Cr_{40}O_{57}N_3$ film of approximately 5 nm in thickness, laminated with a $(ZnS)_{80}(SiO_2)_{20}$ film of approximately 80 nm in thickness.

Then, the first disk member and the second disk member were bonded together with a spacer layer 15 between the L0 upper protective layer 14 and the L1 lower protective layer 16. This obtains a double-layered information recording medium as shown in FIG. 2 (disk A). Asperities having a groove depth of 42 nm and a groove width of 0.38 μm were formed on the substrate 11. On the protective substrate 20 were formed asperities having a groove depth of 42 nm and a groove width of 0.36 μm. Between the individual information planes, the composite film on the light incident side (the L0 lower protective film 12 through the L0 upper protective film 14) is an L0 composite film. The composite film far from the light incident side (the L1 lower protective layer 16 through the L1 reflective layer 19) is an L1 composite film.

Figure 3:
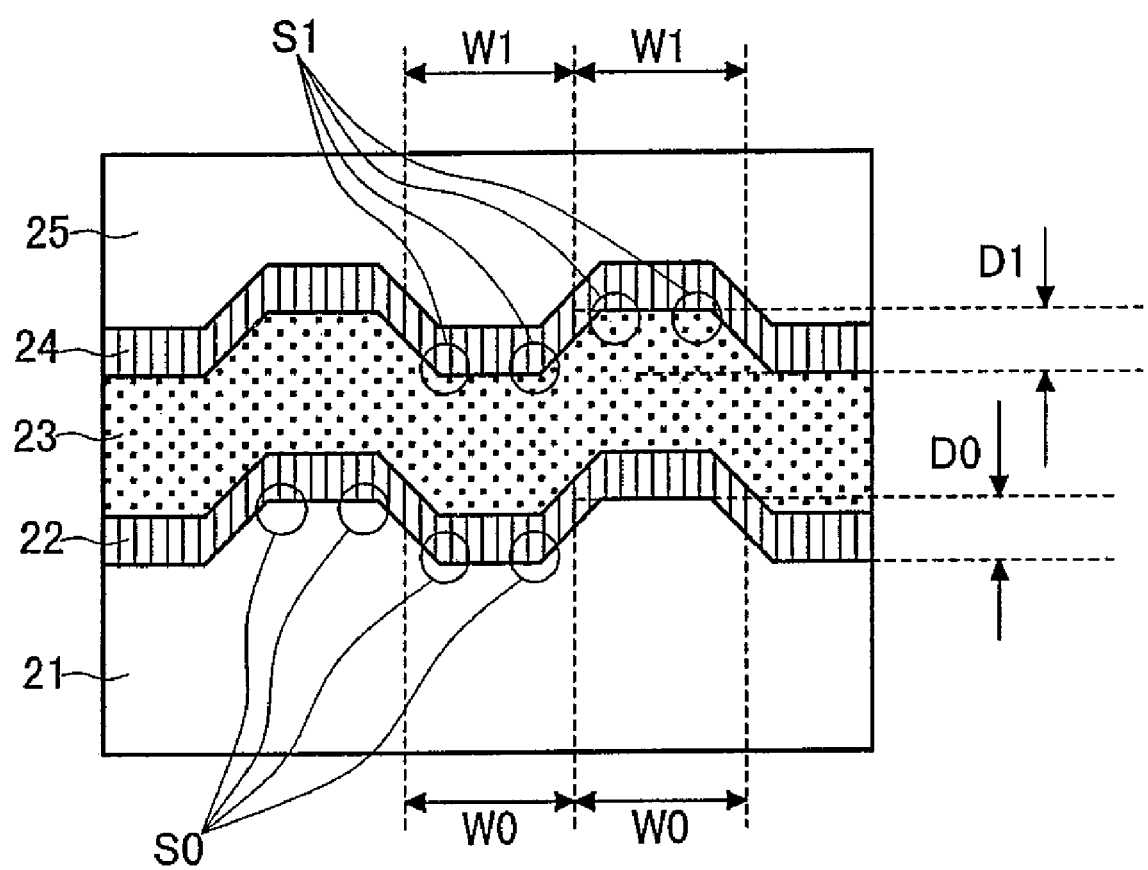
FIG. 3 is a schematic explanatory diagram showing the shapes of layers in the information recording medium according to the present invention.

Groove depths and groove widths are defined as shown in FIG. 3. In FIG. 3, the reference numeral 21 represents a substrate, 22 a layer 0, 23 a spacer layer between the layer 0 and a layer 1, 24 the layer 1, and 25 a protective substrate. The groove depth of L0 is the height (D0) of the asperities on the substrate surface of L0. The groove depth of L1 is the height (D1) of the asperities on the surface of the spacer layer. The groove width of L0 is the width (W0) across each individual asperity cut at a height half the groove depth D0. The groove width of L1 is the width (W1) across each individual asperity cut at a height half the groove depth D1. Averages are used when land portions and groove portions have different groove widths.

The asperities of the substrates are fabricated as described below. As shown in FIG. 4, at step 1, a photoresist 332 is spread out over a glass plate 333. At step 2, the resultant is irradiated with laser light 331. Here, the intensity and irradiation area of the laser light can be controlled to change the shapes of the asperities. Greater groove widths require greater irradiation areas. Greater track pitches require greater irradiation pitches. In order to meander the grooves, the laser light needs to be applied with meandering. The groove depth can be controlled by the thickness of the photoresist 332. Greater groove depths require thicker photoresists. Then, at step 3, development completes a glass master 335.

Next, as shown in FIG. 5, the glass master 335 is nickel plated to fabricate a nickel stamper 336 at step 4. Subsequently, heat-melted plastic substrate material (such as polycarbonate) is injected under high pressure into a cavity that incorporates this nickel stamper 336, followed by cooling. Then, a substrate 337 is removed from the nickel stamper 336 and drawn out to complete a plastic substrate which has a duplicated asperity pattern on its surface. Here, the temperature condition for the injection can be changed to alter the shapes of groove shoulders. This technique is a method (injection molding method) commonly used in fabricating plastic substrates of present CD-Audio, CD-R, and CD-ROM, as well as DVD-ROM, DVD-R, DVD-RAM, DVD-RW, MO, and the like.

(Initial Crystallization)

The L0 recording film 13 and the L1 recording film 17 of the disk A fabricated as described above were initially crystallized as described below. Note that the following description deals with the L0 recording film 13 and the L1 recording film 17 alone, whereas the same also applies to recording films of other multilayer media.

The medium (disk A) was rotated so that the linear velocity of a point on the recording track was 5 m/s. A semiconductor laser of approximately 810 nm in wavelength was focused on the recording film of L1 with a y laser power of 300 mW. Then, the laser was increased to 700 mW in power, and applied to the L1 recording film 17 through the substrate 1, the L0 composite film, and the spacer layer, with an oval spot shape which is wider in the radial direction of the medium. For each turn of the medium, the spot was shifted by 1/24 the spot length in the radial direction of the medium. The initial crystallization was thus performed over the entire surface of the L1 recording film. This initial crystallization could satisfactorily be performed one time, whereas it was repeated three times for some reduction in the noise increase resulting from initial crystallization. This initial crystallization has the advantage of high speed performance.

Next, the semiconductor laser of approximately 810 nm in wavelength was lowered to 300 mW in laser power. The focus position of the laser was moved to above the L0 recording film. Then, the laser was increased to 700 mW in power, and applied to the L0 recording film 13 through the substrate 1 with an oval spot shape which is wider in the radial direction of the medium. For each turn of the medium, the spot was shifted by 1/24 the spot length in the radial direction of the medium. The initial crystallization was thus performed over the entire surface of the L0 recording film. This initial crystallization could satisfactorily be performed one time, whereas it was repeated three times for some reduction in the noise increase resulting from initial crystallization. This initial crystallization has the advantage of high speed performance.

The initialization may be performed in any order, starting with the L1 recording film or the L0 recording film. In the case of a multilayer information medium having three layers or more, the initialization may be performed at random.

(Recording/Erasing/Reproduction)

The medium fabricated and given initial crystallization as described above was evaluated for recording, erasing, and reproduction characteristics in the manner as described below. Incidentally, while the following description deals with the L1 recording film 17 alone, it also applies to the L0 recording film 13. The same also holds for the recording film of each information plane in a multilayer information medium having three layers or more.

Information recording was performed while the recording laser light was changed in power between an intermediate power level Pe (3 mw) and a high power level Ph (7 mW), with tracking and automatic focusing applied to recording regions of the initial-crystallized recording film 17. The linear velocity of the recording track was 9 m/s, the wavelength of the semiconductor laser was 405 nm, and the numerical aperture (NA) of the lens was 0.65. The recording laser light forms amorphous portions in the recording regions, which or vicinities of which make recording points. This medium has higher reflectivity when in a crystalline state. Regions recorded into an amorphous state drop in reflectivity.

Figure 6:
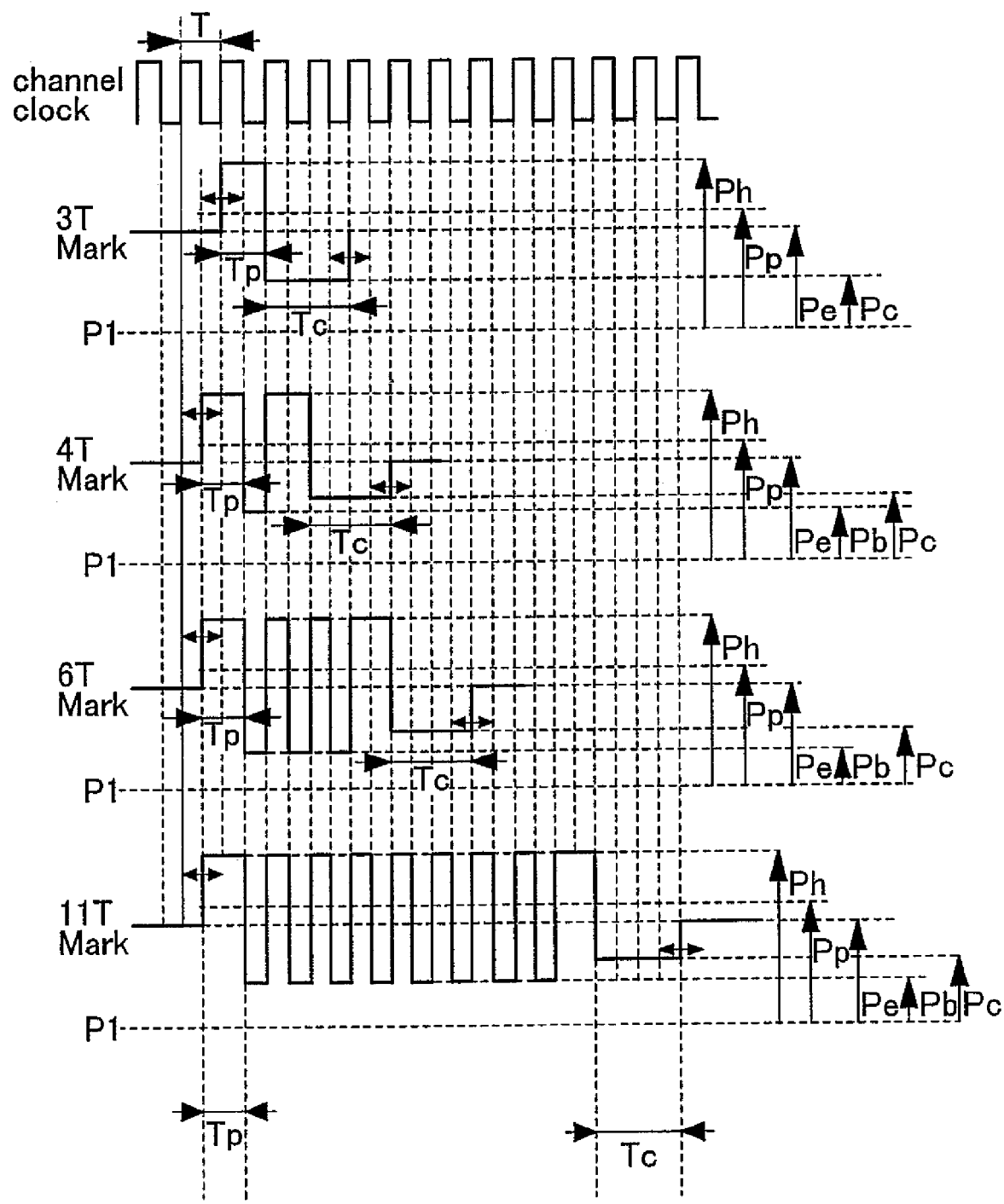
FIG. 6 is a schematic diagram showing examples of recording waveforms of the information recording medium according to the present invention.

The recording laser light preferably falls within the range of 1:0.3 and 1:0.7 in the power ratio between the high level and intermediate level. Moreover, other power levels may be taken for short periods of time each. As shown in FIG. 6, recording/reproduction was performed in a system having means for generating a waveform that repeatedly drops in power to a bottom power level Pb, which is lower than the intermediate power level Pe, by half a window width (Tw/2) while forming a single recording mark, and falls to a cooling power level Pc at the end of the recording pulses. The result was a reduction in the jitter value and error rate of the reproduced signal waveform. The cooling power level Pc was a level lower than the intermediate power level Pe, and higher than or equal to the bottom power level Pb. This waveform is characterized by that a first pulse width Tp varies depending on the combination of the lengths of the recording mark and the space provided immediately before the mark. Also characteristically, a cooling pulse width Tc (the time width of a to-Pc-level drop at the end of recording pulses) is determined by the combination of the lengths of the recording mark and the space subsequent to the mark. The shorter the space immediately preceding the mark is and the longer the mark is, the shorter becomes Tp. The longer the space immediately preceding the mark is and the shorter the mark is, the longer becomes Tp. Depending on medium structures, however, a high jitter-reducing effect was obtained when the recording waveform of a 6Tw mark was provided with particularly longer Tp. The longer the subsequent space is and the longer the mark is, the shorter becomes Tc. The shorter the subsequent space is and the shorter the mark is, the longer becomes Tc.

FIG. 6 shows only the recording waveforms of 3Tw, 4Tw, 6Tw, and 11Tw. The recording waveform of 5Tw is that of 6Tw from the high-power-level pulse series of which a single Tw/2 pulse of high power level Ph and the subsequent Tw/2 pulse of bottom power level Pb are removed. The recording waveforms of 7Tw through 10Tw are obtained by adding, in turn, a single Tw/2 pulse of high power level Ph paired with a single Tw/2 pulse of bottom power level Pb to immediately before the rearmost high-power-level pulse of the 6Tw recording waveform. Accordingly, the one with additional five pairs is of 11Tw.

Here, the shortest recording mark corresponding to 3Tw was 0.26-μm long. Past individual regions to record, the power of the laser light was lowered to a low power level Pr (1 mW) intended for reproducing (reading) laser light.

In such a recording method, information-recorded regions can be rewritten with new information by overwriting the new information thereon without erasing. That is, overwrite can be effected by a single, nearly circular spot.

Alternately, continuous light having power at or near the intermediate power level (3 mW) of the power-modulated recording laser light mentioned above may be applied at the initial rewriting turn or turns of the disk to erase recorded information once. At the next turn, laser light modulated in power between the bottom power level (0.5 mW) and the high power level (7 mW), or between the intermediate power level (3 mW) and the high power level (7 mW), according to information signals is then applied for recording. Such erasing of information before recording reduces unerased pieces of information written previously. This facilitates rewriting even when the linear velocity is doubled.

(Lower Protective Layer)

In the present embodiment, the L1 lower protective layer 16 and the L0 lower protective layer 12 have a double-layer structure of $(ZnS)_{80}(SiO_2)_{20}$ and $Cr_{40}O_{57}N_3$ layers. Among favorable alternatives to $(ZnS)_{80}(SiO_2)_{20}$ in the double-structured lower protective layers 12 and 16 are mixtures of ZnS and $SiO_2$ with different mixture ratios. The available materials also include ZnS, Si—N type materials, Si—O—N type materials, oxides such as $SiO_2$, SiO, $TiO_2$, $Al_2O_3$, $Y_2O_3$, $CeO_2$, $La_2O_3$, $In_2O_3$, GeO, $GeO_2$, PbO, SnO, $SnO_2$, BeO, $Bi_2O_3$, $TeO_2$, $WO_2$, $WO_3$, $Sc_2O_3$, $Ta_2O_5$, $ZrO_2$, $Cu_2O$, and MgO, nitrides such as TaN, AlN, BN, $Si_3N_4$, GeN, and Al—Si—N type materials (e.g. $AlSiN_2$), sulfides such as $Sb_2S_3$, CdS, $In_2S_3$, $Ga_2S_3$, GeS, $SnS_2$, PbS, and $Bi_2S_3$, selenides such as $SnSe_2$, $Sb_2Se_3$, CdSe, ZnSe, $In_2Se_3$, $Ga_2Se_3$, GeSe, $GeSe_2$, SnSe, PbSe, and $Bi_2Se_3$, fluorides such as $CeF_3$, $MgF_2$, and $CaF_2$, Si, Ge, $TiB_2$, $B_4C$, B, C, and materials having similar compositions as those of the materials mentioned above. Like ZnS—$SiO_2$ and ZnS—$Al_2O_3$, these materials may be mixed into a layer or laminated into a multilayer. Of these, ZnS has a high sputtering rate. Besides, 60%-by-mole or higher proportions of ZnS allow a reduction in film forming time. Therefore, ZnS mixtures of 60% by mole or higher combine the high sputtering rate of ZnS and the favorable chemical stability of oxides, nitrides, and the like. Near-ZnS characteristics were also obtained from other sulfides and selenides.

Concerning element ratios in these compounds, the ratios of metal elements to oxygen or sulfur in the oxides or sulfides preferably fall to or near such values as 2:3 in $Al_2O_3$, $Y_2O_3$, and $La_2O_3$, 1:2 in $ZrO_2$ and $GeO_2$, 2:5 in $Ta_2O_5$, and 1:1 in ZnS. Similar effects can also be obtained from other ratios. Even outside of the integer ratios mentioned above, however, the amounts of the metal elements preferably stay within 10% by atom in deviation. For Al—O, the amount of Al preferably falls within 10% by atom with respect to $Al_2O_3$ in terms of the ratio of Al to O. For Si—O, the amount of Si preferably falls within ±10% by atom with respect to $SiO_2$ in terms of the ratio of Si to O. Deviations beyond 10% by atom cause a change in optical properties, lowering the modulation factor by 10% or more.

The above-mentioned materials preferably reach or exceed 90% the total numbers of atoms in the lower protective layers. When impurities other than the materials mentioned above reach or exceed 10% by atom, there occurs a deterioration in rewrite characteristics such that the number of rewritable times falls to or below ½.

The lower protective layers used in the present embodiment preferably have an attenuation factor k of 0 or near 0. Moreover, if the attenuation factor k satisfies k≦0.01 for 80% or more of the thickness of the lower protective layer material, a drop in contrast can be favorably suppressed within 2%.

It was found that if the lower protective layers are formed of two or more layers each, and the lower protective layers on the recording film sides consist of $Cr_2O_3$ or $Cr_{40}O_{57}N_3$, diffusion of Zn and S into the recording films upon a plurality of rewrites can be suppressed with favorable rewrite characteristics. Among favorable alternatives to $Cr_2O_3$ in the lower protective layer material on the recording film sides are mixtures of $Cr_2O_3$ with $SiO_2$, $Ta_2O_5$, $Al_2O_3$, and $ZrO_2$—$Y_2O_3$. Next preferable are CoO, $GeO_2$, or NiO, or their mixtures with $Cr_2O_3$. These oxides have smaller attenuation factors k, which translate into extremely lower absorption in the lower protective layer. This has the advantage that the modulation factors can be kept high.

Moreover, replacing some of $Cr_2O_3$ or $Cr_{40}O_{57}N_3$ with $Al_2O_3$ or $Al_{40}O_{57}N_3$ can reduce absorption outside the recording films and increase transmittance, favorably allowing high C/N in the L0 layer. The same characteristics were also obtained from materials having $SiO_2$ or $Si_{33}O_{63}N_4$ in place of $Al_2O_3$ or $Al_{40}O_{57}N_3$, or ones with different nitrogen-oxygen ratios.

Nitrides such as AlN, BN, CrN, $Cr_2N$, GeN, HfN, $Si_3N_4$, Al—Si—N type materials (e.g. $AlSiN_2$), Si—N type materials, Si—O—N type materials, TaN, TiN, and ZrN are yet preferable since they have higher archival lives and resistance to outside temperature changes. Nitrogen-containing compositions and suchlike compositions of the recording films improve adhesion.

Other materials usable include oxides such as BeO, $Bi_2O_3$, $CeO_2$, $Cu_2O$, CuO, CdO, $Dy_2O_3$, FeO, $Fe_2O_3$, $Fe_3O_4$, GeO, $GeO_2$, $HfO_2$, $In_2O_3$, $La_2O_3$, MgO, MnO, $MoO_2$, $MoO_3$, NbO, $NbO_2$, PbO, PdO, SnO, $SnO_2$, $Sc_2O_3$, SrO, $ThO_2$, $TiO_2$, $Ti_2O_3$, TiO, $TeO_2$, VO, $V_2O_3$, $VO_2$, $WO_2$, and $WO_3$, C, carbides such as $Cr_3C_2$, $Cr_{23}C_6$, $Cr_7C_3$, $Fe_3C$, $Mo_2C$, WC, $W_2C$, HfC, TaC, and $CaC_2$, and materials having compositions similar to those mentioned above, as well as mixtures thereof.

When oxide or nitride layers are arranged on the recording film sides of the power protective layers, the diffusion of Zn, S, and the like into the recording films can be prevented to suppress an increase of unerased portions. Furthermore, to avoid a drop in recording sensitivity, the layers were favorably 25 nm or thinner, and yet preferably 10 nm or thinner. Uniform films were formed in thicknesses of approximately 2 nm or greater, and preferably 5 nm or greater. Accordingly, the lower protective layers on the recording film sides preferably range from 2 to 25 nm in thickness for better recording/ reproduction characteristics. The thicknesses of the lower protective layers below 30 nm caused recrystallization with a drop in C/N. The lower protective films, when fell below 10 nm, lost the effect of protecting the recording films, so that the number of rewritable times dropped by one digit or more. What have been referred to as lower protective films include the L0 lower protective layer and the L1 lower protective layer, and a lower protective layer or layers in the case of an information recording medium having more layers.

(Recording Film)

In the present embodiment, the recording films 13 and 17 are formed of $Ge_5Sb_2Te_8$. At reproducing wavelengths, these recording films have a refractive index of 2.0 in a crystalline state and of 2.6 in an amorphous state. That is, a smaller index in a crystalline state.

Among alternatives to $Ge_5Sb_2Te_8$, or the material of the recording films 13 and 17, Ag—Ge—Sb—Te type and Cr—Ge—Sb—Te type materials of different composition ratios, such as $Ag_3Ge_{30}Sb_{14}Re_{53}$ and $Cr_3Ge_{32}Sb_{13}Te_{52}$, favorably have higher modulation factors. If the recording film 13 and/or the recording film 17 contain(s) a greater amount of Ag or Cr, a change in reflectivity increases while the speed of crystallization decreases. Therefore, the amount of Ag or Cr to be added ranges preferably from 2% to 10% by atom. However, overwrite can also be performed with Ge—Sb—Te type materials having no additional Ag. It was found that Ag to be added to the recording film(s) 13, 17 was replaceable with at least one out of Cr, W, Mo, Pt, Co, Ni, Pd, Si, Au, Cu, V, Mn, Fe, Ti, and Bi while maintaining favorable overwrite characteristics. At reproducing wavelengths, all of these materials for the recording films 13 and 17 have a smaller refractive index in a crystalline state than in an amorphous state.

In the present embodiment, recording films 17 of different thicknesses were measured for jitter (σ/Tw) after ten times of rewrite and after ten thousand times of rewrite. The results are shown in Table 1 below. For the jitter after ten times of rewrite, measurements (%) inferior between those of front edges and rear edges are shown with respect to the thicknesses (nm) of the recording films 17. For the jitter after ten thousand times of write, measurements (%) of front edges are shown.

TABLE 1

| Thickness of recording film (nm) | Jitter after 10 times of rewrite (%) | Jitter after 10 thousand times of rewrite (%) |
| --- | --- | --- |
| 2 | 23 | not measured |
| 4 | 18 | 15 |
| 5 | 15 | 15 |
| 10 | 14 | 14 |
| 20 | 15 | 15 |
| 25 | 15 | 20 |
| 35 | not measured | 25 |

It was seen that the recording films 17 of smaller thicknesses showed higher jitter after ten times of rewrite because of recording film flow and segregation, while those of greater thicknesses showed higher jitter after ten thousand times of rewrite. Accordingly, the thickness of the recording film 17 in the range of 4 and 25 nm can favorably reduce jitter to 20% or lower. The range of 5 and 20 nm yet preferably reduces jitter to 15% or lower.

As for the thickness of the recording film 13 and the thicknesses of the recording films on the layers 1 through N–1, the individual layers favorably become recordable and reproducible when they satisfy the following relation in recording film thickness.

layer 1≦layer 2≦ ... ≦layer N–1≦layer N

Besides, as viewed from the substrate on the light incident side, the recording films for the first through (N–1)-th information planes favorably have a total thickness of 10 nm or less which can increase the C/N of the N-th information plane to 48 dB or higher. If the total thickness falls to or below 8 nm, the C/N of the N-th information plane can be preferably increased to 49 dB or higher.

In the present embodiment, the recording films 13 and 17 are formed of a single layer each. The recording films may be composed of a plurality of layers. In the case of a plurality of layers, protective layers may be arranged between the layers. The recording films may have an identical composition or different compositions. Moreover, the recording levels are not limited to those of binary recording of crystal and amorphous. Each layer may be composed of a plurality of recording films so that crystal-amorphous combinations provide different levels of reflectivities for multi-valued recording. Single-layered recording films with different mark areas may be used for multi-valued recording.

Figure 7:
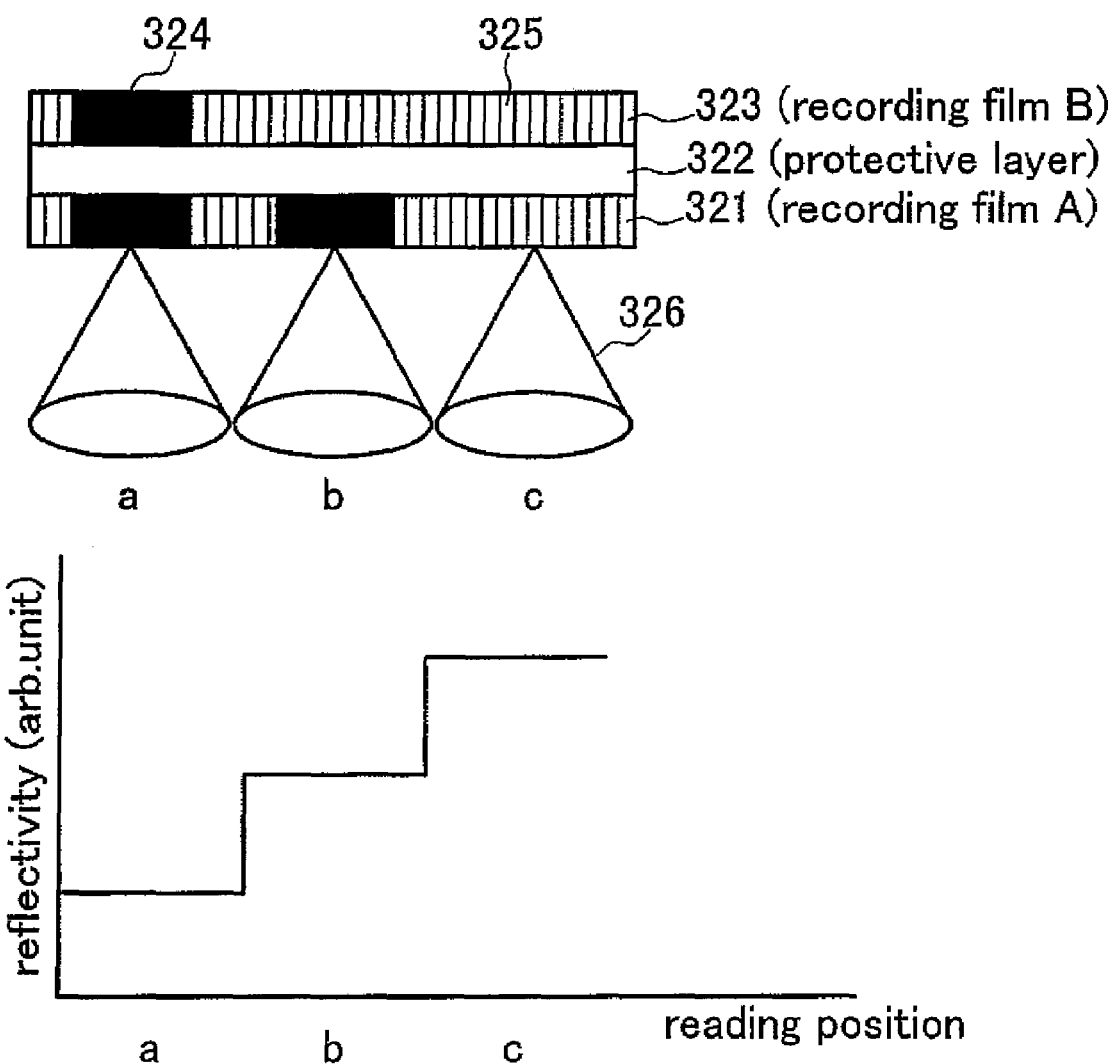
FIG. 7 is an explanatory diagram showing an example of multi-valued recording on the information recording medium according to the present invention.

FIG. 7 shows an example of multi-valued recording in which each layer has a plurality of recording films so that reflectivity levels are changed by crystal-amorphous combinations. In the example, three-valued recording is performed with a double-layered recording film. Laser light 326 forms amorphous regions 324 and crystalline regions 325 in three combinations. At a, both a recording film A (321) and a recording film B (323) are made amorphous. At b, only the recording film A (321) is made amorphous while the recording film B (323) is crystallized. At c, both the recording film A (321) and the recording film B (323) are crystallized. This provides three levels of reflectivities, allowing three-valued recording.

Figure 8:
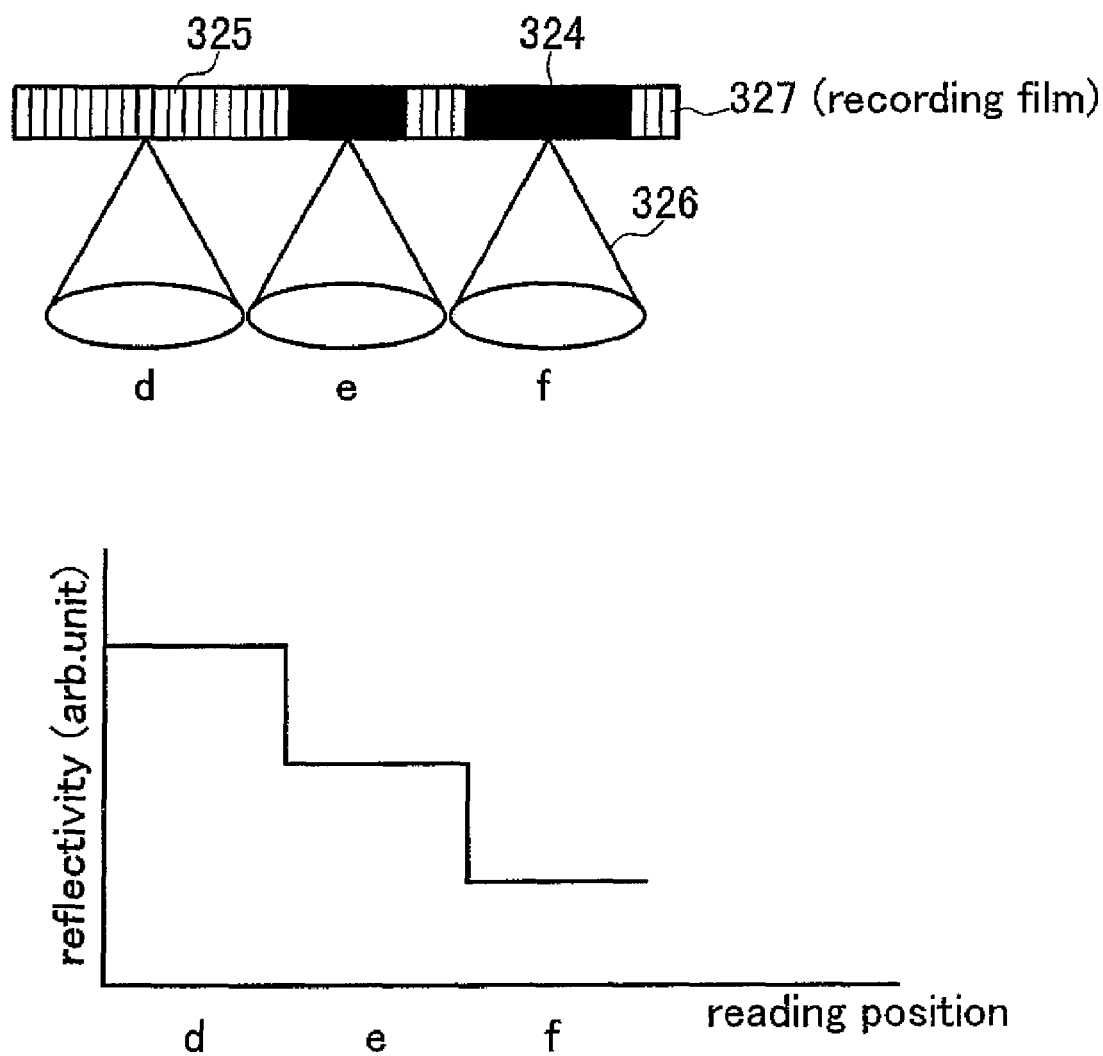
FIG. 8 is an explanatory diagram showing an example of multi-valued recording on the information recording medium according to the present invention.

FIG. 8 shows an example of three-valued recording according to the multi-valued recording in which each layer is recorded with marks of different sizes for different levels of reflectivities. Laser light 326 forms amorphous regions 324 and crystalline regions 325 with different sizes. Crystallization occurs at d. At e and f, amorphous regions are formed in smaller and greater sizes, respectively. This provides three levels of reflectivities, allowing three-valued recording.

(Upper Protective Layer)

In the present embodiment, the L1 upper protective layer 18 and the L0 upper protective layer 14 each are formed of a $ZnS$—$SiO_2$ film and a $Cr_{40}O_{60}$ film.

Alternatives to $ZnS$—$SiO_2$ in the upper protective layers include Si—N type materials, Si—O—N type materials, ZnS, oxides such as $SiO_2$, SiO, $TiO_2$, $Al_2O_3$, $Y_2O_3$, $CeO_2$, $La_2O_3$, $In_2O_3$, GeO, $GeO_2$, PbO, SnO, $SnO_2$, BeO, $Bi_2O_3$, $TeO_2$, $WO_2$, $WO_3$, $Sc_2O_3$, $Ta_2O_5$, $ZrO_2$, $Cu_2O$, and MgO, nitrides such as TaN, AlN, BN, $Si_3N_4$, GeN, and Al—Si—N type materials (e.g. $AlSiN_2$), sulfides such as $Sb_2S_3$, CdS, $In_2S_3$, $Ga_2S_3$, GeS, $SnS_2$, PbS, and $Bi_2S_3$, selenides such as $SnSe_2$, $Sb_2Se_3$, CdSe, ZnSe, $In_2Se_3$, $Ga_2Se_3$, GeSe, $GeSe_2$, SnSe, PbSe, and $Bi_2Se_3$, fluorides such as $CeF_3$, $MgF_2$, and $CaF_2$, Si, Ge, $TiB_2$, $B_4C$, B, C, and materials having similar compositions as those of the materials mentioned above. Like $ZnS$—$SiO_2$ and $ZnS$—$Al_2O_3$, these materials may be mixed into a layer or laminated into a multilayer. An attenuation factor of 0 or near 0 is preferable.

Concerning element ratios in these compounds, the ratios of metal elements to oxygen or sulfur in the oxides or sulfides preferably fall to or near such values as 2:3 in $Al_2O_3$, $Y_2O_3$, and $La_2O_3$, 1:2 in $ZrO_2$ and $GeO_2$, 2:5 in $Ta_2O_5$, and 1:1 in ZnS. Similar effects can also be obtained from other ratios. Outside of the integer ratios mentioned above, the amounts of the metal elements preferably stay within 10% by atom in deviation. For Al—O, the amount of Al preferably falls within 10% by atom with respect to $Al_2O_3$ in terms of the ratio of Al to O. For Si—O, the amount of Si preferably falls within ±10% by atom with respect to $SiO_2$ in terms of the ratio of Si to O. Deviations beyond 10% by atom cause a change in optical properties, lowering the modulation factor by 10% or more.

The above-mentioned materials preferably reach or exceed 90% the total numbers of atoms in the upper protective layers. When impurities other than the materials mentioned above reached or exceeded 10% by atom, there was found such a deterioration in rewrite characteristics that the number of rewritable times falls to or below ½.

It was found that if the upper protective layers are formed of two or more layers each, and the upper protective layers on the recording film sides consist of $Cr_2O_3$, diffusion of Zn and S into the recording films upon a plurality of rewrites can be suppressed with favorable rewrite characteristics. It was also found that partial replacement with $Al_2O_3$ or $SiO_2$ favorably increases contrast.

(Reflective Layer)

In the present embodiment, the L1 reflective layer 19 is made of $Ag_{98}Pd_1Cu_1$. Among favorable alternatives to the material of the L1 reflective layer are ones consisting chiefly of Ag alloys such as Ag—Pt and Ag—Au. Ag is also available. It was found that Ag alloys containing non-Ag elements in the range of 0.5% and 4% by atom improve multiple rewrite characteristics and a bit error rate. The range of 1% and 2% by atom is yet preferable.

Moreover, $Zn_{98}Pd_2$ films, $Zn_{98}Pt_2$ films, $Zn_{98}Cu_2$ films, and $Zn_{98}Ni_2$ films, as well as Zn—Pd films, Zn—Pt films, Zn—Cu films, and Zn—Ni films having compositions other than those mentioned above, have the advantage of lower costs as compared with the Ag type materials. Zn is also available. It was found that Zn alloys containing non-Zn elements in the range of 0.5% and 4% by atom improve multiple-rewrite characteristics and a bit error rate. The range of 1% and 2% by atom is yet preferable.

Also available are layers of Au, Al, Cu, Ni, Fe, Co, Cr, Ti, Pd, Pt, W, Ta, Mo, Sb, Bi, Dy, Cd, Mn, Mg, and V element substances, alloys chiefly consisting of these substances, such as Au alloys, Ag alloys other than those mentioned above, Cu alloys, Pd alloys, and Pt alloys, and alloys of these alloys. The reflective layer is thus made of metal elements, semimetal elements, and/or alloys and mixtures of the same.

Of these, materials of high reflectivities such as Ag, Al, Al alloys, and Ag alloys have higher contrast ratios with favorable rewrite characteristics. Alloys are higher in adhesion than substances. Here, like the Ag alloys discussed before, the contents of the elements other than such chief ingredients as Al and Ag were favorably confined to the range of 0.5% and 5% by atom for higher contrast ratios and higher adhesion. The range of 1% and 2% by atom was yet preferable. Comparisons in the vicinity of 400 nm in wavelength show that Ag and Ag alloys had reflectivities of approximately 95%, and Al and Al alloys approximately 92%. That is, Ag types are higher in reflectivity. However, they are also higher in material costs. Next to these materials, Zn and Zn alloys offered high reflectivities of approximately 89%, and Pt and Pt alloys approximately 65%, at shorter wavelengths for high contrast.

The above-mentioned materials preferably reach or exceed 95% the total numbers of atoms in the L1 reflective layer. When impurities other than the materials mentioned above reached or exceeded 5% by atom, there was found such a deterioration in rewrite characteristics that the number of rewritable times falls to or below ½.

When the L1 reflective layer had a thickness above 200 nm, it took longer to fabricate the individual L1 reflective layer. This required two or more divided steps or entailed the provision of more than one sputtering vacuum chamber, thereby doubling the forming time. In contrast, at thicknesses of 5 nm or smaller, the L1 reflective layer was formed in islands with an increase in noise. Thus, in terms of noise, jitter, and forming time, it is preferable that the L1 reflective layer has a thickness in the range of 5 and 200 nm.

In the present embodiment, the L0 composite layer has no reflective layer. Nevertheless, an L0 reflective layer may be formed directly between the upper protective layer and the spacer layer, or via a protective layer. The L0 reflective layer may be formed by laminating the upper protective layer, a reflective layer, and the spacer layer in succession, or the upper protective layer, the reflective layer, the protective layer, and the spacer layer in succession. In this case, increased CNR improves the characteristics of the L0 film while decreased transmittance deteriorates the reproduction characteristic and recording sensitivity of the L1 film. The L0 reflective layer may be made of the same material as that of the L1 reflective layer. To avoid a drop in transmittance, thicknesses no greater than 20 nm are preferable. The protective layer may be made of the same material as that of the upper protective layers or the lower protective layers.

(Substrate)

The present embodiment is provided with the polycarbonate substrate 11 which has tracking grooves directly in its surface. A chemical strengthened glass substrate having polyolefin, epoxy, acrylic resin, ultraviolet light curing resin layered on its surface may be used instead. The strengthened glass may be replaced with quartz or CaF.

The substrate having tracking grooves is one in which grooves having a depth of $\lambda/12n'$ (n' is the refractive index of the substrate material) or greater are formed in all or part of the substrate surface, where λ is the recording/reproducing wavelength. The grooves may be formed with continuous circumferences or with split circumferences. It was found that a groove depth of approximately $\lambda/6n'$ favorably reduces crosstalk. It was also found that groove depths around or above $\lambda/3n'$ deteriorate yields upon the formation of the substrate, but favorably reduce cross erase.

The groove widths may be changed from place to place. Substrates in a sample servo format with no groove portion, and substrates of other tracing systems and in other formats may also be used. Substrates having a format in which recording/reproduction can be performed on both groove and land portions, as well as substrates having a format in which recording is performed on either one of the portions, may be used. If the track pitch is too small, a signal leak from adjoining tracks can be detected as noise. Thus, the track pitch is preferably greater than or equal to ½ the spot diameter (region with a light intensity of $1/e^2$).

The disk size is not limited to 12 cm in diameter. Other sizes including 13 cm, 9 cm, 8 cm, 3.5 in., 2.5 in., and 1 in are also applicable. The disk thickness is not limited to 0.6 mm, either. Other thicknesses including 1.2 mm, 0.8 mm, 0.4 mm, and 0.1 mm are applicable.

In the present embodiment, the bonding is effected by the spacer layer. The second disk member may be replaced with a disk member of different configuration, a protecting substrate, or the like. Alternatively, the L1 film, the spacer layer, and the L0 film may be laminated successively on a protecting layer before the formation of the substrate. Furthermore, two disks fabricated in this way can be bonded into a double-sided disk so that the per-disk recording capacity favorably becomes approximately twice. If the disk members have high transmittance in the range of ultraviolet wavelengths, ultraviolet light curing resin may be used for bonding. Other bonding methods may also be used.

Besides, ultraviolet light curing resin may be spread out over the top surfaces of the first and second disk members in a thickness of approximately 10 µm, and cured before the bonding of the first and second disk members. This allows a further reduction in error rate.

(Thicknesses and Materials of Layers)

Simply adopting favorable ranges of thicknesses and materials of the respective layers can improve the recording/reproducing characteristics and the like. The individual favorable ranges can be combined for greater effect.

(Recording/Reproducing Method)

Figure 9:
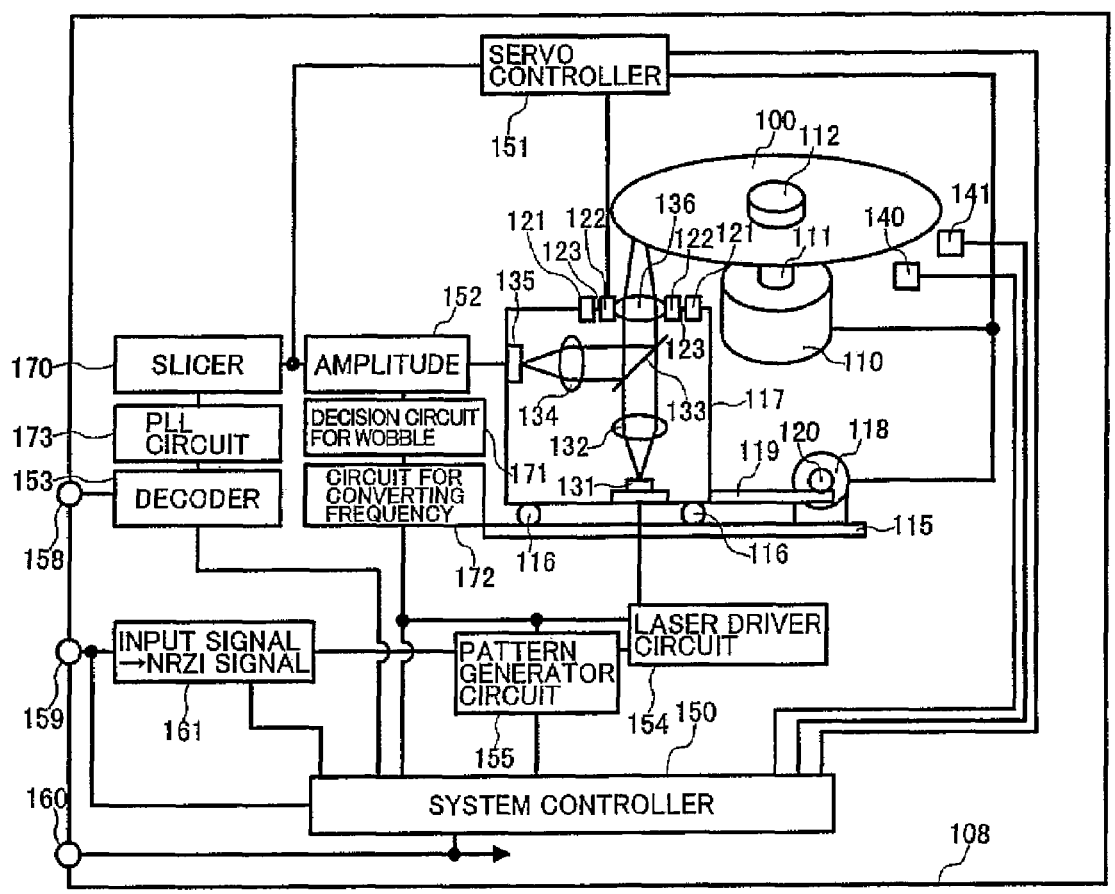
FIG. 9 is a block diagram of an apparatus for recording/reproducing an information recording medium according to the present invention.

FIG. 9 is a block diagram showing an apparatus for recording/reproducing information which is an embodiment of the present invention. For convenience of description, the apparatus for recording/reproducing information is shown with an information recording medium 100 mounted thereon. The fabrication method and the structure of the information recording medium 100 are as described above. The information recording medium 100 is indispensable for recording/reproducing information. The information recording medium 100 is, however, dismounted from or mounted on the recording/reproducing apparatus according to need.

In FIG. 9, a chucking mechanism 112 is attached to a rotating shaft 111 of a motor 110 which is installed on a cabinet 108. The information recording medium 100 is held by the chucking mechanism 112. The chucking mechanism 112, in other words, functions as a mechanism for holding the recording medium 100. The motor 110, the rotating shaft 111, and the chucking mechanism 112 constitute a moving mechanism for making a relative move between the information recording medium 100 and an energy beam.

A rail 115 is installed on the cabinet 108. A rail guide 116 to be guided by the rail 115 is attached to a case 117. The case 117 also has a straight gear 119 attached thereto. A rotating gear 120 is meshed with the straight gear 119. The rotation of a rotating motor 118 mounted on the cabinet 108 is transmitted to the rotating gear 120 so that the case 117 makes a linear motion along the rail 115. The direction of this linear motion coincides with a generally radial direction of the information recording medium 100.

Magnets 121 are attached to the case 117.

The case 117 also contains an objective lens 136. The objective lens 136 is mounted via a suspension 123 that allows the objective lens 136 to move in a generally normal direction to the recording planes of the information recording medium 100 and in the generally radial direction of the information recording medium 100. In addition, a coil 122 is attached to the object lens 136 so as to be generally opposed to the magnets 121. Passing a current through the coil 122 can cause a magnetic effect to move the objective lens 136 in two directions, or in the generally normal direction to the recording planes of the information recording medium 100 and in the generally radial direction of the information recording medium 100. The rail 115, the rail guide 116, the case 117, the magnets 121, the suspension 123, the coil 122, and the objective lens 136 constitute a positioning mechanism for positioning an energy beam at a predetermined point on the information recording medium 100.

A semiconductor laser 131, or an energy beam generator, is mounted on the case 117. An energy beam emitted from the semiconductor laser 131 passes through a collimator lens 132 and a beam splitter 133, and passes through the objective lens 136. Some of the light emitted from the objective lens 136 is reflected from the information medium 100, transmitted through the objective lens 136, reflected from the beam splitter 133, condensed through a detection lens 134, and detected for light intensity by a light detector 135. The light detector 135 has a light receiving area with a plurality of partitions.

Figure 10:
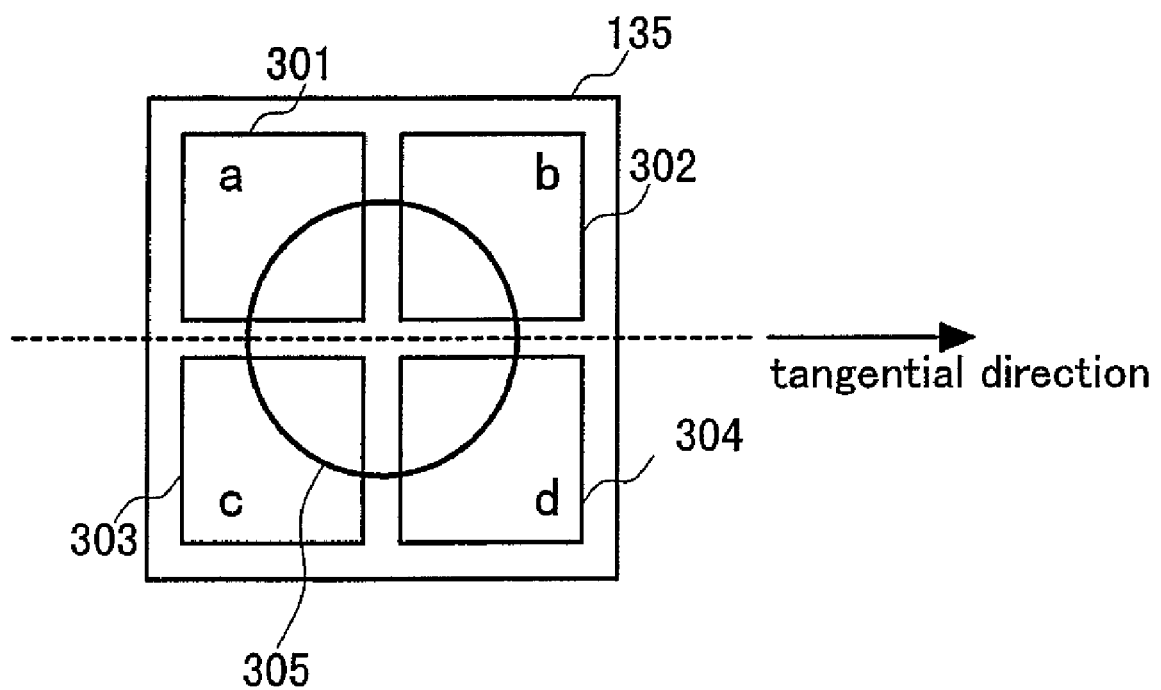
FIG. 10 is a detailed diagram showing a light detector in the apparatus for recording/reproducing an information recording medium according to the present invention.

FIG. 10 is a schematic diagram of a four-way partitioned light detector. A light beam 305 returned from the information recording medium is detected in split forms including the quantity of light a to be detected by a detector 301, the quantity of light b to be detected by a detector 302, the quantity of light c to be detected by a detector 303, and the quantity of light d to be detected by a detector 304. The sum level is the total of all the quantities of light, or a+b+c+d. Tracking is performed so as to reduce a difference between the quantities of light from the detectors arranged across the tangential direction. A tracking error signal is a difference between the quantities of light from the detectors arranged across the tangential direction, or (a+b)−(c+d). While this example has dealt with the four-way partitioned light detector, the same holds true for detectors of different number of partitions. The light intensities detected at the respective light receiving areas are amplified and operated in an amplifier 152, whereby information (servo signal) on the physical relationship between the spot condensed by the objective lens 136 and the information recording medium 100 is detected along with an information read signal. The servo signal is sent to a servo controller 151. The read signal is sent to a decoder 153.

When the information recording medium 100 is mounted on the apparatus for recording/reproducing information, and the chucking mechanism 112 fixes the information recording medium 100, a detector 140 operates to send its signal to a system controller 150. In response to the signal, the system controller 150 controls the motor 110 to rotate the information recording medium 100 to an appropriate number of revolutions. The system controller 150 also controls the rotating motor 118 to position the case 117 to an appropriate point. In addition, the system controller 150 makes the semiconductor laser 131 emit light. Meanwhile, the system controller 150 operates the servo controller 151 to operate the rotation motor 118 and pass a current through the coil 122, thereby positioning the focus spot formed by the objective lens 136 to a predetermined point on the information recording medium 100. Then, the servo controller 151 sends a signal to the system controller 150 to inform that the focus spot is formed on the information recording medium 100. The system controller 150 gives instructions to the decoder 153 to decode signals being read. If the track to be read is not an information track in a control data zone, the system controller 150 gives instructions to the servo controller 151 so that the focus spot is positioned on the information track in the control data zone. As a result of this operation, the system controller 150 reads the information track in the control data zone to read out recording/reproduction-related information of the medium.

When an instruction for information write and the information to be written are transmitted from a host controller through an input connector 159, the system controller 150 gives instructions to the servo controller 151 to position the focus spot to an appropriate track on an appropriate information plane (layer) of the information recording medium 100.

The signals obtained by the light detector 135 are amplified by the amplifier 152. The signals are transmitted to a wobble detection circuit 171. Tracks are meandered or deformed periodically. The wobble detection circuit 171 detects the period thereof. Incidentally, what are detected by the wobble detection circuit include the meandering (wobbling) of the recording tracks, deformations of grooves periodically arranged along the time-series read direction of the recording tracks, prepits periodically arranged along the time-series read direction of the recording tracks, and/or combinations thereof. In a frequency conversion circuit 172, period signals detected by the wobble detection circuit 171 are converted in period (frequency) to make a recording/reproducing clock fundamental. For its conversion rate, the frequency conversion circuit 172 uses a conversion rate specification prerecorded on the information track in the control data zone. The recording/reproducing clock fundamental may be generated by means other than the wobble detection circuit 171 and the frequency conversion circuit 172.

A reproduced signal obtained by the light detector 135 is binary-coded by a slicer 170, synchronized with a synchronizing signal generated by a PLL circuit 173, and decoded by the decoder 153 before output through an output connector 158.

Information to be written is converted into NRZI signals through a signal processing circuit 161. The information converted into NRZI signals is transmitted to a pattern generator circuit 155. In accordance with a method for laying out recording marks within sectors designated by the system controller 150, the pattern generator circuit 155 arranges user data area patterns to be recorded into the sectors, recording mark layouts (buffers and other fields) to precede the user data areas, and recording mark layouts (buffers and other fields) to follow the user data areas. This completes the pattern strings of the recording mark layouts within the sectors. The pattern generator circuit 155 is supplied with the recording/reproducing clock fundamental generated by the frequency conversion circuit 172. The pattern generator circuit successively sends the individual recording patterns it has generated to a laser driver circuit 154 one by one in synchronization with the recording/reproducing clock fundamental. In accordance with the to-be-written recording mark patterns sent from the pattern generator circuit 155, the laser driver circuit 154 generates write pulses in synchronization with the recording/reproducing clock fundamental generated by the frequency conversion circuit 172. The write pulses are sent to drive the semiconductor laser 131. As a result, the semiconductor laser 131 emits light, and the amount of energy emitted by the semiconductor laser 131 is temporally modulated in response to the information to be written. This emitted light is applied to the information recording medium 100 through the collimator lens 132 and the objective lens 136, thereby forming recording marks on the recording medium.

For DVD-RAM or other optical disks to form recording marks by using intensity variations of the light incident on the recording medium, the information to be recorded eventually takes the form of changes in the driving current of the semiconductor laser 131. This driving current is changed in synchronization with the recording/reproducing clock fundamental.

Figure 12:
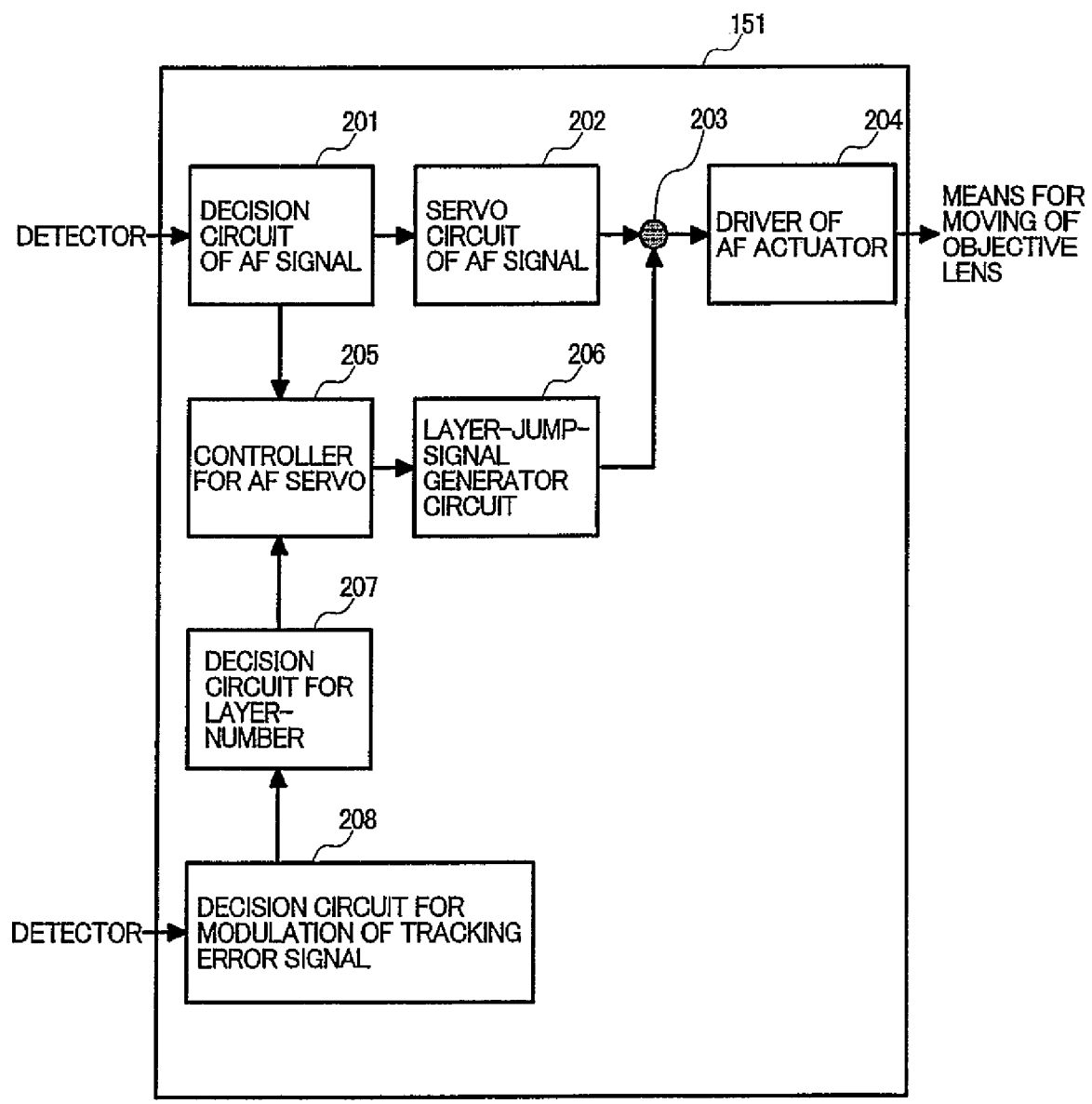
FIG. 12 is a detailed diagram of a servo controller, showing an example of the apparatus for recording/reproducing an information recording medium according to the present invention.

One of the features of the present invention consists in the servo controller 151. FIG. 11 is a principle diagram, and FIG. 12 is a detailed diagram showing an example of the servo controller. The servo controller 151 includes a decision circuit 201 of auto focus (AF) signal. An AF error signal detected thereby is sent to a servo circuit 202 of AF signal so that a signal is transmitted to a driver 204 of AF actuator through a switch 203. Meanwhile, the AF error signal detected by the decision circuit 201 is transmitted to a controller 205 for AF servo, informing of focusing on a layer (information plane). A tracking (TR) error signal coming into focus is measured for modulation by a decision circuit 208 for the modulation of a tracking error signal. The measurement is transmitted to a decision circuit 207 for layer-number. The layer number of the layer in focus is determined and transmitted to the controller 205. Here, if a proper layer is in focus, no layer jump is required. In the case of an improper layer, a signal for making a jump to the proper layer is generated by a layer-jump-signal generator circuit 206. The signal is transmitted through the switches 203 to the driver 204 for layer jump. These steps are repeated until the proper layer comes into focus.

As shown in FIG. 11, measurement of modulation is performed on the basis of tracking error signals that are detected until the spot moves to a predetermined position and/or by a predetermined time. In the diagram, the undermost signals are the synchronizing signal, based on which the detection time and/or the detection timing are/is determined.

It can be seen that when the medium having layers with different modulations of TR error signals is measured for TR error signal modulation by the decision circuit 208 before layer judgment, the layer number can be determined as shown in FIG. 11 and the proper layer can be accessed and recorded with reliability. Besides, there is the advantage that recording access time is extremely short even when compared with a method of making a layer judgment by reading information from the pit areas of the substrate after tracking.

It is also apparent that when a medium having layers with different modulations of TR error signals is measured for TR error signal modulation by the decision circuit 208 before layer judgment, the layer number can be determined as shown in FIG. 11 and the proper layer can be accessed and reproduced with reliability. Besides, there is the advantage that reproducing access time is extremely short even when compared with a method of making a layer judgment by reading information from the pit areas of the substrate after tracking.

Layers farther from the light incident side are under higher effects of the layers on the light incident side, and have greater noise in their TR error signals. It was thus preferable that the first through N-th layers (information planes) had TR error signal modulations as shown in the expression below, or such that layers farther from the light incident side had greater TR error signal modulations.

$$\text{layer 1} < \text{layer 2} < \ldots < \text{layer N-1} < \text{layer N}$$

(N is an integer greater than or equal to 2)

With respect to the modulation of L0, 5% or greater differences in signal modulation favorably eliminated decision errors. Differences of 10% or greater yet preferably offered resistance to environmental changes.

At the time of access, reproducing light of constant intensity is applied to detect TR error signal modulations for layer number determination. Then, it is preferable to provide means for controlling the intensity of the reproducing light to optimize the light intensity of the reproduced signal on each layer after a jump to the proper layer, for information can be recorded and reproduced with greater S/N (signal to noise ratio).

(Characteristics of Information Recording Medium)

The medium having layers with different modulations of TR error signals can be fabricated by changing the shapes of the asperities which are made of continuous or partially-continuous grooves formed in the recording tracks on the information planes. In the case of a double-layered medium, for example, the above-mentioned asperities are formed in a constant groove depth of 42 nm, with different groove widths of 0.36 μm and 0.38 μm for L0 and L1, respectively. This provides L0 and L1 with different TR error signal modulations of 375 mV and 390 mV, respectively. This difference allows a layer judgment.

Layers farther from the light incident side are under higher effects of the layers on the light incident side, and have greater noise in their TR error signals. It was thus preferable that the asperities on the first through N-th layers (information planes) had groove widths as shown in the expression below, or such that the asperities on layers farther from the light incident side had greater groove widths.

layer 1<layer 2<...<layer N−1<layer N (N is an integer greater than or equal to 2)

With respect to the groove width of L0, 5% or greater differences in the groove widths of the asperities favorably eliminated decision errors. Differences of 10% or greater yet preferably offered resistance to environmental changes.

The same effects were obtained by varying the asperities in groove depth instead of groove width. For example, when a double-layered medium is formed on a substrate having n' of 1.62, the above-mentioned asperities are formed in a constant groove width of 0.38 μm, with different groove depths of 45 nm ($\lambda/5.6/n'$) and 42 nm ($\lambda/6.0/n'$) for L0 and L1, respectively. This provides L0 and L1 with different TR error signal modulations of 375 mV and 390 mV, respectively. This difference allows a layer judgment.

Layers farther from the light incident side are under higher effects of the layers on the light incident side, and have greater noise in their TR error signals. It was thus preferable that the asperities on the first through N-th layers (information planes) had groove depths as shown in the expression below, or such that the asperities on layers farther from the light incident side had smaller groove depths.

layer 1>layer 2>...>layer N−1>layer N (N is an integer greater than or equal to 2)

At groove depths below $\lambda/8/n'$, however, the asperities on the first through N-th layers (information planes) yet preferably had groove depths as shown in the expression below, or such that the asperities on layers farther from the light incident side have greater groove depths which are closer to $\lambda/8/n'$.

layer 1<layer 2<...<layer N−1<layer N (N is an integer greater than or equal to 2)

With respect to the groove depth of L0, 5% or greater differences in the groove depths of the asperities favorably eliminated decision errors. Differences of 10% or greater yet preferably offered resistance to environmental changes.

Moreover, the same effects were obtained by varying the asperities in both groove width and groove depth. For example, when a double-layered medium is formed on a substrate having n' of 1.62, the above-mentioned asperities of L0 and L1 are formed in different constant groove widths of 0.37 μm and 0.38 μm, and different groove depths of 43 nm ($\lambda/5.9/n'$) and 42 nm ($\lambda/6.0/n'$), respectively. This provides L0 and L1 with different TR error signal modulations of 375 mV and 390 mV, respectively. This difference allows a layer judgment.

With respect to the signal modulation of L0, 5% or greater differences in modulation resulting from changes to the groove widths and groove depths of the asperities favorably eliminated decision errors. Differences of 10% or greater yet preferably offered resistance to environmental changes.

The same effects were obtained by changing the corner shapes of the above-mentioned asperities. Changing the corner shapes of the asperities from one layer to another establishes a difference in TR error signal modulation. This difference allows a layer judgment. Corner shapes, in the case of L0, refer to the shapes of the corners of the substrate surface (S0) as shown in FIG. 3. For L1, they refer to the shapes of the corners of the surface of the spacer layer (S1).

Layers farther from the light incident side are under higher effects of the layers on the light incident side, and have greater noise in their TR error signals. It was thus preferable that the above-described asperities on the 1st through N-th layers (information planes) had smoother corner shapes as getting farther from the light incident side. The corner shapes of the asperities may be combined with the groove widths and/or the groove depths of the asperities to change the TR error signal modulations.

Moreover, the same effects were obtained by shaping the asperities uniformly while laminating the films of the layers so as to have such structures as show different reflectivities when measured by the detector. Changing the reflectivities from one layer to another establishes a difference in TR error signal modulation. This difference allows a layer judgment.

Layers farther from the light incident side are under higher effects of the layers on the light incident side, and have greater noise in their TR error signals. It was thus preferable that the 1st through N-th layers (information planes) increased in reflectivity as getting farther from the light incident side. With respect to the reflectivity of L0, 5% or greater differences in the reflectivity favorably eliminated decision errors. Differences of 10% or greater yet preferably offered resistance to environmental changes. The above-mentioned reflectivities may be combined with the shapes of the asperities to change the TR error signal modulations.

Figure 13:
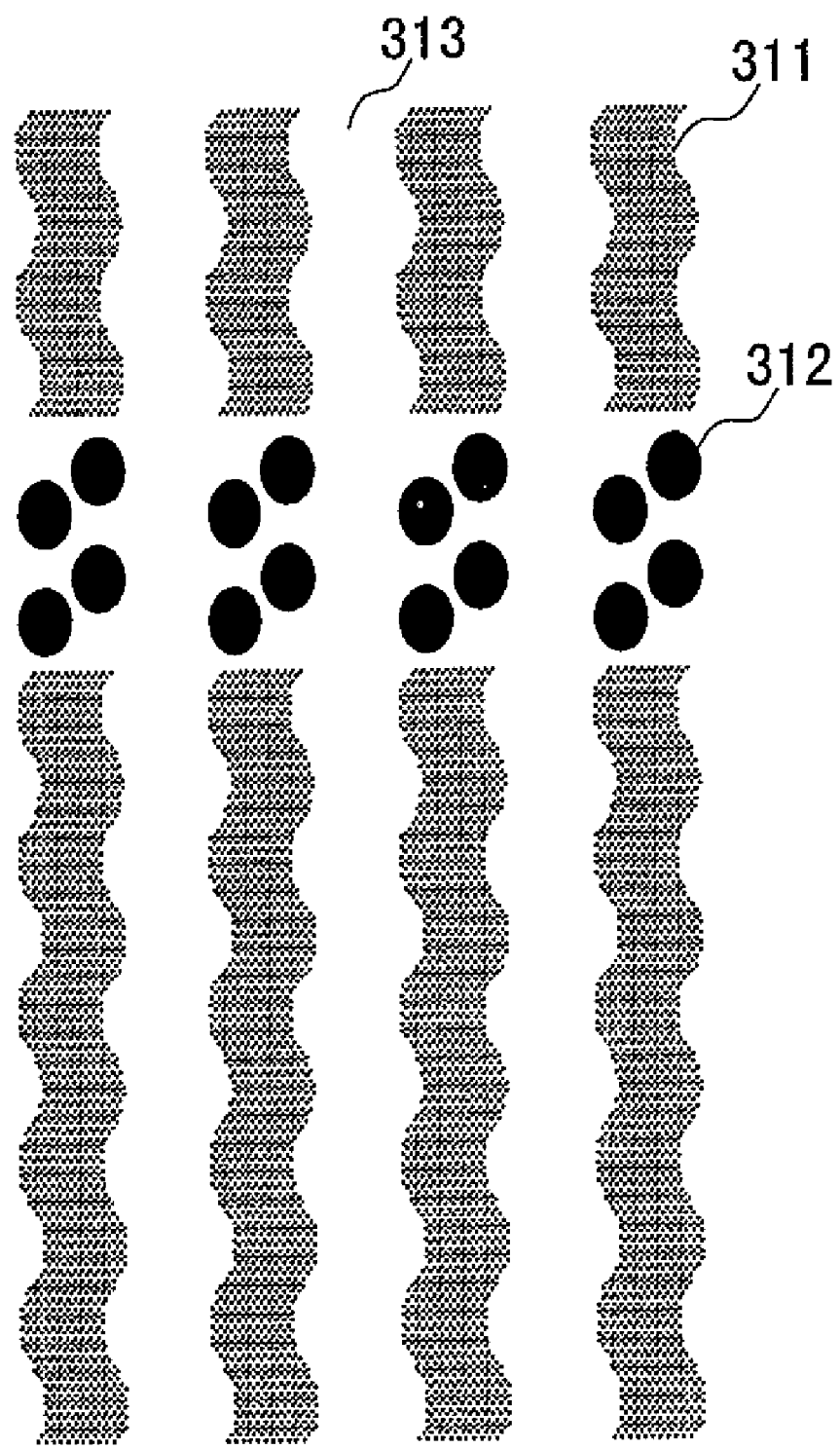
FIG. 13 is a schematic explanatory diagram showing discontinuous asperities of the information recording medium according to the present invention.
Figure 14:
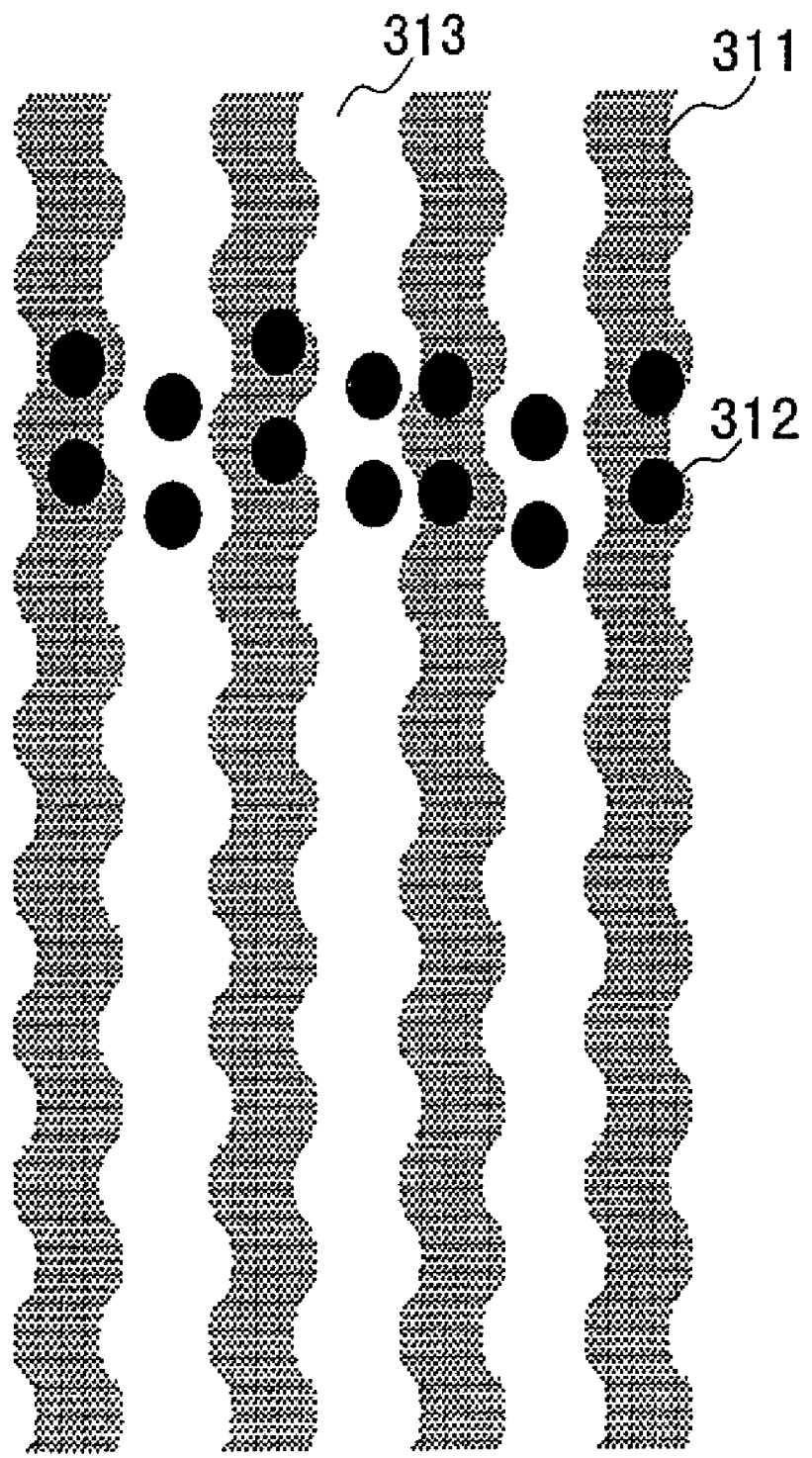
FIG. 14 is a schematic explanatory diagram showing continuous asperities of the information recording medium according to the present invention.

The effects of the present invention were obtained in any of the cases where the asperities were formed of groove portions 311 and land portions 313 which are discontinued by pits 312 as shown in FIG. 13, where the asperities were discontinued by the switching areas of land portions and groove portions, and where the asperities were formed of continuous groove portions 311 and land portions 313 as shown in FIG. 14.

Figure 15:
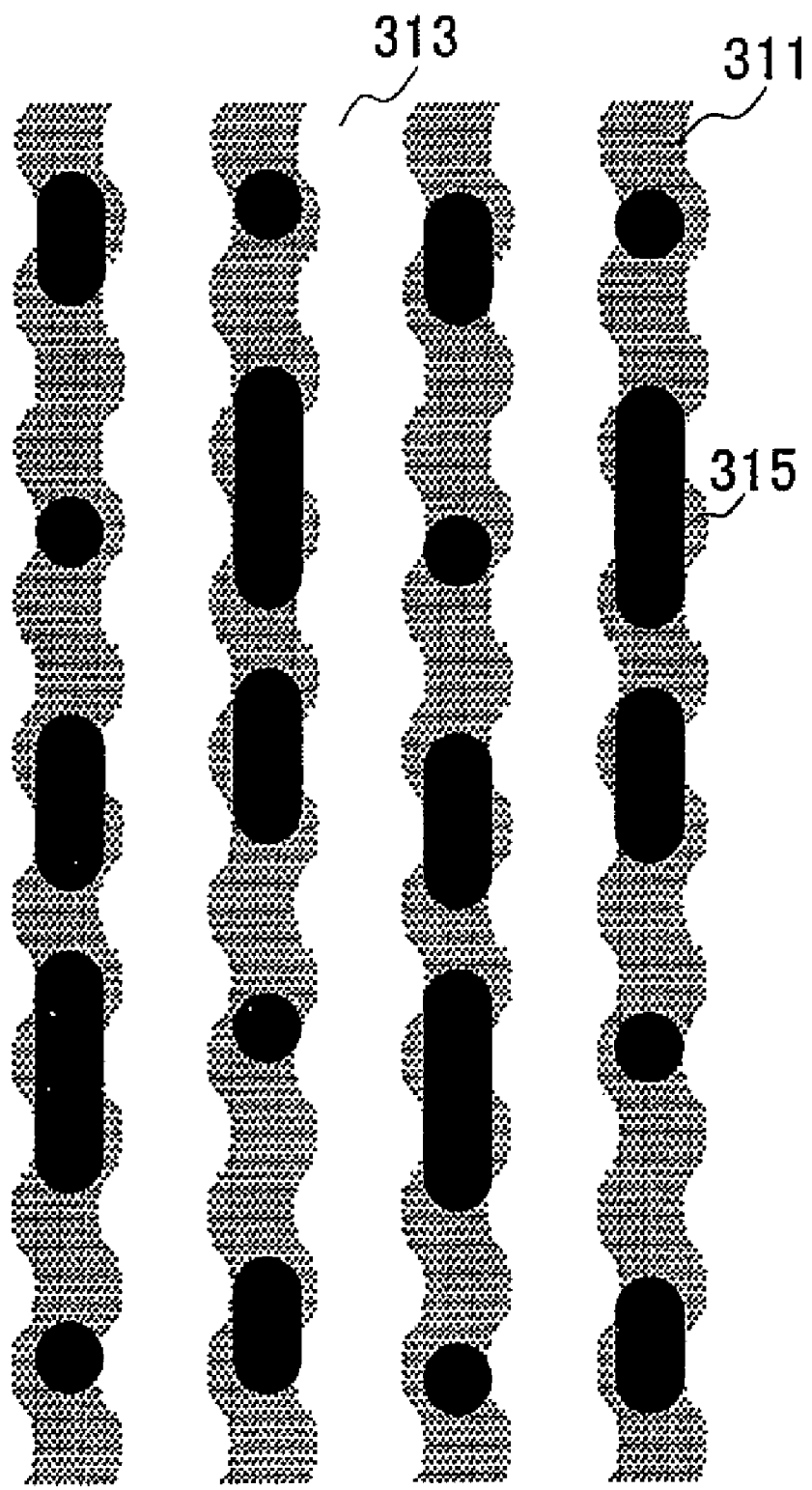
FIG. 15 is a schematic explanatory diagram showing a method for recording on groove portions of the information recording medium according to the present invention.
Figure 16:
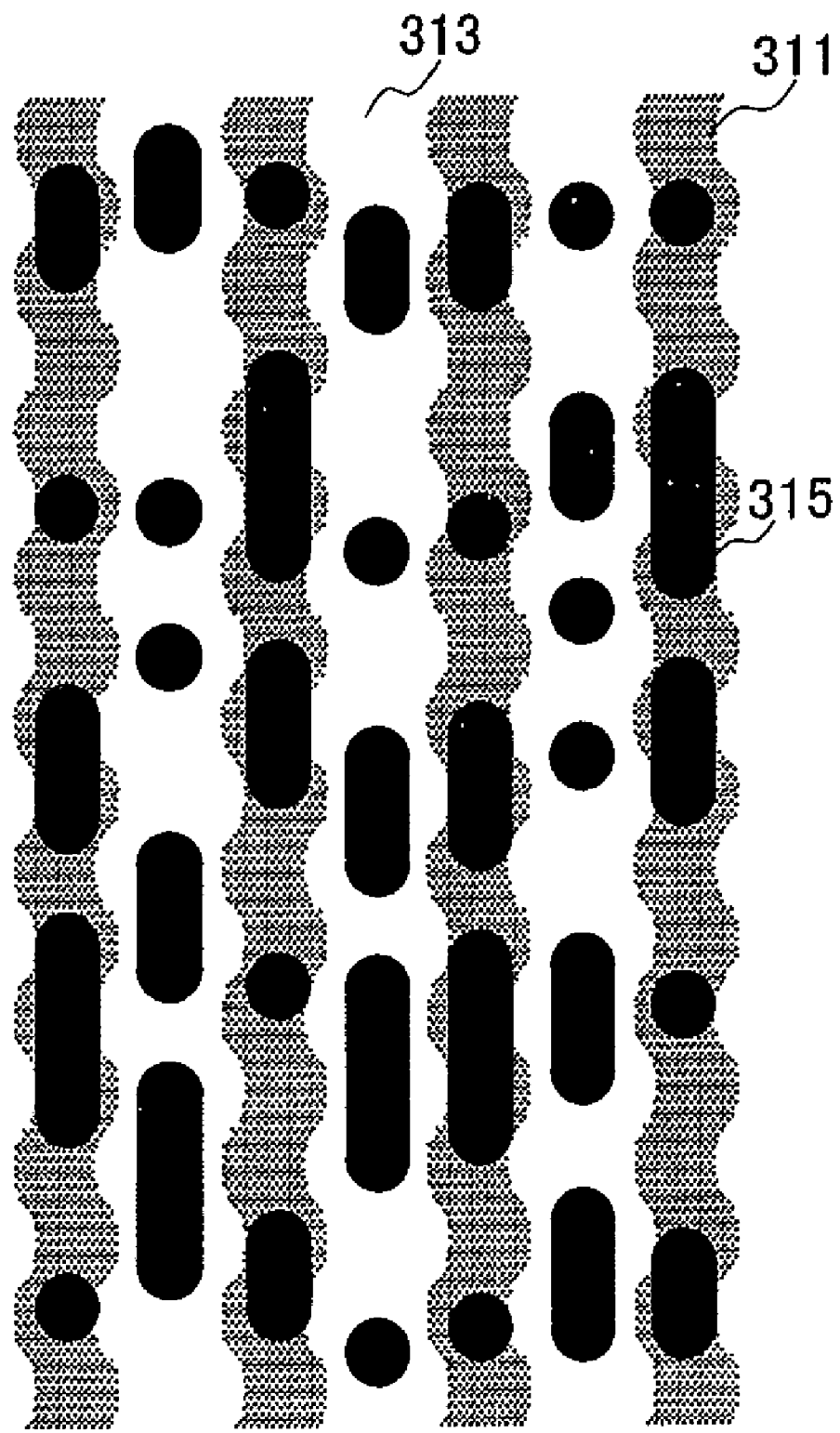
FIG. 16 is a schematic explanatory diagram showing a method for recording on groove portions and land portions of the information recording medium according to the present invention.

Furthermore, the effects were also obtained in either of the cases where marks 315 are recorded on either groove portions 311 or land portions 313 alone as shown in FIG. 15, and where the marks 315 are recorded on both the groove portions 311 and the land portions 313 as shown in FIG. 16. When the marks 315 are exclusively recorded on the groove portions 311, the groove widths described above apply to the widths of the groove portions alone. When the marks 315 are exclusively recorded on the land portions 313, the groove widths descried above apply to the widths of the land portions alone. In the method of recording the marks 315 on both the groove portions 311 and the land portions 313, groove widths are defined as shown in FIG. 3.

Embodiment 2

Figure 17:
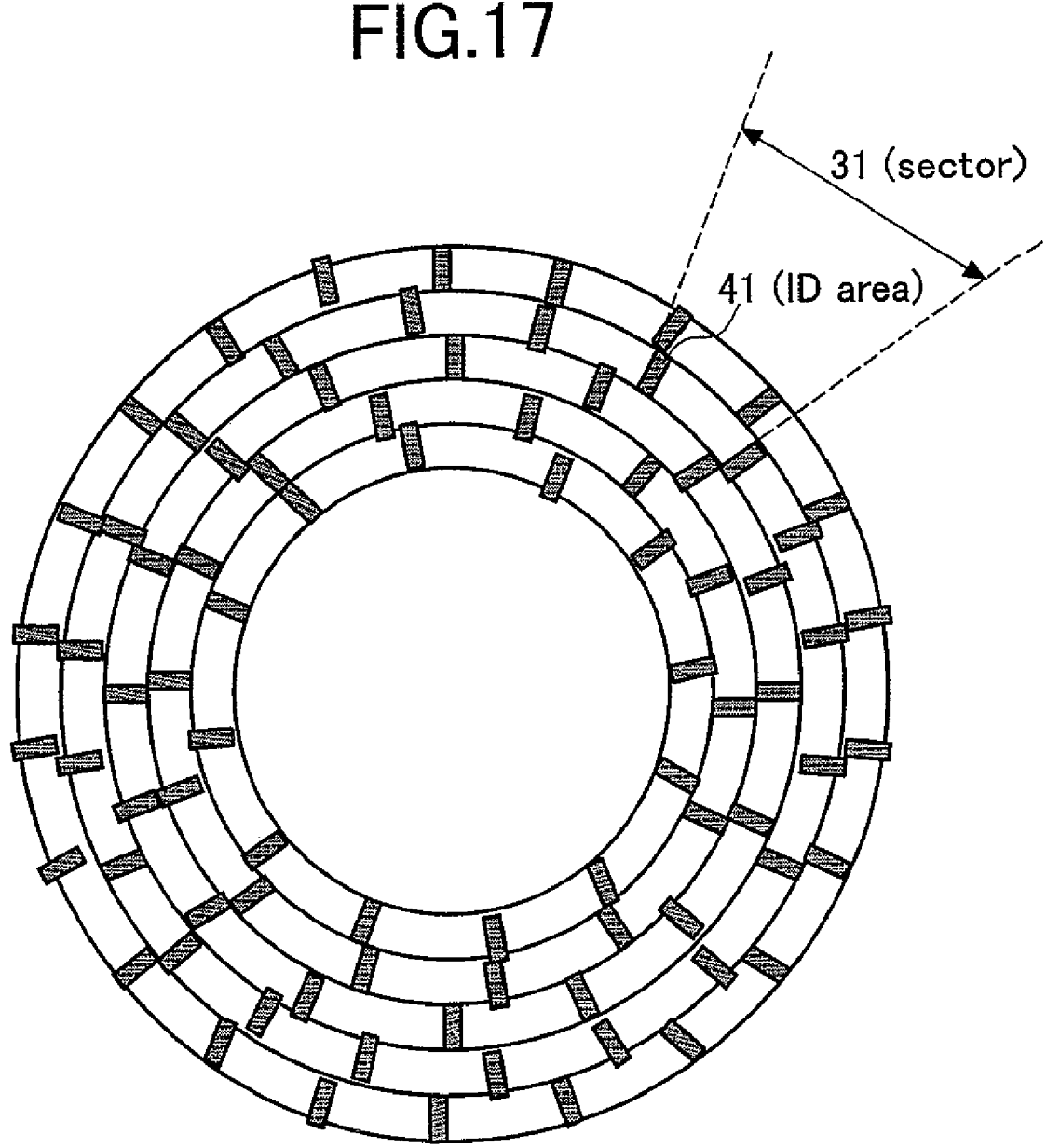
FIG. 17 is a schematic diagram showing an example of sector layout in the information recording medium according to the present invention.
Figure 18:
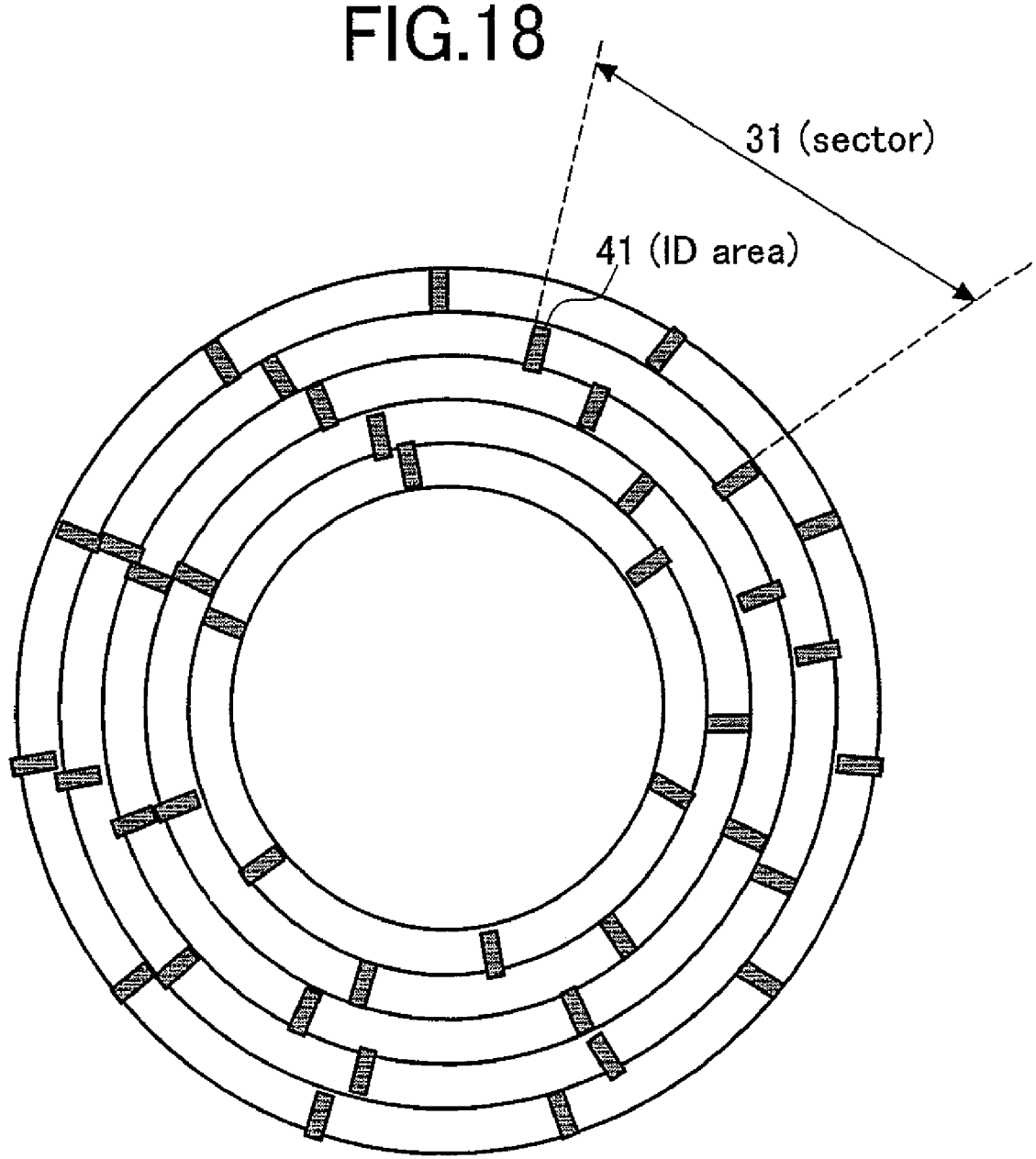
FIG. 18 is a schematic diagram showing an example of sector layout in the information recording medium according to the present invention.
Figure 19:
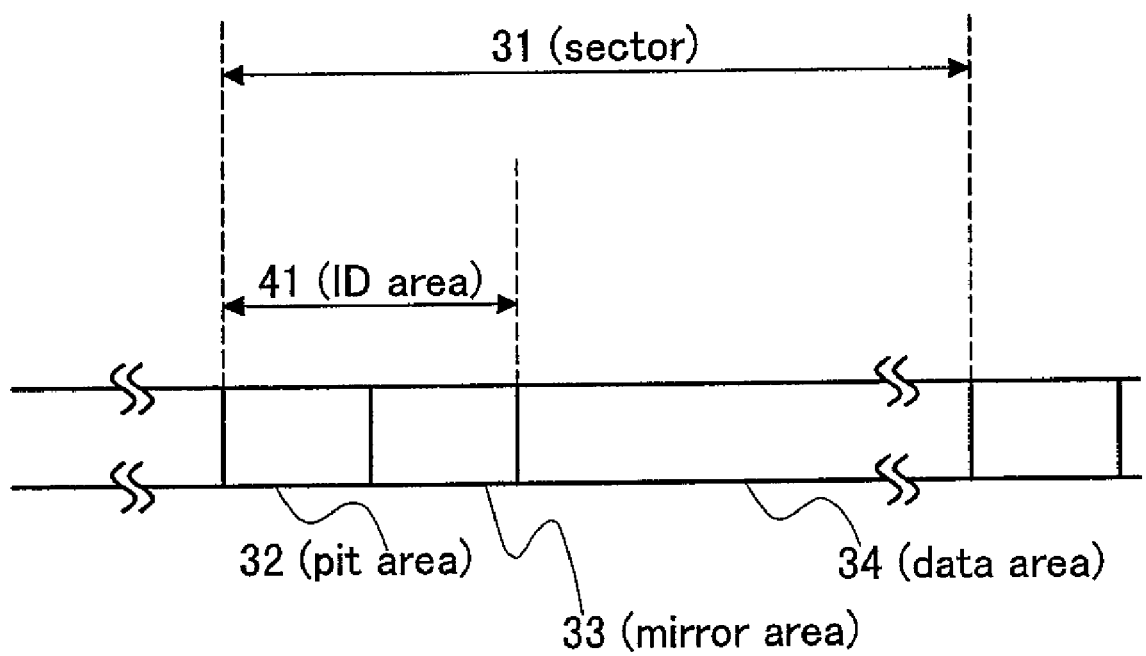
FIG. 19 is a diagram showing the details of a sector in the information recording medium according to the present invention.

FIGS. 17 and 18 are schematic diagrams showing the sector layouts on information planes of an information recording medium. As can be seen, information planes are recorded and reproduced in steps of some determined amounts of information. Each of these divided blocks is referred to as a sector. FIG. 19 shows an overview of a sector. A sector 31 comprises at least one ID area 41 and at least one data area 34. The ID area 41 contains address information, synchronization information, and the like. The ID area 41 consists of a pit area 32 and a mirror area 33. The pit area 32 has pits which store the address information, synchronization information, and the like. The mirror area 33 has no pit.

(Recording/Reproducing Method)

Figure 21:
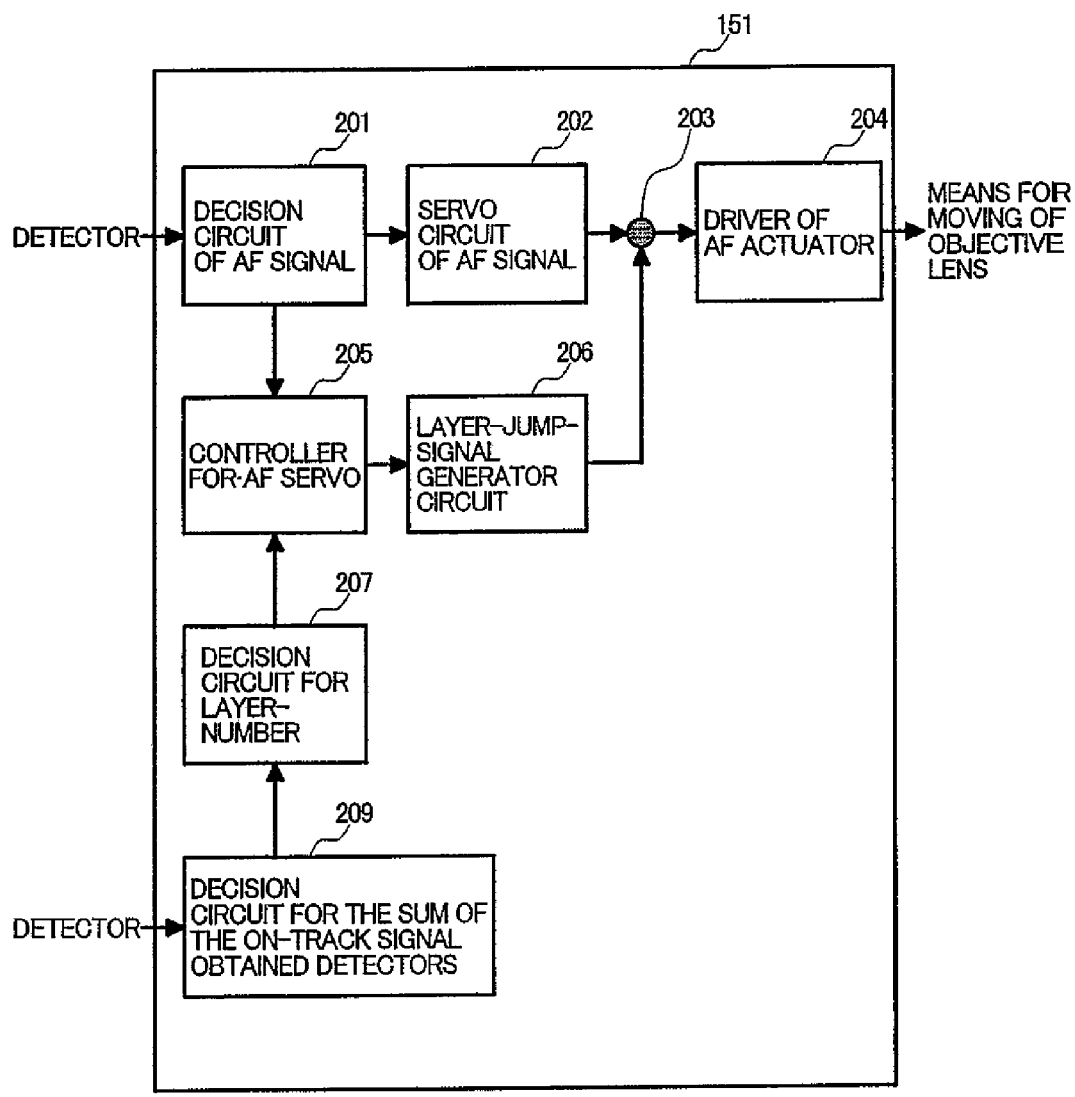
FIG. 21 is a detailed diagram of a servo controller, showing another example of the apparatus for recording/reproducing an information recording medium according to the present invention.

A recording/reproducing apparatus was fabricated by modifying the servo controller 151 of the recording/reproducing apparatus described in the embodiment 1. FIG. 20 is a principle diagram, and FIG. 21 is a detailed diagram of the servo controller.

The servo controller 151 includes a decision circuit 201 of auto focus (AF) signal. An AF error signal detected therein is sent to a servo circuit 202 of AF signal so that a signal is transmitted to a driver 204 of AF actuator through a switch 203. Meanwhile, the AF error signal is transmitted to a controller 205 for AF servo, informing of focusing on a layer (information plane). Reproduced signals at data areas coming into focus are measured for a sum level by a decision circuit 209 for the sum level of reproduced signals. The measurement is transmitted to a decision circuit 207 for layer-number. The layer number of the layer in focus is determined and transmitted to the controller 205. Here, if a proper layer is in focus, no layer jump is required. In the case of an improper layer, a signal for making a jump to the proper layer is generated by a layer-jump-signal generator circuit 206. The signal is transmitted through the switches 203 to the driver 204 for layer jump. These steps are repeated until the proper layer comes into focus.

It can be seen that when the medium having layers with different sum levels of reproduced signals is measured for the sum levels of reproduced signals by the decision circuit 209 before layer judgment, the layer number can be determined as shown in FIG. 20 and the proper layer can be accessed and recorded with reliability. Besides, there is the advantage that recording access time is extremely short even when compared with a method of making a layer judgment by reading information from the pit areas of the substrate after tracking.

It is also apparent that when the medium having layers with different sum levels of reproduced signals is measured for the sum levels of reproduced signals by the decision circuit 209 before layer judgment, the layer number can be determined as shown in FIG. 20 and the proper layer can be accessed and reproduced with reliability. Besides, there is the advantage that reproducing access time is extremely short even when compared with a method of making a layer judgment by reading information from the pit areas of the substrate after tracking.

The data areas, pit areas, and mirror areas are distinguished which are which, and detected for sum levels by the system controller 150, on the basis of reflectivity levels and/or timing. For signal modulations and signal frequencies, the data areas, pit areas, and mirror areas are also distinguished and detected by the system controller 150.

Layers farther from the light incident side are under higher effects of the layers on the light incident side, and have greater noise in their reproduced signals. It was thus preferable that the reproduced signals of the first through N-th layers (information planes) at data areas had sum levels as shown in the expression below, or such that layers farther from the light incident side had greater sum levels of reproduced signals at data areas.

layer 1<layer 2< . . . <layer N−1<layer N (N is an integer greater than or equal to 2)

With respect to the sum level of reproduced signals at data areas of L0, 5% or greater differences in sum level favorably eliminated decision errors. Differences of 10% or greater yet preferably offered resistance to environmental changes.

At the time of access, reproducing light of constant intensity is applied to detect the sum levels of reproduced signals at data areas for the sake of layer number determination. Then, it is preferable to provide means for optimizing the intensity of the reproduced signals at data areas on each layer after a jump to the proper layer, for information can be recorded and reproduced with greater S/N (signal to noise ratio).

(Characteristics of Information Recording Medium)

The medium having layers with different sum levels of reproduced signals at data areas can be fabricated by changing the shapes of the asperities which are made of continuous or partially-continuous grooves formed in the recording tracks on the information planes. In the case of a double-layered medium, for example, the above-mentioned asperities are formed in a constant groove depth of 42 nm, with different groove widths of 0.36 μm and 0.38 μm for L0 and L1, respectively. It follows that the reproduced signals at data areas of L0 and L1 have different sum levels of 97 mV and 102 mV, respectively. This difference allows a layer judgment.

Layers farther from the light incident side are under higher effects of the layers on the light incident side, and have greater noise in their reproduced signals at data areas. It was thus preferable that the asperities on the first through N-th layers (information planes) had groove widths as shown in the expression below, or such that the asperities on layers farther from the light incident side had greater groove widths.

layer 1<layer 2< . . . <layer N−1<layer N (N is an integer greater than or equal to 2)

With respect to the groove width of L0, 5% or greater differences in the groove widths of the asperities favorably eliminated decision errors. Differences of 10% or greater yet preferably offered resistance to environmental changes.

The same effects were obtained by varying the asperities in groove depth instead of groove width. For example, when a double-layered medium is formed on a substrate having n' of 1.62, the above-mentioned asperities are formed in a constant groove width of 0.38 μm, with different groove depths of 45 nm ($\lambda/5.6/n'$) and 42 nm ($\lambda/6.0/n'$) for L0 and L1, respectively. It follows that the reproduced signals at data areas of L0 and L1 have different sum levels of 97 mV and 102 mV, respectively. This difference allows a layer judgment.

Layers farther from the light incident side are under higher effects of the layers on the light incident side, and have greater noise in their reproduced signals at data areas. It was thus preferable that the asperities on the first through N-th layers (information planes) had groove depths as shown in the expression below, or such that the asperities on layers farther from the light incident side had smaller groove depths.

layer 1>layer 2> . . . >layer N−1>layer N (N is an integer greater than or equal to 2)

At groove depths below $\lambda/8/n'$, however, the asperities on the first through N-th layers (information planes) yet preferably had groove depths as shown in the expression below, or such that the asperities on layers farther from the light incident side have greater groove depths which are closer to $\lambda/8/n'$.

layer 1<layer 2< . . . <layer N−1<layer N (N is an integer greater than or equal to 2)

With respect to the groove depth of L0, 5% or greater differences in the groove depths of the asperities favorably eliminated decision errors. Differences of 10% or greater yet preferably offered resistance to environmental changes.

Moreover, the same effects were obtained by varying the asperities in both groove width and groove depth. For example, when a double-layered medium is formed on a substrate having n' of 1.62, the above-mentioned asperities of L0 and L1 are formed in different constant groove widths of 0.37 μm and 0.38 μm, and different groove depths of 43 nm (λ/5.9/n') and 42 nm (λ/6.0/n'), respectively. It follows that the reproduced signals at data areas of L0 and L1 have different sum levels of 97 mV and 102 mV, respectively. This difference allows a layer judgment.

With respect to the sum level of reproduced signals at data areas of L0, 5% or greater differences in sum level resulting from changes to the groove widths and groove depths of the asperities favorably eliminated decision errors. Differences of 10% or greater yet preferably offered resistance to environmental changes.

The same effects were obtained by changing the corner shapes of the above-mentioned asperities. Changing the corner shapes of the asperities from one layer to another establishes a difference in the sum level of reproduced signals at data areas. This difference allows a layer judgment.

Layers farther from the light incident side are under higher effects of the layers on the light incident side, and have greater noise in their reproduced signals at data areas. It was thus preferable that the above-described asperities on the 1st through N-th layers (information planes) had smoother corner shapes as getting farther from the light incident side. The corner shapes of the asperities may be combined with the groove widths and/or the groove depths of the asperities to change the sum levels of reproduced signals at data areas.

Moreover, the same effects were obtained by shaping the asperities uniformly while laminating the films of the layers so as to have such structures as show different reflectivities when measured by the detector. Changing the above-mentioned reflectivities from one layer to another establishes a difference in the sum level of reproduced signals at data areas. This difference allows a layer judgment.

Layers farther from the light incident side are under higher effects of the layers on the light incident side, and have greater noise in their reproduced signals. It was thus preferable that the 1st through N-th layers (information planes) increased in reflectivity as getting farther from the light incident side. With respect to the reflectivity of L0, 5% or greater differences in the reflectivity favorably eliminated decision errors. Differences of 10% or greater yet preferably offered resistance to environmental changes. The above-mentioned reflectivities may be combined with the shapes of the asperities to change the sum levels of reproduced signals at data areas.

In respects other than those described above, the present embodiment is identical to the embodiment 1.

Embodiment 3

Recording/Reproducing Method

Figure 23:
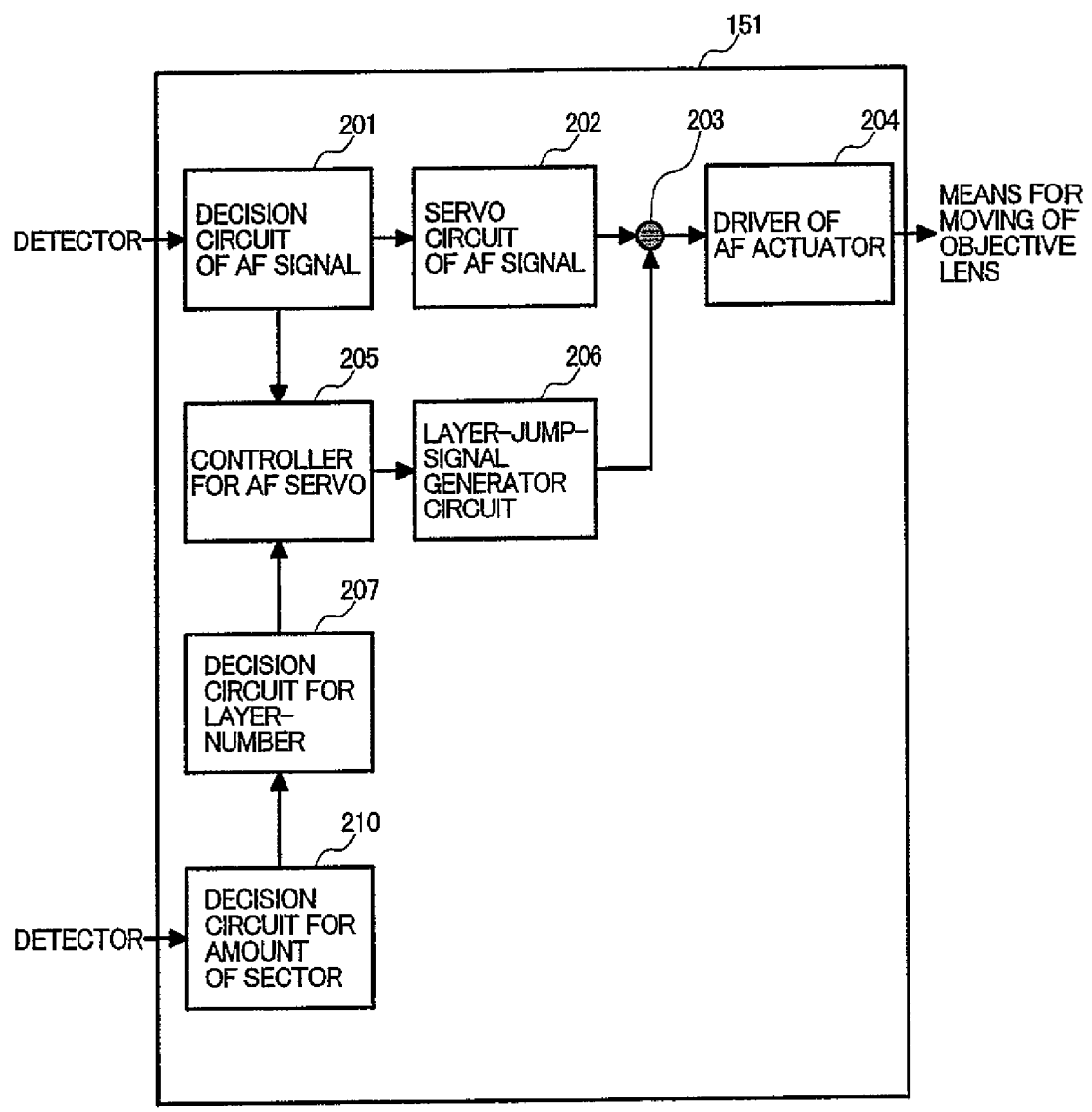
FIG. 23 is a detailed diagram showing another example of the servo controller in the apparatus for recording/reproducing an information recording medium according to the present invention.

A recording/reproducing apparatus was fabricated by modifying the servo controller 151 of the recording/reproducing apparatus described in the embodiment 1. FIG. 22 is a principle diagram, and FIG. 23 is a detailed diagram of the servo controller.

The servo controller 151 includes a decision circuit 201 of auto focus (AF) signal. An AF error signal detected therein is sent to a servo circuit 202 of AF signal so that a signal is transmitted to a driver 204 of AF actuator through a switch 203. Meanwhile, the AF error signal is transmitted to a controller 205 for AF servo, informing of focusing on a layer (information plane). In a decision circuit 210 for the number of sectors, reproduced signals coming into focus are measured for the number of sectors detected within a predetermined time. The measurement is transmitted to a decision circuit 207 for layer-number. The layer number of the layer in focus is determined and transmitted to the controller 205. Here, if a proper layer is in focus, no layer jump is required. In the case of an improper layer, a signal for making a jump to the proper layer is generated by a layer-jump-signal generator circuit 206. The signal is transmitted through the switches 203 to the driver 204 for layer jump. These steps are repeated until the proper layer comes into focus.

It can be seen that when the medium having layers with different numbers of sectors to be detected within a predetermined time is measured for the number of sectors detected within a predetermined time by the decision circuit 210 before layer judgment, the layer number can be determined as shown in FIG. 22 and the proper layer can be accessed and recorded with reliability. Besides, there is the advantage that recording access time is extremely short even when compared with a method of making a layer judgment by reading information from the pit areas of the substrate after tracking.

It is also apparent that when the medium having layers with different numbers of sectors to be detected within a predetermined time is measured for the number of sectors detected within a predetermined time by the decision circuit 210 before layer judgment, the layer number can be determined as shown in FIG. 22 and the proper layer can be accessed and reproduced with reliability. Besides, there is the advantage that reproducing access time is extremely short even when compared with a method of making a layer judgment by reading information from the pit areas of the substrate after tracking.

Since layers farther from the light incident side are under higher effects of the layers on the light incident side and require ID areas in proportion to the numbers of sectors, layers closer to the light incident side suitably have smaller numbers of sectors. It was thus preferable that the first through N-th layers (information planes) had the numbers of sectors as shown in the following expression, or such that layers farther from the light incident side had greater numbers of sectors.

$$\text{layer 1} < \text{layer 2} < \ldots < \text{layer N-1} < \text{layer N}$$

(N is an integer greater than or equal to 2)

With respect to the number of sectors of L0, 5% or greater differences in the number of sectors favorably eliminated decision errors. Differences of 10% or greater yet preferably offered resistance to environmental changes. At the time of access, the layer number is determined by detecting the numbers of sectors under a constant number of revolutions. The number of revolutions may be changed after a jump to the proper layer.

(Characteristics of Information Recording Medium)

The medium having layers with different numbers of sectors can be fabricated by changing the shapes of the asperities which are made of continuous or partially-continuous grooves formed in the recording tracks on the information planes. In the case of a double-layered medium, for example, the continuous portions of the asperities can be changed in length so that L1 has the sector layout of FIG. 17 and L0 the sector layout of FIG. 18. This establishes a difference between the numbers of sectors of L0 and L1. Here, on the outermost circumferences of 58 mm in radius, 22 sectors and 11 sectors are detected from L1 and L0, respectively, under a linear velocity of 9 m/s and a sector number measuring time of 40 ms. This difference allows a layer judgment.

Since layers farther from the light incident side are under higher effects of the layers on the light incident side and require ID areas in proportion to the numbers of sectors, layers closer to the light incident side suitably have smaller numbers of sectors. It was thus preferable that the first through N-th layers (information planes) had the numbers of sectors as shown in the following expression, or such that layers farther from the light incident side had greater numbers of sectors.

layer 1<layer 2< . . . <layer N−1<layer N (N is an integer greater than or equal to 2)

With respect to the number of sectors of L0, 5% or greater differences in the number of sectors favorably eliminated decision errors. Differences of 10% or greater yet preferably offered resistance to environmental changes.

Figure 24:
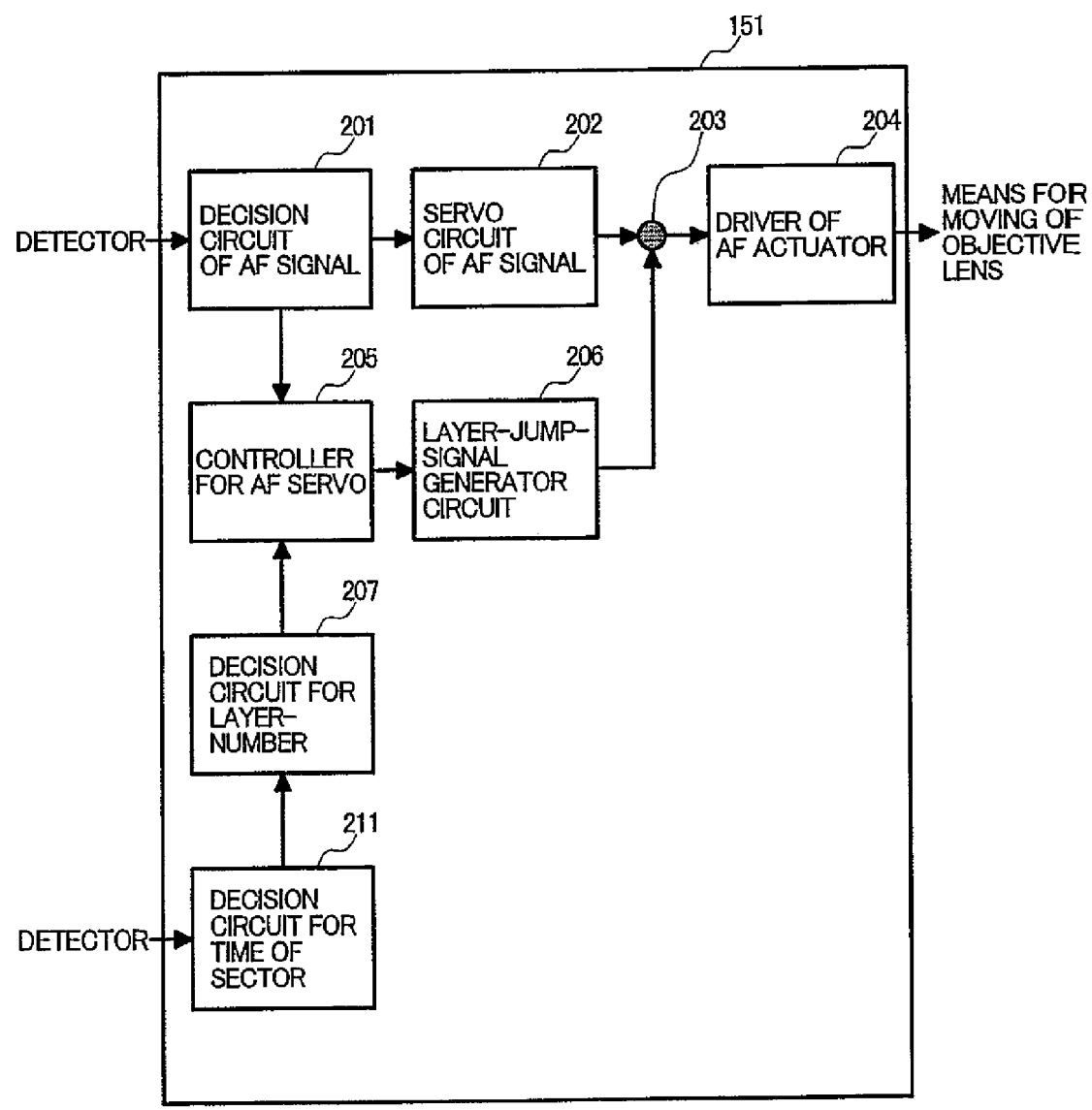
FIG. 24 is a detailed diagram showing another example of the servo controller in the apparatus for recording/reproducing an information recording medium according to the present invention.

The same effects were obtained by measuring the length of a sector, i.e. the time elapsed from the beginning of a sector to the beginning of the next sector, or a mean value of the elapsed times of a plurality of sectors instead of the numbers of sectors on the asperities. In this case, a servo controller shown in FIG. 24 is used. The servo controller 151 includes a decision circuit 201 of auto focus (AF) signal. An AF error signal detected therein is sent to a servo circuit 202 of AF signal so that a signal is transmitted to a driver 204 of AF actuator through a switch 203. Meanwhile, the AF error signal is transmitted to a controller 205 for AF servo, informing of focusing on a layer (information plane). In a decision circuit 211 for time of sector, reproduced signals coming into focus are measured for the time that elapses from the beginning of a sector to the beginning of the next sector, or a mean value of the elapsed times of a plurality of sectors. The measurement is transmitted to a decision circuit 207 for layer-number. The layer number of the layer in focus is determined and transmitted to the controller 205. Here, if a proper layer is in focus, no layer jump is required. In the case of an improper layer, a signal for making a jump to the proper layer is generated by a layer-jump-signal generator circuit 206. The signal is transmitted through the switches 203 to the driver 204 for layer jump. These steps are repeated until the proper layer comes into focus.

It can be seen that when the medium having layers that differ from each other in the elapsed time from the beginning of a sector to the beginning of the next sector or in the mean value of elapsed times of a plurality of sectors is measured for the number of sectors detected within a predetermined time by the decision circuit 211 before layer judgment, the layer number can be determined and the proper layer can be accessed and recorded with reliability. Besides, there is the advantage that recording access time is extremely short even when compared with a method of making a layer judgment by reading information from the pit areas of the substrate after tracking.

It is also apparent that when the medium having layers that differ from each other in the elapsed time from the beginning of a sector to the beginning of the next sector or in the mean value of elapsed times of a plurality of sectors is measured for the number of sectors detected within a predetermined time by the decision circuit 211 before layer judgment, the layer number can be determined and the proper layer can be accessed and reproduced with reliability. Besides, there is the advantage that reproducing access time is extremely short even when compared with a method of making a layer judgment by reading information from the pit areas of the substrate after tracking.

Here, on the outermost circumferences of 58 mm in radius, L1 and L0 have different sector lengths of 33.1 mm and 16.55 mm, with different sector clearance times of 3.6 ms and 1.8 ms, respectively. These differences allow a layer judgment.

Since layers farther from the light incident side are under higher effects of the layers on the light incident side and require ID areas in proportion to the numbers of sectors, layers closer to the light incident side suitably have greater sector lengths. It was thus preferable that the first through N-th layers (information planes) had sector lengths as shown in the following expression, or such that layers farther from the light incident side had smaller sector lengths.

layer 1>layer 2> . . . >layer N−1>layer N (N is an integer greater than or equal to 2)

With respect to the sector length of L0, 5% or greater differences in sector length favorably eliminated decision errors. Differences of 10% or greater preferably offered resistance to environmental changes. For higher measuring accuracy, measuring a plurality of sectors for the numbers of sectors and the lengths of sectors to determine totals and/or mean values was preferable to measuring single sectors.

In respects other than those described above, the present embodiment is identical to the embodiments 1 and 2.

Embodiment 4

Recording/Reproducing Method

Figure 26:
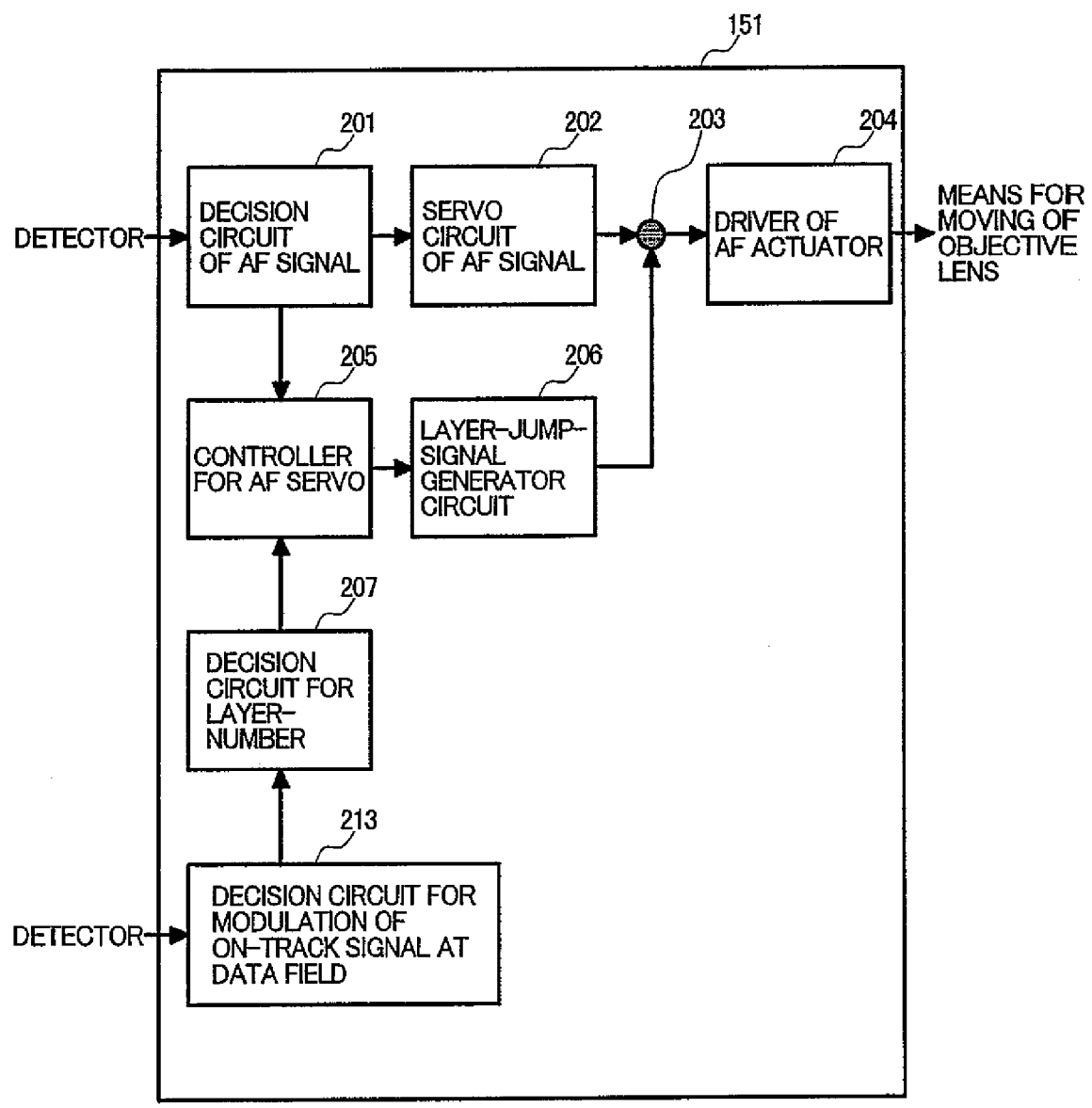
FIG. 26 is a detailed diagram showing another example of the servo controller in the apparatus for recording/reproducing an information recording medium according to the present invention.

A recording/reproducing apparatus was fabricated by modifying the servo controller 151 of the recording/reproducing apparatus described in the embodiment 1. FIG. 25 is a principle diagram, and FIG. 26 is a detailed diagram of the servo controller.

The servo controller 151 includes a decision circuit 201 of auto focus (AF) signal. An AF error signal detected therein is sent to a servo circuit 202 of AF signal so that a signal is transmitted to a driver 204 of AF actuator through a switch 203. Meanwhile, the AF error signal is transmitted to a controller 205 for AF servo, informing of focusing on a layer (information plane). Reproduced signals at data areas coming into focus are measured for modulation by a decision circuit 213 for the modulation of reproduced signals at data areas. The measurement is transmitted to a decision circuit 207 for layer-number. The layer number of the layer in focus is determined and transmitted to the controller 205. Here, if a proper layer is in focus, no layer jump is required. In the case of an improper layer, a signal for making a jump to the proper layer is generated by a layer-jump-signal generator circuit 206. The signal is transmitted through the switches 203 to the driver 204 for layer jump. These steps are repeated until the proper layer comes into focus.

It can be seen that when the medium having layers with different reproduced signal modulations at data areas is measured by the decision circuit 213 before layer judgment, the layer number can be determined as shown in FIG. 25 and the proper layer can be accessed and recorded with reliability. Besides, there is the advantage that recording access time is extremely short even when compared with a method of making a layer judgment by reading information from the pit areas of the substrate after tracking.

It is also apparent that when the medium having layers with different reproduced signal modulations at data areas is measured by the decision circuit 213 before layer judgment, the layer number can be determined as shown in FIG. 25 and the proper layer can be accessed and reproduced with reliability.

Besides, there is the advantage that reproducing access time is extremely short even when compared with a method of making a layer judgment by reading information from the pit areas of the substrate after tracking.

Layers farther from the light incident side are under higher effects of the layers on the light incident side, and have greater noise in their reproduced signals. It was thus preferable that the reproduced signals of the first through N-th layers (information planes) at data areas had modulations as shown in the expression below, or such that layers farther from the light incident side had greater modulations of reproduced signals at data areas.

$$\text{layer 1} < \text{layer 2} < \ldots < \text{layer N-1} < \text{layer N}$$

(N is an integer greater than or equal to 2)

With respect to the modulation of reproduced signals at data areas of L0, 5% or greater differences in modulation favorably eliminated decision errors. Differences of 10% or greater yet preferably offered resistance to environmental changes.

At the time of access, reproducing light of constant intensity is applied to detect the modulations of reproduced signals at data areas for the sake of layer number determination. Then, it is preferable to provide means for optimizing the intensity of the reproduced signals of each layer after a jump to the proper layer, for information can be recorded and reproduced with greater S/N (signal to noise ratio).

(Characteristics of Information Recording Medium)

The medium having layers with different reproduced signal modulations at data areas can be fabricated by changing the shapes of the asperities which are made of continuous or partially-continuous grooves formed in the recording tracks on the information planes. In the case of a double-layered medium, for example, the above-mentioned asperities are formed in a constant groove depth of 42 nm, with different groove widths of 0.36 μm and 0.38 μm for L0 and L1, respectively. It follows that the reproduced signals at data areas of L0 and L1 have different modulations of 41 mV and 39 mV, respectively. This difference allows a layer judgment.

Layers farther from the light incident side are under higher effects of the layers on the light incident side, and have greater noise in their reproduced signals. It was thus preferable that the asperities on the first through N-th layers (information planes) had groove widths as shown in the expression below, or such that the asperities on layers farther from the light incident side had greater groove widths.

$$\text{layer 1} < \text{layer 2} < \ldots < \text{layer N-1} < \text{layer N}$$

(N is an integer greater than or equal to 2)

With respect to the groove width of L0, 5% or greater differences in the groove widths of the asperities favorably eliminated decision errors. Differences of 10% or greater yet preferably offered resistance to environmental changes.

The same effects were obtained by varying the asperities in groove depth instead of groove width. For example, when a double-layered medium is formed on a substrate having n' of 1.62, the above-mentioned asperities are formed in a constant groove width of 0.38 μm, with different groove depths of 45 nm ($\lambda/5.6/n'$) and 42 nm ($\lambda/6.0/n'$) for L0 and L1, respectively. It follows that the reproduced signals at data areas of L0 and L1 have different modulations of 39 mV and 41 mV, respectively. This difference allows a layer judgment.

Layers farther from the light incident side are under higher effects of the layers on the light incident side, and have greater noise in their reproduced signals. It was thus preferable that the asperities on the first through N-th layers (information planes) had groove depths as shown in the expression below, or such that the asperities on layers farther from the light incident side had smaller groove depths.

$$\text{layer 1} > \text{layer 2} > \ldots > \text{layer N-1} > \text{layer N}$$

(N is an integer greater than or equal to 2)

At groove depths below $\lambda/8/n'$, however, the asperities on the first through N-th layers (information planes) yet preferably had groove depths as shown in the expression below, or such that the asperities on layers farther from the light incident side have greater groove depths which are closer to $\lambda/8/n'$.

$$\text{layer 1} < \text{layer 2} < \ldots < \text{layer N-1} < \text{layer N}$$

(N is an integer greater than or equal to 2)

With respect to the groove depth of L0, 5% or greater differences in the groove depths of the asperities favorably eliminated decision errors. Differences of 10% or greater yet preferably offered resistance to environmental changes.

Moreover, the same effects were obtained by varying the asperities in both groove width and groove depth. For example, when a double-layered medium is formed on a substrate having n' of 1.62, the above-mentioned asperities of L0 and L1 are formed in different constant groove widths of 0.37 μm and 0.38 μm, and different groove depths of 43 nm ($\lambda/5.9/n'$) and 42 nm ($\lambda/6.0/n'$), respectively. It follows that the reproduced signals at data areas of L0 and L1 have different modulations of 39 mV and 41 mV, respectively. This difference allows a layer judgment.

With respect to the modulation of reproduced signals at data areas of L0, 5% or greater differences in modulation resulting from changes to the groove widths and groove depths of the asperities favorably eliminated decision errors. Differences of 10% or greater yet preferably offered resistance to environmental changes.

The same effects were obtained by changing the corner shapes of the above-mentioned asperities. Changing the corner shapes of the asperities from one layer to another establishes a difference in the modulation of reproduced signals at data areas. This difference allows a layer judgment.

Layers farther from the light incident side are under higher effects of the layers on the light incident side, and have greater noise in their reproduced signals. It was thus preferable that the above-described asperities on the 1st through N-th layers (information planes) had smoother corner shapes as getting farther from the light incident side. The corner shapes of the asperities may be combined with the groove widths and/or the groove depths of the asperities to change the modulations of reproduced signals at data areas.

Moreover, the same effects were obtained by shaping the asperities uniformly while laminating the films of the layers so as to have such structures as show different reflectivities when measured by the detector. Changing the above-mentioned reflectivities from one layer to another establishes a difference in the modulation of reproduced signals at data areas. This difference allows a layer judgment.

Layers farther from the light incident side are under higher effects of the layers on the light incident side, and have greater noise in their reproduced signals. It was thus preferable that the 1st through N-th layers (information planes) increased in reflectivity as getting farther from the light incident side. With respect to the reflectivity of L0, 5% or greater differences in the reflectivity favorably eliminated decision errors. Differences of 10% or greater yet preferably offered resistance to environmental changes. The above-mentioned reflectivities may be combined with the shapes of the asperities to change the modulations of reproduced signals at data areas.

Embodiment 5

Recording/Reproducing Method

Figure 27:
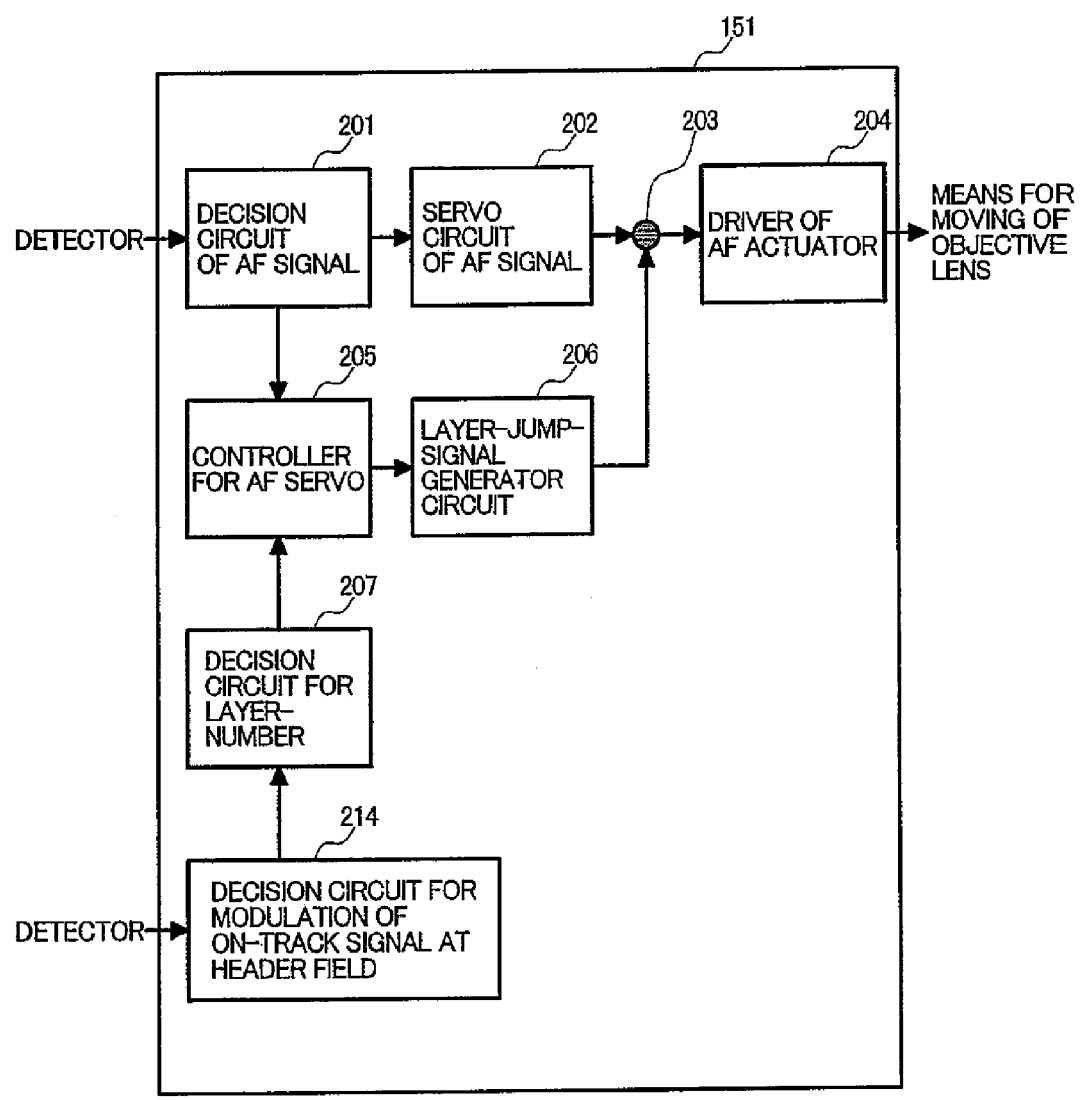
FIG. 27 is a detailed diagram showing another example of the servo controller in the apparatus for recording/reproducing an information recording medium according to the present invention.

Instead of the modulations of reproduced signals at data areas in the embodiment 4, the modulations of reproduced signals at pit areas may be measured to make a layer judgment. FIG. 27 shows a detailed view of the servo controller for this case.

The servo controller 151 includes a decision circuit 201 of auto focus (AF) signal. An AF error signal detected therein is sent to a servo circuit 202 of AF signal so that a signal is transmitted to a driver 204 of AF actuator through a switch 203. Meanwhile, the AF error signal is transmitted to a controller 205 for AF servo, informing of focusing on a layer (information plane). Reproduced signals at pit areas coming into focus are measured for modulation by a decision circuit 214 for the modulation of reproduced signals at pit areas. The measurement is transmitted to a decision circuit 207 for layer-number. The layer number of the layer in focus is determined and transmitted to the controller 205. Here, if a proper layer is in focus, no layer jump is required. In the case of an improper layer, a signal for making a jump to the proper layer is generated by a layer-jump-signal generator circuit 206. The signal is transmitted through the switches 203 to the driver 204 for layer jump. These steps are repeated until the proper layer comes into focus.

It can be seen that when the medium having layers with different reproduced signal modulations at pit areas is measured by the decision circuit 214 before layer judgment, the layer number can be determined and the proper layer can be accessed and recorded with reliability. Besides, there is the advantage that recording access time is extremely short even when compared with a method of making a layer judgment by reading information from the pit areas of the substrate after tracking.

It is also apparent that when the medium having layers with different reproduced signal modulations at pit areas is measured by the decision circuit 214 before layer judgment, the layer number can be determined and the proper layer can be accessed and reproduced with reliability. Besides, there is the advantage that reproducing access time is extremely short even when compared with a method of making a layer judgment by reading information from the pit areas of the substrate after tracking.

Layers farther from the light incident side are under higher effects of the layers on the light incident side, and have greater noise in their reproduced signals. It was thus preferable that the reproduced signals of the first through N-th layers (information planes) at pit areas had modulations as shown in the expression below, or such that layers farther from the light incident side had greater modulations of reproduced signals at pit areas.

layer 1<layer 2<...<layer N−1<layer N (N is an integer greater than or equal to 2)

With respect to the modulation of reproduced signals at pit areas of L0, 5% or greater differences in modulation favorably eliminated decision errors. Differences of 10% or greater yet preferably offered resistance to environmental changes.

At the time of access, reproducing light of constant intensity is applied to detect the modulations of reproduced signals at pit areas for the sake of layer number determination. Then, it is preferable to provide means for optimizing the intensity of the reproduced signals of each layer after a jump to the proper layer, for information can be recorded and reproduced with greater S/N (signal to noise ratio).

(Characteristics of Information Recording Medium)

The medium having layers with different reproduced signal modulations at pit areas can be fabricated by changing the shapes of the asperities which are made of continuous or partially-continuous grooves formed in the recording tracks on the information planes. In the case of a double-layered medium, for example, the above-mentioned asperities are formed in a constant groove depth of 42 nm, with different groove widths of 0.36 μm and 0.38 μm for L0 and L1, respectively. It follows that the reproduced signals at pit areas of L0 and L1 have different modulations of 51 mV and 49 mV, respectively. This difference allows a layer judgment.

Layers farther from the light incident side are under higher effects of the layers on the light incident side, and have greater noise in their reproduced signals. It was thus preferable that the asperities on the first through N-th layers (information planes) had groove widths as shown in the expression below, or such that the asperities on layers farther from the light incident side had greater groove widths.

layer 1<layer 2<...<layer N−1<layer N (N is an integer greater than or equal to 2)

With respect to the groove width of L0, 5% or greater differences in the groove widths of the asperities favorably eliminated decision errors. Differences of 10% or greater yet preferably offered resistance to environmental changes.

The same effects were obtained by varying the asperities in groove depth instead of groove width. For example, when a double-layered medium is formed on a substrate having n' of 1.62, the above-mentioned asperities are formed in a constant groove width of 0.38 μm, with different groove depths of 45 nm ($\lambda/5.6/n'$) and 42 nm ($\lambda/6.0/n'$) for L0 and L1, respectively. It follows that the reproduced signals at pit areas of L0 and L1 have different modulations of 49 mV and 51 mV, respectively. This difference allows a layer judgment.

Layers farther from the light incident side are under higher effects of the layers on the light incident side, and have greater noise in their reproduced signals. It was thus preferable that the asperities on the first through N-th layers (information planes) had groove depths as shown in the expression below, or such that the asperities on layers farther from the light incident side had smaller groove depths.

layer 1>layer 2>...>layer N−1>layer N (N is an integer greater than or equal to 2)

At groove depths below $\lambda/8/n'$, however, the asperities on the first through N-th layers (information planes) yet preferably had groove depths as shown in the expression below, or such that the asperities on layers farther from the light incident side have greater groove depths which are closer to $\lambda/8/n'$.

layer 1<layer 2<...<layer N−1<layer N (N is an integer greater than or equal to 2)

With respect to the groove depth of L0, 5% or greater differences in the groove depths of the asperities favorably eliminated decision errors. Differences of 10% or greater yet preferably offered resistance to environmental changes.

Moreover, the same effects were obtained by varying the asperities in both groove width and groove depth. For example, when a double-layered medium is formed on a substrate having n' of 1.62, the above-mentioned asperities of L0 and L1 are formed in different constant groove widths of 0.37 μm and 0.38 μm, and different groove depths of 43 nm ($\lambda/5.9/n'$) and 42 nm ($\lambda/6.0/n'$), respectively. It follows that the reproduced signals at pit areas of L0 and L1 have different modulations of 49 mV and 51 mV, respectively. This difference allows a layer judgment.

With respect to the modulation of reproduced signals at pit areas of L0, 5% or greater differences in modulation resulting from changes to the groove widths and groove depths of the asperities favorably eliminated decision errors. Differences of 10% or greater yet preferably offered resistance to environmental changes. The same effects were obtained by changing the corner shapes of the above-mentioned asperities. Changing the corner shapes of the asperities from one layer to another establishes a difference in the modulation of reproduced signals at pit areas. This difference allows a layer judgment.

Layers farther from the light incident side are under higher effects of the layers on the light incident side, and have greater noise in their reproduced signals. It was thus preferable that the above-described asperities on the 1st through N-th layers (information planes) had smoother corner shapes as getting farther from the light incident side. The corner shapes of the asperities may be combined with the groove widths and/or the groove depths of the asperities to change the modulations of reproduced signals at pit areas.

Moreover, the same effects were obtained by shaping the asperities uniformly while laminating the films of the individual layers so as to have such structures as show different reflectivities when measured by the detector. Changing the above-mentioned reflectivities from one layer to another establishes a difference in the modulation of reproduced signals at pit areas. This difference allows a layer judgment.

Layers farther from the light incident side are under higher effects of the layers on the light incident side, and have greater noise in their reproduced signals. It was thus preferable that the 1st through N-th layers (information planes) increased in reflectivity as getting farther from the light incident side. With respect to the reflectivity of L0, 5% or greater differences in the reflectivity favorably eliminated decision errors. Differences of 10% or greater yet preferably offered resistance to environmental changes.

The above-mentioned reflectivities may be combined with the shapes of the asperities to change the modulations of reproduced signals at pit areas.

In respects other than those described above, the present embodiment is identical to the embodiments 1 to 5.

Embodiment 6

Recording/Reproducing Method

Figure 28:
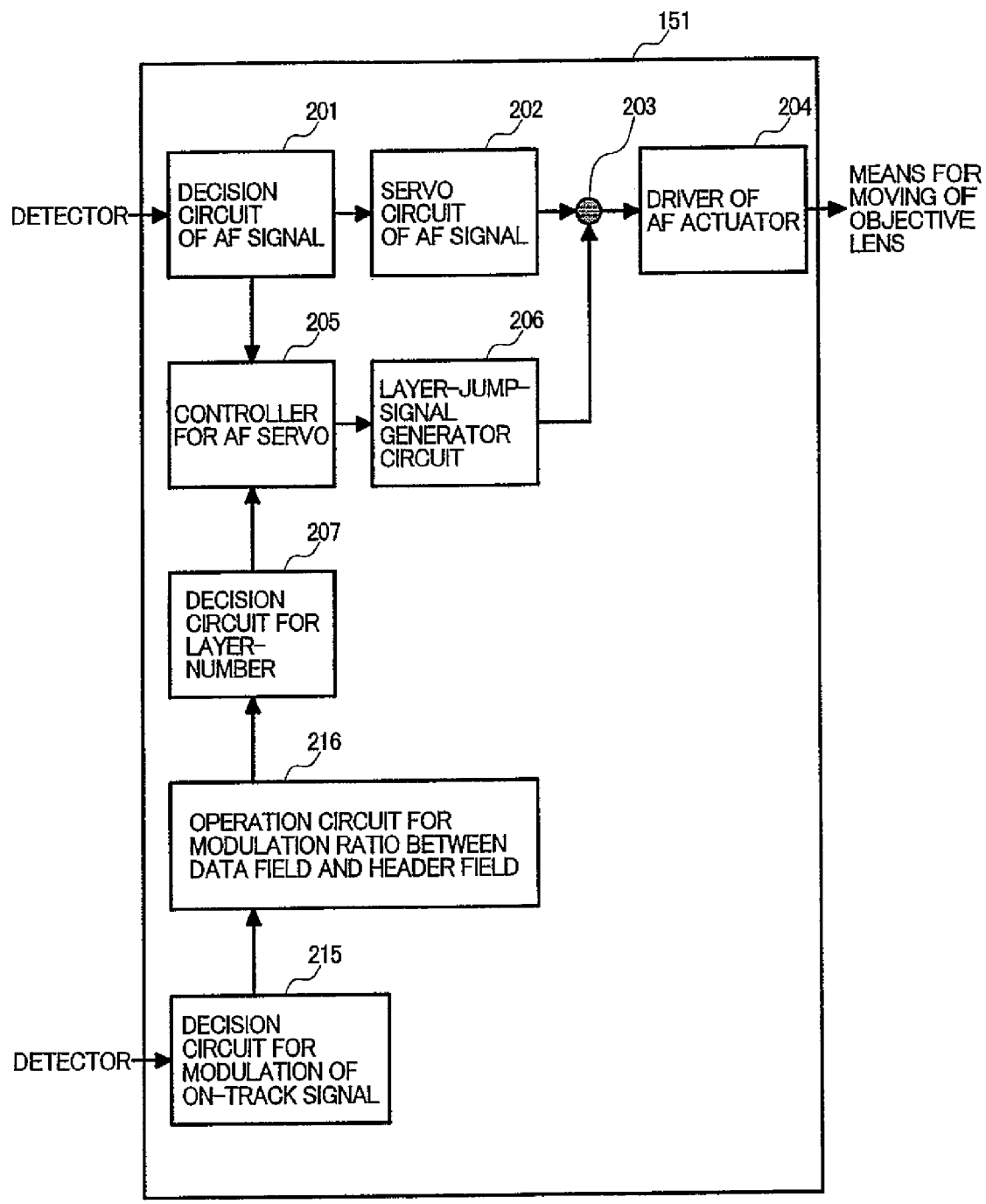
FIG. 28 is a detailed diagram showing another example of the servo controller in the apparatus for recording/reproducing an information recording medium according to the present invention.

Instead of the modulations of reproduced signals at data areas in the embodiment 4, the modulation ratios between reproduced signals at data areas and pit areas may be measured to make a layer judgment. FIG. 28 shows a detailed view of the servo controller for this case.

The servo controller 151 includes a decision circuit 201 of auto focus (AF) signal. An AF error signal detected therein is sent to a servo circuit 202 of AF signal so that a signal is transmitted to a driver 204 of AF actuator through a switch 203. Meanwhile, the AF error signal is transmitted to a controller 205 for AF servo, informing of focusing on a layer (information plane). Reproduced signals at data areas and pit areas coming into focus are measured for modulation by a decision circuit 215 for the modulations of reproduced signals at data areas and pit areas. The modulation ratio between the reproduced signals at data areas and pit areas (the modulation of reproduced signals at data areas/the modulation of the reproduced signals at pit areas) is calculated by an operation circuit 216 for the modulation ratio between data areas and pit areas. The calculation is transmitted to a decision circuit 207 for layer-number, so that the layer number of the layer in focus is determined and transmitted to the controller 205. Here, if a proper layer is in focus, no layer jump is required. In the case of an improper layer, a signal for making a jump to the proper layer is generated by a layer-jump-signal generator circuit 206. The signal is transmitted through the switches 203 to the driver 204 for layer jump. These steps are repeated until the proper layer comes into focus.

It can be seen that when the medium having layers that differ from each other in the modulation ratio between reproduced signals at data areas and pit areas (the modulation of reproduced signals at data areas/the modulation of reproduced signals at pit areas) is measured for the modulations of reproduced signals at data areas and pit areas by the decision circuit 215 before the ratio of the measurements is determined by the operation circuit 216 and used in a layer judgment, the layer number can be determined and the proper layer can be accessed and recorded with reliability. Besides, there is the advantage that recording access time is extremely short even when compared with a method of making a layer judgment by reading information from the pit areas of the substrate after tracking.

It is also apparent that when the medium having layers that differ from each other in the modulation ratio between reproduced signals at data areas and pit areas (the modulation of reproduced signals at data areas/the modulation of reproduced signals at pit areas) is measured for the modulations of reproduced signals at data areas and pit areas by the decision circuit 215 before the ratio of the measurements is determined by the operation circuit 216 and used in a layer judgment, the layer number can be determined and the proper layer can be accessed and reproduced with reliability. Besides, there is the advantage that reproducing access time is extremely short even when compared with a method of making a layer judgment by reading information from the pit areas of the substrate after tracking.

Layers farther from the light incident side are under higher effects of the layers on the light incident side, and have greater noise in their reproduced signals. It was thus preferable that the reproduced signals of the first through N-th layers (information planes) at data areas and pit areas had modulation ratios as shown in the following expression, or such that layers farther from the light incident side had greater modulation ratios between the reproduced signals at data areas and pit areas.

layer 1<layer 2< . . . <layer N−1<layer N (N is an integer greater than or equal to 2)

With respect to the modulation ratio between reproduced signals at data areas and pit areas of L0, 5% or greater differences in modulation ratio favorably eliminated decision errors. Differences of 10% or greater yet preferably offered resistance to environmental changes.

Note that the modulation ratios remain constant even if the layers have different reflectivities, or when reflectivities vary within respective layers. Accordingly, even in the case of a disk with greater variations in reflectivity or for situations where the reflectivities change, an accurate layer judgment can be made for favorable recording/reproduction.

(Characteristics of Information Recording Medium)

The medium having layers with different modulation ratios between reproduced signals at data areas and pit areas can be fabricated by changing the shapes of the asperities which are made of continuous or partially-continuous grooves formed in the recording tracks on the information planes. In the case of a double-layered medium, for example, the above-mentioned asperities are formed in a constant groove depth of 42 nm, with different groove widths of 0.36 μm and 0.38 μm for L0 and L1, respectively. This provides L0 and L1 with different modulation ratios of 0.80 and 0.85, respectively, between the reproduced signals at data areas and pit areas. This difference allows a layer judgment.

Layers farther from the light incident side are under higher effects of the layers on the light incident side, and have greater noise in their reproduced signals. It was thus preferable that the asperities on the first through N-th layers (information planes) had groove widths as shown in the expression below, or such that the asperities on layers farther from the light incident side had greater groove widths.

layer 1<layer 2<... <layer N−1<layer N (N is an integer greater than or equal to 2)

With respect to the groove width of L0, 5% or greater differences in the groove widths of the asperities favorably eliminated decision errors. Differences of 10% or greater yet preferably offered resistance to environmental changes.

The same effects were obtained by varying the asperities in groove depth instead of groove width. For example, when a double-layered medium is formed on a substrate having n' of 1.62, the above-mentioned asperities are formed in a constant groove width of 0.38 μm, with different groove depths of 45 nm (λ/5.6/n') and 42 nm (λ/6.0/n') for L0 and L1, respectively. This provides L0 and L1 with different modulation ratios of 0.80 and 0.85, respectively, between the reproduced signals at data areas and pit areas. This difference allows a layer judgment.

Layers farther from the light incident side are under higher effects of the layers on the light incident side, and have greater noise in their reproduced signals. It was thus preferable that the asperities on the first through N-th layers (information planes) had groove depths as shown in the expression below, or such that the asperities on layers farther from the light incident side had smaller groove depths.

layer 1>layer 2> ... >layer N−1>layer N (N is an integer greater than or equal to 2)

At groove depths below λ/8/n', however, the asperities on the first through N-th layers (information planes) yet preferably had groove depths as shown in the expression below, or such that the asperities on layers farther from the light incident side have greater groove depths which are closer to λ/8/n'.

layer 1<layer 2<... <layer N−1<layer N (N is an integer greater than or equal to 2)

With respect to the groove depth of L0, 5% or greater differences in the groove depths of the asperities favorably eliminated decision errors. Differences of 10% or greater yet preferably offered resistance to environmental changes.

Moreover, the same effects were obtained by varying the asperities in both groove width and groove depth. For example, when a double-layered medium is formed on a substrate having n' of 1.62, the above-mentioned asperities of L0 and L1 are formed in different constant groove widths of 0.37 μm and 0.38 μm, and different groove depths of 43 nm (λ/5.9/n') and 42 nm (λ/6.0/n'), respectively. This provides L0 and L1 with different modulation ratios of 0.80 and 0.85, respectively, between the reproduced signals at data areas and pit areas. This difference allows a layer judgment.

With respect to the modulation ratio of reproduced signals at data areas and pit areas of L0, 5% or greater differences in modulation ratio resulting from changes to the groove widths and groove depths of the asperities favorably eliminated decision errors. Differences of 10% or greater yet preferably offered resistance to environmental changes. The same effects were obtained by changing the corner shapes of the above-mentioned asperities. Changing the corner shapes of the asperities from one layer to another establishes a difference in the modulation ratio of reproduced signals at data areas and pit areas. This difference allows a layer judgment.

Layers farther from the light incident side are under higher effects of the layers on the light incident side, and have greater noise in their reproduced signals. It was thus preferable that the above-described asperities on the 1st through N-th layers (information planes) had smoother corner shapes as getting farther from the light incident side. The corner shapes of the asperities may be combined with the groove widths and/or the groove depths of the asperities to change the modulation ratios between reproduced signals at data areas and pit areas.

In respects other than those described above, the present embodiment is identical to the embodiments 1 to 5.

Embodiment 7

Recording/Reproducing Method

Figure 29:
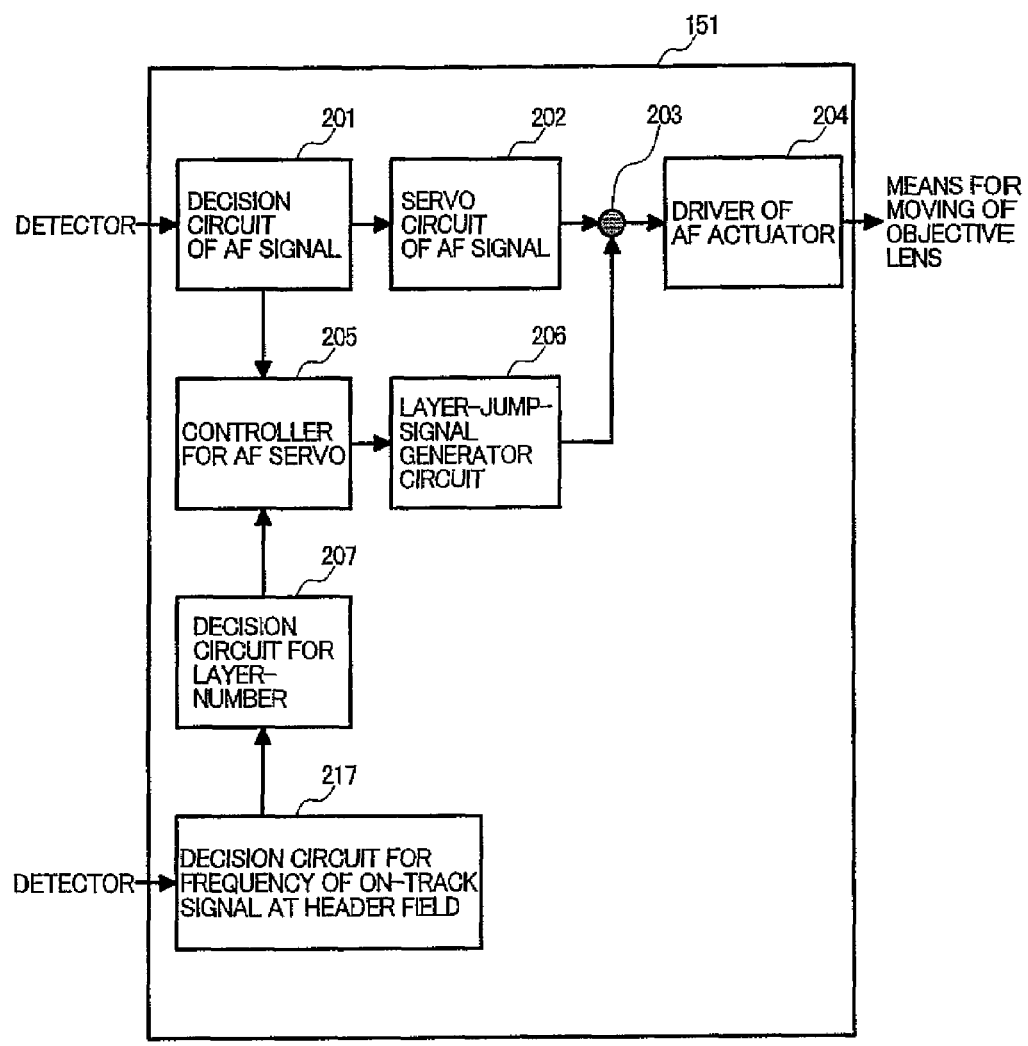
FIG. 29 is a detailed diagram showing another example of the servo controller in the apparatus for recording/reproducing an information recording medium according to the present invention.

A recording/reproducing apparatus was fabricated by modifying the servo controller 151 of the recording/reproducing apparatus described in the embodiment 1. FIG. 29 shows a detailed view of the servo controller.

The servo controller 151 includes a decision circuit 201 of auto focus (AF) signal. An AF error signal detected therein is sent to a servo circuit 202 of AF signal so that a signal is transmitted to a driver 204 of AF actuator through a switch 203. Meanwhile, the AF error signal is transmitted to a controller 205 for AF servo, informing of focusing on a layer (information plane). Reproduced signals coming into focus are measured for the frequency at pit areas by a decision circuit 217 for the frequency of reproduced signals at pit areas. The measurement is transmitted to a decision circuit 207 for layer-number. The layer number of the layer in focus is determined and transmitted to the controller 205. Here, if a proper layer is in focus, no layer jump is required. In the case of an improper layer, a signal for making a jump to the proper layer is generated by a layer-jump-signal generator circuit 206. The signal is transmitted through the switches 203 to the driver 204 for layer jump. These steps are repeated until the proper layer comes into focus.

It can be seen that when the medium having layers with different frequencies of reproduced signals at pit areas is measured for the frequencies of reproduced signals at pit areas by the decision circuit 217 before layer judgment, the layer number can be determined as shown in FIG. 29 and the proper layer can be accessed and recorded with reliability. Besides, there is the advantage that recording access time is extremely short even when compared with a method of making a layer judgment by reading information from the pit areas of the substrate after tracking.

It is also apparent that when the medium having layers with different frequencies of reproduced signals at pit areas is measured for the frequencies of reproduced signals at pit areas by the decision circuit 217 and subjected to a layer judgment, the layer number can be determined as shown in FIG. 29 and the proper layer can be accessed and reproduced with reliability. Besides, there is the advantage that reproducing access time is extremely short even when compared with a method of making a layer judgment by reading information from the pit areas of the substrate after tracking.

Layers farther from the light incident side are under higher effects of the layers on the light incident side, and have greater noise in their reproduced signals at lower frequencies. It was thus preferable that the reproduced signals of the first through N-th layers (information planes) at pit areas had frequencies as shown in the following expression, or such that layers farther from the light incident side had higher frequencies of reproduced signals at pit area.

$$\text{layer 1} < \text{layer 2} < \ldots < \text{layer N}-1 < \text{layer N}$$

(N is an integer greater than or equal to 2)

With respect to the frequency of reproduced signals at pit areas of L0, 5% or greater differences in frequency favorably eliminated decision errors. Differences of 10% or greater yet preferably offered resistance to environmental changes.

(Characteristics of Information Recording Medium)

The medium having layers with different frequencies of reproduced signals at pit areas can be fabricated by changing the periods of pits formed in the recording tracks on the information planes. In the case of a double-layered medium, for example, the above-mentioned pits are formed at different pit periods of 0.69 km and 0.87 μm for L1 and L0, respectively. At a linear velocity of 9 m/s, reproduced signals at the pits areas of L1 and L0 have different frequencies of 13.0 MHz and 10.4 MHz, respectively. This difference allows a layer judgment.

Since layers farther from the light incident side are under higher effects of the layers on the light incident side and require ID areas in proportion to the numbers of sectors, layers closer to the light incident side suitably have smaller numbers of sectors. It was thus preferable that the reproduced signals of the first through N-th layers (information planes) at pit areas had frequencies as shown in the following expression, or such that layers farther from the light incident side had higher frequencies of reproduced signals at pit area.

$$\text{layer 1} < \text{layer 2} < \ldots < \text{layer N}-1 < \text{layer N}$$

(N is an integer greater than or equal to 2)

With respect to the frequency of reproduced signals at the pit areas of L0, 5% or greater differences in frequency favorably eliminated decision errors. Differences of 10% or greater yet preferably offered resistance to environmental changes.

In respects other than those described above, the present embodiment is identical to the embodiments 1 to 6.

Embodiment 8

Recording/Reproducing Method

Figure 30:
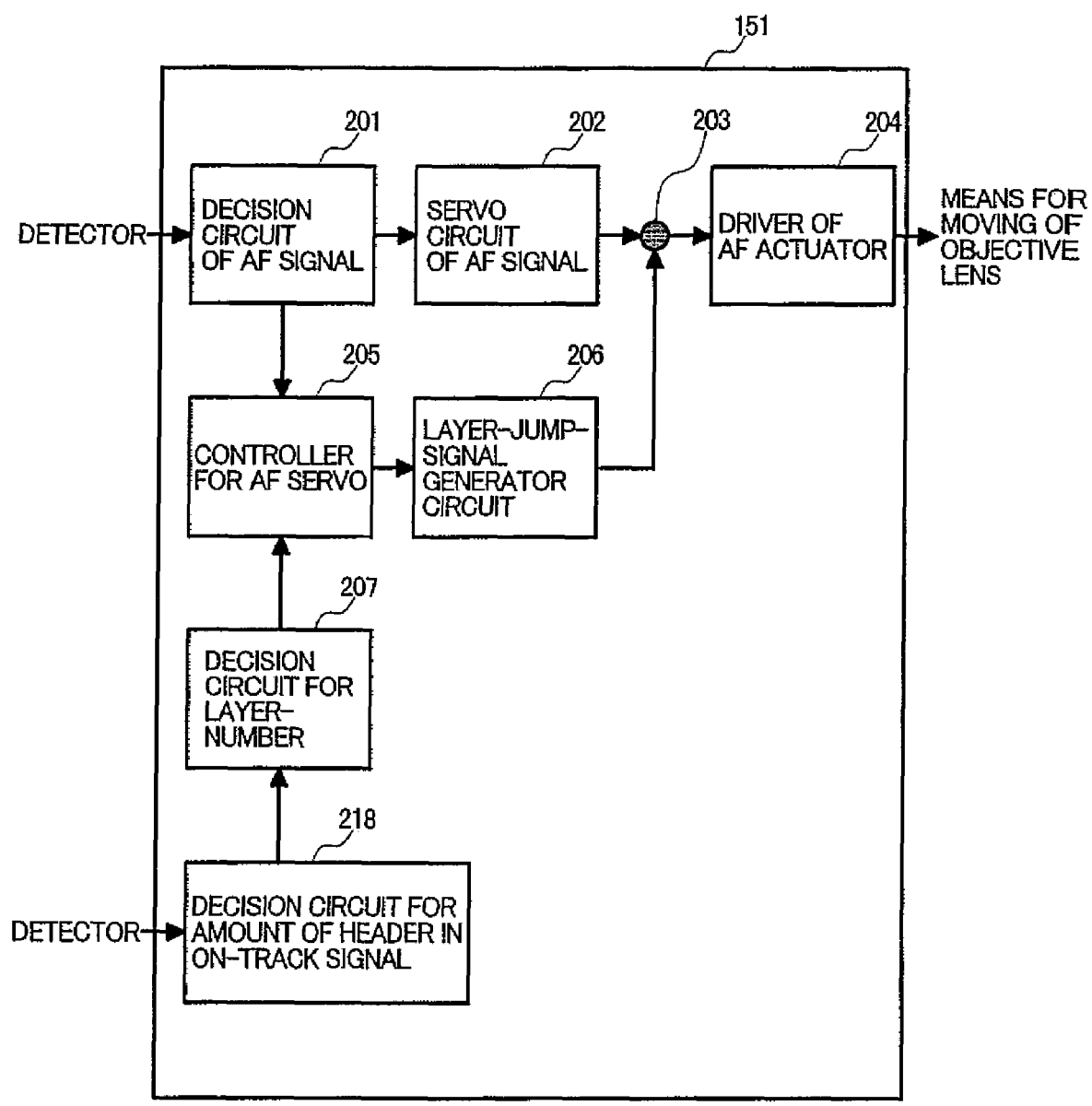
FIG. 30 is a detailed diagram showing another example of the servo controller in the apparatus for recording/reproducing an information recording medium according to the present invention.

The same effects were obtained by changing the numbers of pits instead of their frequencies in the embodiment 7. FIG. 30 shows a detailed view of the servo controller.

The servo controller 151 includes a decision circuit 201 of auto focus (AF) signal. An AF error signal detected therein is sent to a servo circuit 202 of AF signal so that a signal is transmitted to a driver 204 of AF actuator through a switch 203. Meanwhile, the AF error signal is transmitted to a controller 205 for AF servo, informing of focusing on a layer (information plane). In a decision circuit 218 for the number of pits in reproduced signals, reproduced signals coming into focus are measured for the number of pits detected within a predetermined time. The measurement is transmitted to a decision circuit 207 for layer-number. The layer number of the layer in focus is determined and transmitted to the controller 205. Here, if a proper layer is in focus, no layer jump is required. In the case of an improper layer, a signal for making a jump to the proper layer is generated by a layer-jump-signal generator circuit 206. The signal is transmitted through the switches 203 to the driver 204 for layer jump. These steps are repeated until the proper layer comes into focus.

It can be seen that when the medium having layers with different numbers of pits to be detected within a predetermined time is measured for the number of pits detected within a predetermined time by the decision circuit 218 before layer judgment, the layer number can be determined and the proper layer can be accessed and recorded with reliability. Besides, there is the advantage that recording access time is extremely short even when compared with a method of making a layer judgment by reading information from the pit areas of the substrate after tracking.

It is also apparent that when the medium having layers with different numbers of pits to be detected within a predetermined time is measured for the number of pits detected within a predetermined time by the decision circuit 218 before layer judgment, the layer number can be determined and the proper layer can be accessed and reproduced with reliability. Besides, there is the advantage that reproducing access time is extremely short even when compared with a method of making a layer judgment by reading information from the pit areas of the substrate after tracking.

Since layers farther from the light incident side are under higher effects of the layers on the light incident side and have wider ID areas in proportion to the numbers of pits, layers closer to the light incident side suitably have smaller numbers of pits. It was thus preferable that the first through N-th layers (information planes) had the numbers of pits as shown in the following expression, or such that layers farther from the light incident side had greater numbers of pits.

$$\text{layer 1} < \text{layer 2} < \ldots < \text{layer N}-1 < \text{layer N}$$

(N is an integer greater than or equal to 2)

With respect to the number of pits of L0, 5% or greater differences in the number of pits favorably eliminated decision errors. Differences of 10% or greater yet preferably offered resistance to environmental changes. At the time of access, the layer number is determined by detecting the numbers of pits under a constant number of revolutions. The number of revolutions may be changed after a jump to the proper layer.

(Characteristics of Information Recording Medium)

The medium having layers with different numbers of pits can be fabricated by changing the numbers of pits formed in the recording tracks on the information planes. In the case of a double-layered medium, for example, L0 and L1 are provided with different numbers of pits. In this case, at an identical frequency, L1 and L0 have different numbers of pits or 50 pits and 40 pits, respectively. This difference allows a layer judgment.

Since layers farther from the light incident side are under higher effects of the layers on the light incident side and require ID areas in proportion to the numbers of pits, layers closer to the light incident side suitably have smaller numbers of pits. It was thus preferable that the first through N-th layers (information planes) had the numbers of pits as shown in the following expression, or such that layers farther from the light incident side had greater numbers of pits.

$$\text{layer 1} < \text{layer 2} < \ldots < \text{layer N}-1 < \text{layer N}$$

(N is an integer greater than or equal to 2)

With respect to the number of pits of L0, 5% or greater differences in the number of pits favorably eliminated decision errors. Differences of 10% or greater yet preferably offered resistance to environmental changes. Not a constant frequency but varying frequencies were favorably combined with the changes in the number of pits for yet higher accuracy.

In respects other than those described above, the present embodiment is identical to the embodiments 1 to 7.

Embodiment 9

Figure 31:
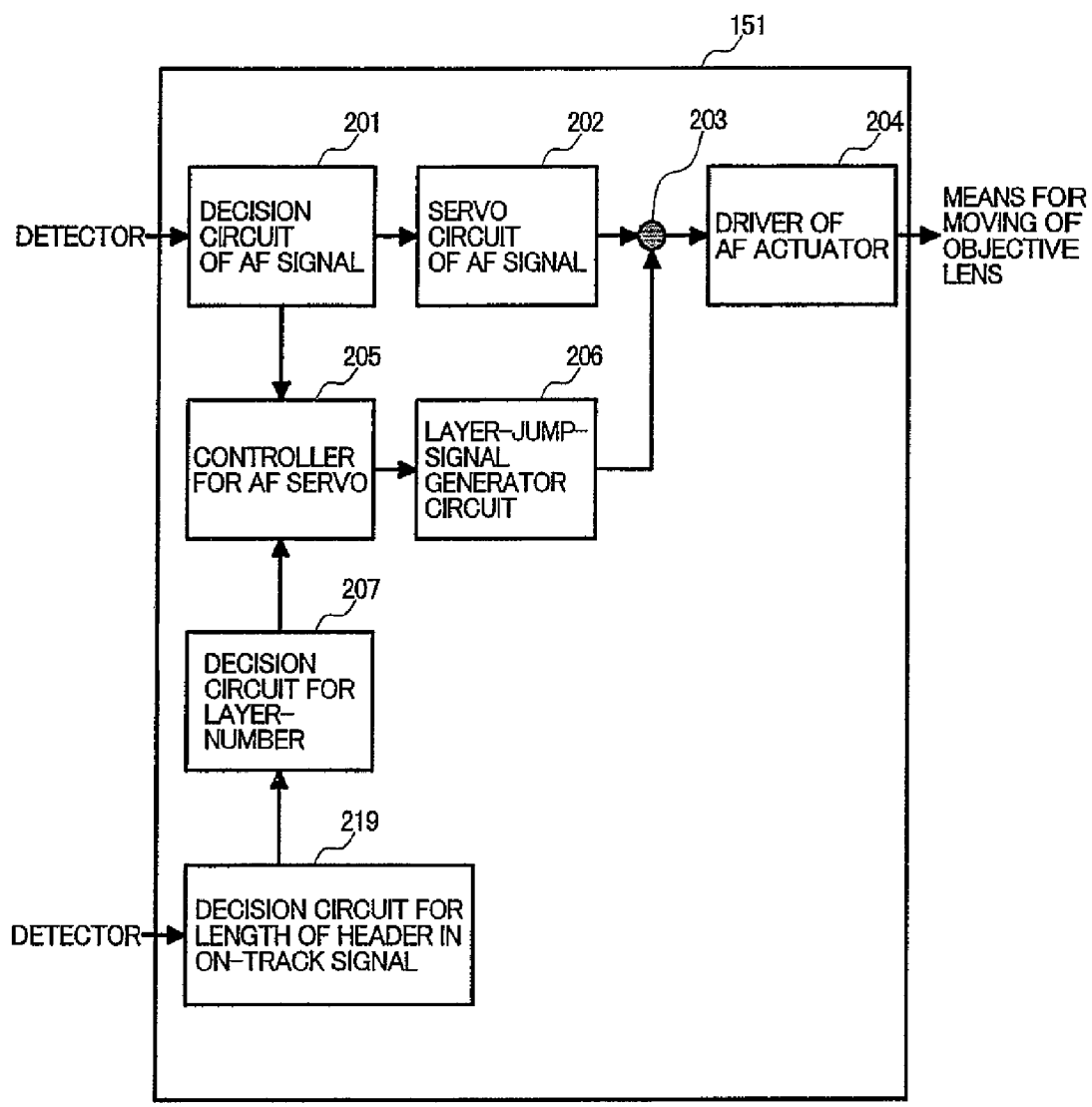
FIG. 31 is a detailed diagram showing another example of the servo controller in the apparatus for recording/reproducing an information recording medium according to the present invention.

The same effects were obtained by measuring the overall lengths of pits, i.e. the lengths between first and last pits, or their passing times instead of the numbers of pits in the asperities of the embodiment 8. FIG. 31 shows a detailed view of the servo controller.

The servo controller 151 includes a decision circuit 201 of auto focus (AF) signal An AF error signal detected therein is sent to a servo circuit 202 of AF signal so that a signal is transmitted to a driver 204 of AF actuator through a switch 203. Meanwhile, the AF error signal is transmitted to a controller 205 for AF servo, informing of focusing on a layer (information plane). Reproduced signals coming into focus are measured for the overall length of pits by a decision circuit 219 for the length of pits in reproduced signals. The measurement is transmitted to a decision circuit 207 for layer-number. The layer number of the layer in focus is determined and transmitted to the controller 205. Here, if a proper layer is in focus, no layer jump is required. In the case of an improper layer, a signal for making a jump to the proper layer is generated by a layer-jump-signal generator circuit 206. The signal is transmitted through the switches 203 to the driver 204 for layer jump. These steps are repeated until the proper layer comes into focus.

It can be seen that when the medium having layers with different lengths of pits is measured for the length of pits by the decision circuit 219 before layer judgment, the layer number can be determined and the proper layer can be accessed and recorded with reliability. Besides, there is the advantage that recording access time is extremely short even when compared with a method of making a layer judgment by reading information from the pit areas of the substrate after tracking.

It is also apparent that when the medium having layers with different lengths of pits is measured for the length of pits by the decision circuit 219 before layer judgment, the layer number can be determined and the proper layer can be accessed and reproduced with reliability. Besides, there is the advantage that reproducing access time is extremely short even when compared with a method of making a layer judgment by reading information from the pit areas of the substrate after tracking.

Since layers farther from the light incident side are under higher effects of the layers on the light incident side and have wider ID areas in proportion to the numbers of pits, layers closer to the light incident side suitably have smaller numbers of pits. It was thus preferable that the first through N-th layers (information planes) had the lengths of pits as shown in the following expression, or such that layers farther from the light incident side had greater lengths of pits.

layer 1<layer 2< . . . <layer N−1<layer N (N is an integer greater than or equal to 2)

With respect to the length of pits of L0, 5% or greater differences in the length of pits favorably eliminated decision errors. Differences of 10% or greater yet preferably offered resistance to environmental changes.

At the time of access, the layer number is determined by detecting the lengths of pits under a constant number of revolutions. The number of revolutions may be changed after a jump to the proper layer.

(Characteristics of Information Recording Medium)

The medium having layers with different lengths of pits can be fabricated by changing the numbers and/or lengths of pits formed in the recording tracks on the information planes. In the case of a double-layered medium, for example, L0 has fifty 0.33-µm pits at 0.66-µm periods. L1 has a different number of pits, or twenty four 0.33-µm pits, at 0.66-µm periods. It follows that at a linear velocity of 9 m/s, L1 and L0 have different lengths of pits of 33 µm and 16.5 µm, with different pit passing times of 3.6 µs and 1.8 µs, respectively. These differences allow a layer judgment. If L0 has twenty four 0.66-µm pits at 1.32-µm periods and L1 has twenty four pits of a different length, or 0.33-µm, at periods of 0.66-µm, then L1 and L0 have different lengths of pits of 33 µm and 16.5 µm and different pit passing times of 3.6 µs and 1.8 µs, respectively, at a linear velocity of 9 m/s. These differences allow a layer judgment.

Since layers farther from the light incident side are under higher effects of the layers on the light incident side, layers closer to the light incident side suitably have greater lengths of pits. It was thus preferable that the first through N-th layers (information planes) had the lengths of pits as shown in the following expression, or such that layers farther from the light incident side had greater lengths of pits.

layer 1<layer 2 . . . <layer N−1<layer N (N is an integer greater than or equal to 2)

With respect to the length of pits of L0, 5% or greater differences in the length of pits favorably eliminated decision errors. Differences of 10% or greater yet preferably offered resistance to environmental changes. For higher measuring accuracy, the frequencies of pits, the numbers of pits, and the lengths of pits were preferably measured in combination rather than measured in each individual term.

In respects other than those described above, the present embodiment is identical to the embodiments 1 to 8.

Embodiment 10

Recording/Reproducing Method

Figure 32:
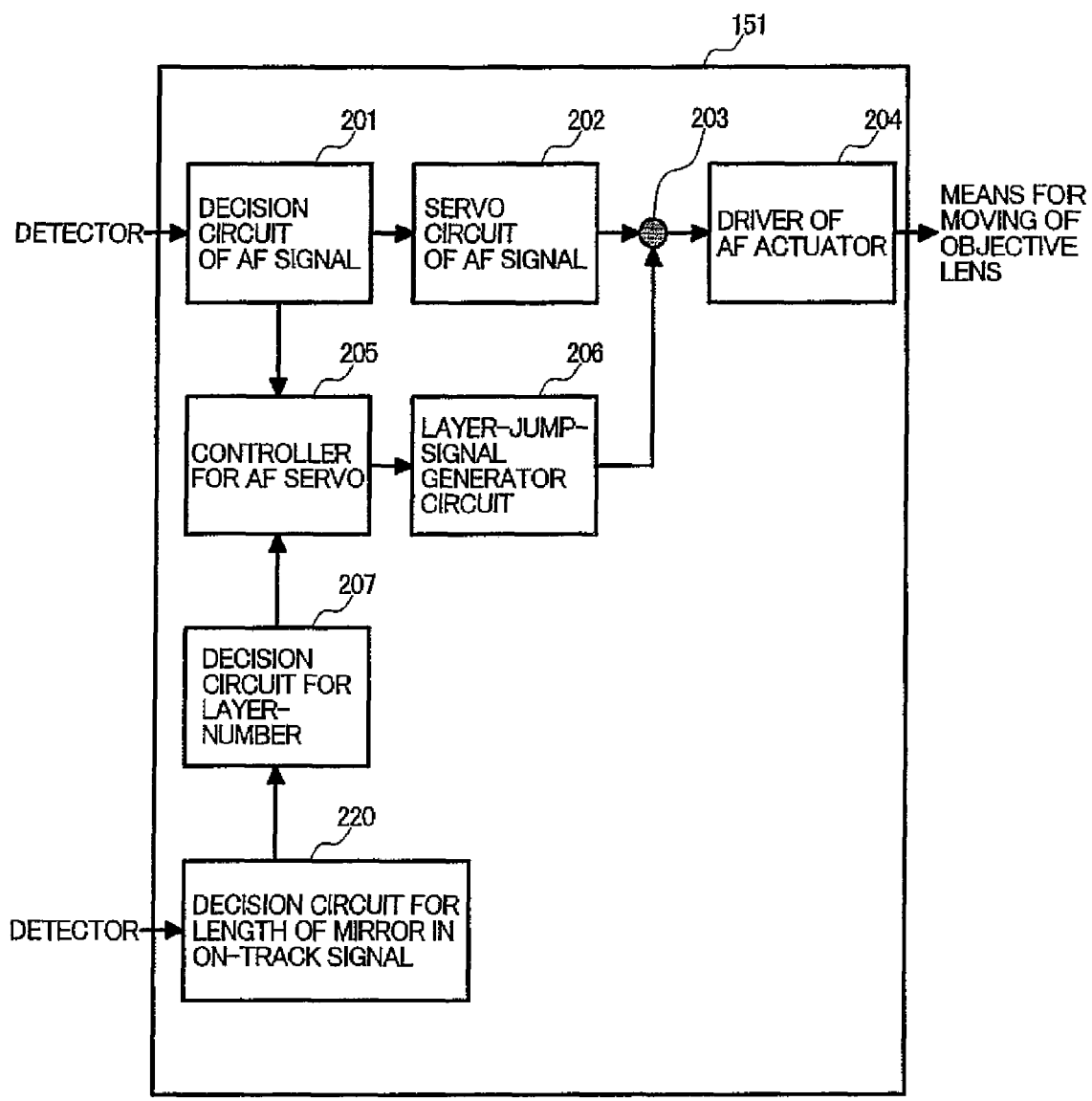
FIG. 32 is a detailed diagram showing another example of the servo controller in the apparatus for recording/reproducing an information recording medium according to the present invention.

The same effects were obtained by changing the lengths of mirror areas, aside from the overall lengths of pit areas in the embodiment 9. FIG. 32 shows a detailed view of the servo controller.

The servo controller 151 includes a decision circuit 201 of auto focus (AF) signal. An AF error signal detected therein is sent to a servo circuit 202 of AF signal so that a signal is transmitted to a driver 204 of AF actuator through a switch 203. Meanwhile, the AF error signal is transmitted to a controller 205 for AF servo, informing of focusing on a layer (information plane). Reproduced signals at mirror areas coming into focus are measured for mirror length by a decision circuit 220 for the length of mirror in reproduced signals. The measurements are transmitted to a decision circuit 207 for layer-number. The layer number of the layer in focus is determined and transmitted to the controller 205. Here, if a proper layer is in focus, no layer jump is required. In the case of an improper layer, a signal for making a jump to the proper layer is generated by a layer-jump-signal generator circuit 206. The signal is transmitted through the switches 203 to the driver 204 for layer jump. These steps are repeated until the proper layer comes into focus. it can be seen that when the medium having layers with different mirror lengths is measured for mirror length by the decision circuit 220 before layer judgment, the layer number can be determined and the proper layer can be accessed and recorded with reliability. Besides, there is the advantage that recording access time is extremely short even when compared with a method of making a layer judgment by reading information from the pit areas of the substrate after tracking.

It is also apparent that when the medium having layers with different mirror lengths is measured for mirror length by the decision circuit 220 before layer judgment, the layer number can be determined and the proper layer can be accessed and reproduced with reliability. Besides, there is the advantage that reproducing access time is extremely short even when compared with a method of making a layer judgment by reading information from the pit areas of the substrate after tracking.

Since layers farther from the light incident side are under higher effects of the layers on the light incident side and have wider ID areas in proportion to the numbers of pits, layers closer to the light incident side suitably have smaller numbers of pits. It was thus preferable that the first through N-th layers (information planes) had mirror lengths as shown in the following expression, or such that layers farther from the light incident side had smaller mirror lengths.

layer 1<layer 2< . . . <layer N−1<layer N (N is an integer greater than or equal to 2)

With respect to the mirror length of L0, 5% or greater differences in mirror length favorably eliminated decision errors. Differences of 10% or greater yet preferably offered resistance to environmental changes.

At the time of access, the layer number is determined by detecting mirror lengths under a constant number of revolutions. The number of revolutions may be changed after a jump to the proper layer.

(Characteristics of Information Recording Medium)

The medium having layers with different mirror lengths can be fabricated by changing the lengths of mirror areas formed in the recording tracks on the information planes. In the case of a double-layered medium, for example, L1 and L0 have different mirror lengths of 33 μm and 16.5 μm on their outermost circumferences, respectively, at a linear velocity of 9 m/s. This provides L1 and L0 with different mirror passing times of 3.6 μs and 1.8 μs, respectively. These differences allow a layer judgment.

Since layers farther from the light incident side are under higher effects of the layers on the light incident side, layers closer to the light incident side suitably have smaller mirror lengths. It was thus preferable that the first through N-th layers (information planes) had mirror lengths as shown in the following expression, or such that layers farther from the light incident side had greater mirror lengths.

layer 1<layer 2< . . . <layer N−1<layer N (N is an integer greater than or equal to 2)

With respect to the mirror length of L0, 5% or greater differences in mirror length favorably eliminated decision errors. Differences of 10% or greater preferably offered resistance to environmental changes. For higher measuring accuracy, the measurement of the lengths of mirror areas was preferably combined with the measurement of the lengths of pits or the like, rather than performed alone.

In respects other than those described above, the present embodiment is identical to the embodiments 1 to 9.

Embodiment 11

Recording/Reproducing Method

Figure 33:
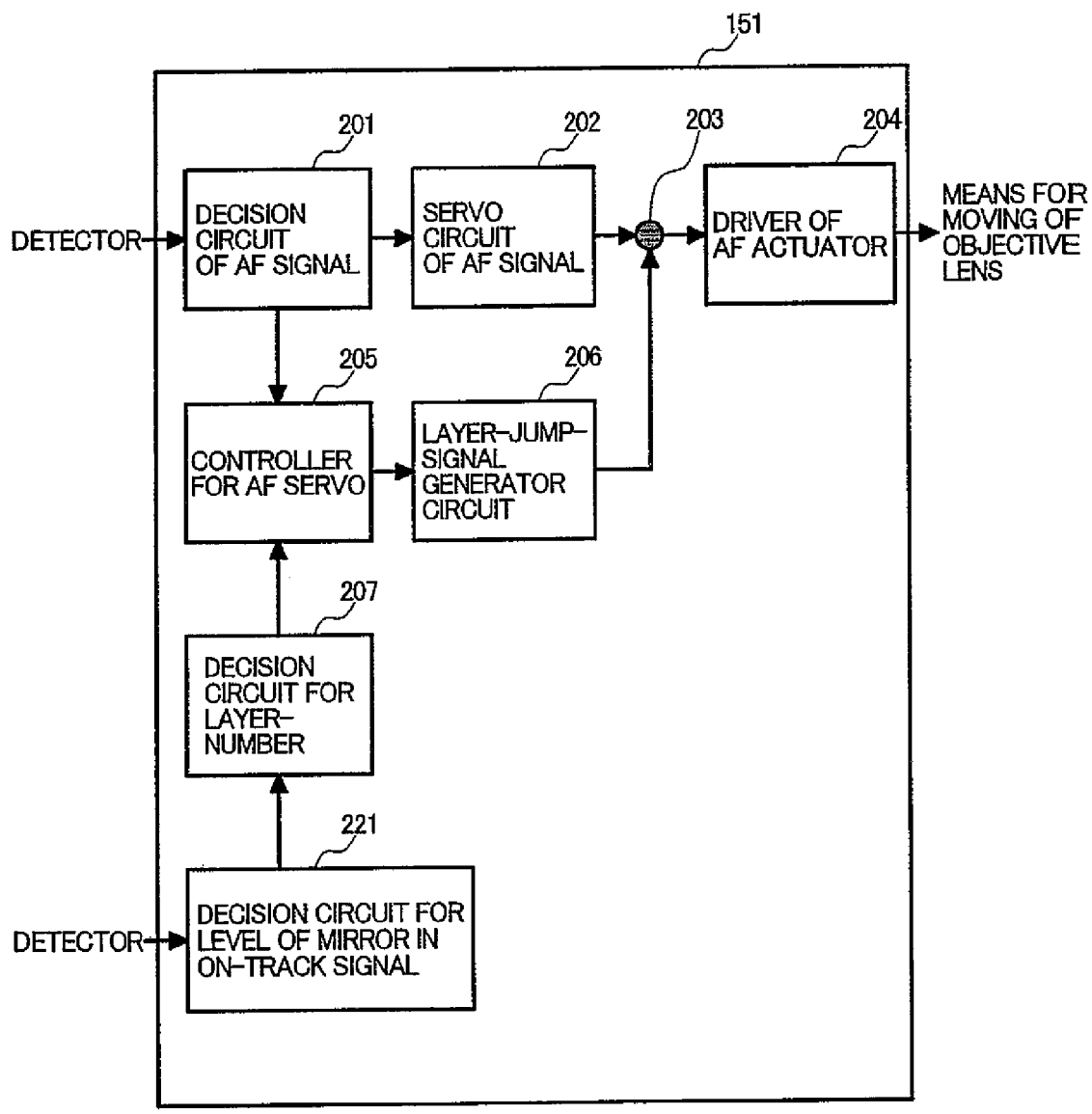
FIG. 33 is a detailed diagram showing another example of the servo controller in the apparatus for recording/reproducing an information recording medium according to the present invention.

The same effects were obtained by changing the levels of mirror areas instead of the lengths of mirror areas in the embodiment 10. FIG. 33 shows a detailed view of the servo controller.

The servo controller 151 includes a decision circuit 201 of auto focus (AF) signal. An AF error signal detected therein is sent to a servo circuit 202 of AF signal so that a signal is transmitted to a driver 204 of AF actuator through a switch 203. Meanwhile, the AF error signal is transmitted to a controller 205 for AF servo, informing of focusing on a layer (information plane). Reproduced signals coming into focus are measured for the level of mirror areas by a decision circuit 221 for the level of mirror in reproduced signals. The measurement is transmitted to a decision circuit 207 for layer-number. The layer number of the layer in focus is determined and transmitted to the controller 205. Here, if a proper layer is in focus, no layer jump is required. In the case of an improper layer, a signal for making a jump to the proper layer is generated by a layer-jump-signal generator circuit 206. The signal is transmitted through the switches 203 to the driver 204 for layer jump. These steps are repeated until the proper layer comes into focus.

It can be seen that when the medium having layers with different levels of mirror areas is measured for the level of mirror areas by the decision circuit 221 before layer judgment, the layer number can be determined and the proper layer can be accessed and recorded with reliability. Besides, there is the advantage that recording access time is extremely short even when compared with a method of making a layer judgment by reading information from the pit areas of the substrate after tracking.

It is also apparent that when the medium having layers with different levels of mirror areas is measured for the level of mirror areas by the decision circuit 221 before layer judgment, the layer number can be determined and the proper layer can be accessed and reproduced with reliability. Besides, there is the advantage that reproducing access time is extremely short even when compared with a method of making a layer judgment by reading information from the pit areas of the substrate after tracking.

Since layers farther from the light incident side are under higher effects of the layers on the light incident side and have wider ID areas in proportion to the numbers of pits, layers closer to the light incident side suitably have smaller numbers of pits. It was thus preferable that the first through N-th layers (information planes) had levels of mirror areas as shown in the following expression, or such that layers farther from the light incident side had higher levels of mirror areas.

layer 1<layer 2< . . . <layer N−1<layer N (N is an integer greater than or equal to 2)

With respect to the length of mirror levels of L0, 5% or greater differences in mirror level favorably eliminated decision errors. Differences of 10% or greater yet preferably offered resistance to environmental changes. At the time of access, reproducing light of constant intensity is applied to detect the levels of reproduced signals at mirror areas for the sake of layer number determination. Then, it is preferable to provide means for optimizing the intensity of the reproduced signals of each layer after a jump to the proper layer, for information can be recorded and reproduced with greater S/N (signal to noise ratio).

(Characteristics of Information Recording Medium)

The medium having layers with different levels of mirror areas can be fabricated by laminating the films of the individual layers so as to have such structures as show different reflectivities when measured by the detector. To take an instance, recording films can be made 10% thinner to lower their reflectivities by approximately 5%. Any film other than recording films may also be modified in thickness to make a change in reflectivity.

Layers farther from the light incident side are under higher effects of the layers on the light incident side, and have greater noise in their reproduced signals. It was thus preferable that the 1st through N-th layers (information planes) increased in reflectivity as getting farther from the light incident side With respect to the reflectivity of L0, 5% or greater differences in the reflectivity favorably eliminated decision errors. Differences of 10% or greater yet preferably offered resistance to environmental changes.

In respects other than those described above, the present embodiment is identical to the embodiments 1 to 10.

Embodiment 12

Recording/Reproducing Method

Figure 34:
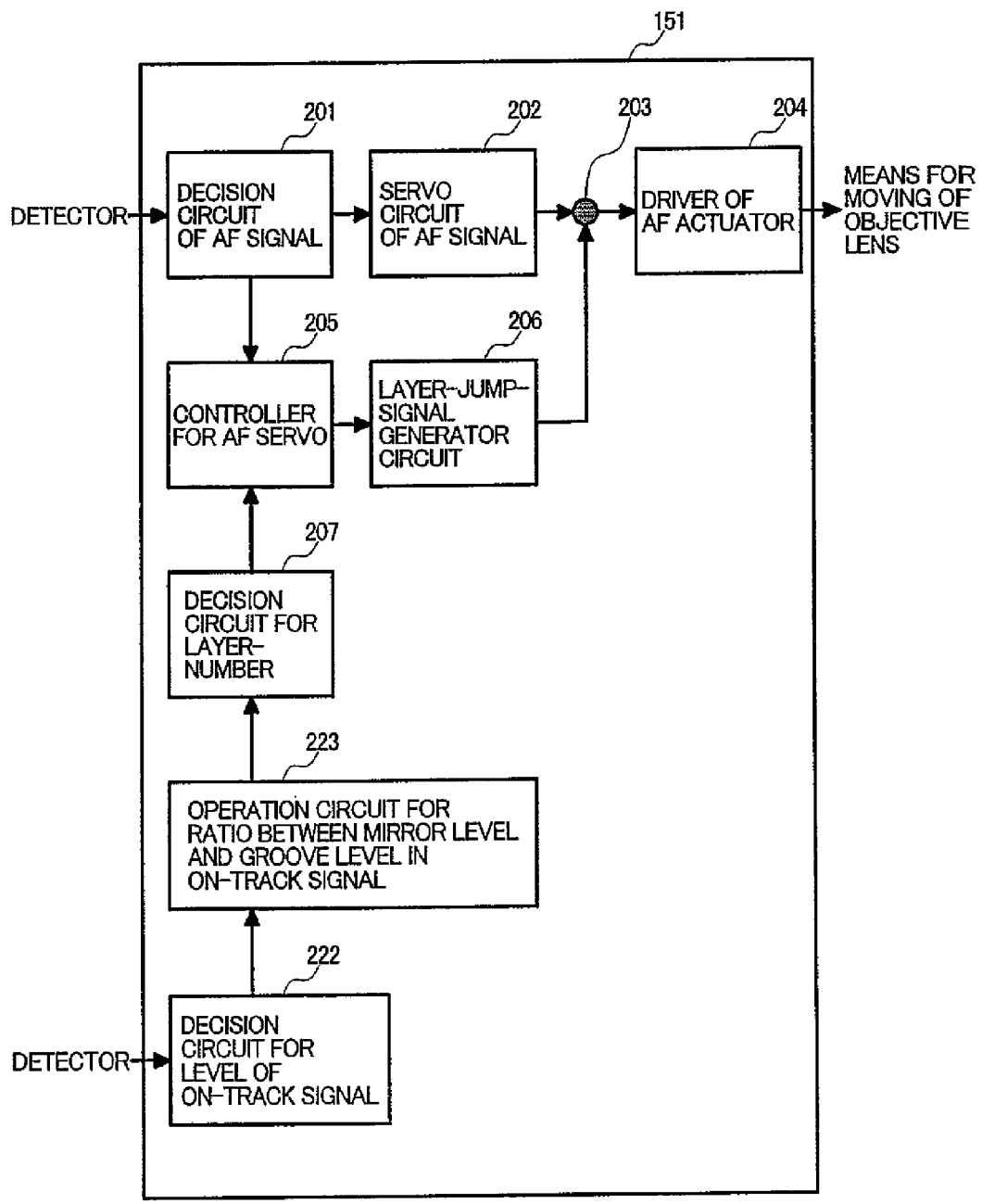
FIG. 34 is a detailed diagram showing another example of the servo controller in the apparatus for recording/reproducing an information recording medium according to the present invention.

Instead of the levels of reproduced signals at mirror areas in the embodiment 11, the ratio between the levels of reproduced signals at data areas and mirror areas may be measured for the sake of layer judgment. FIG. 34 shows a detailed view of the servo controller for this case.

The servo controller 151 includes a decision circuit 201 of auto focus (AF) signal. An AF error signal detected therein is sent to a servo circuit 202 of AF signal so that a signal is transmitted to a driver 204 of AF actuator through a switch 203. Meanwhile, the AF error signal is transmitted to a controller 205 for AF servo, informing of focusing on a layer (information plane). Reproduced signals at data areas and mirror areas coming into focus are measured for level by a decision circuit 222 for the level of reproduced signals. The ratio between the levels of the reproduced signals at data areas and mirror areas (the level of the reproduced signals at data areas/the level of the reproduced signals at mirror areas) is calculated by an operation circuit 223 for the ratio between the mirror level and groove level in reproduced signals. The calculation is transmitted to a decision circuit 207 for layer-number, so that the layer number of the layer in focus is determined and transmitted to the controller 205. Here, if a proper layer is in focus, no layer jump is required. In the case of an improper layer, a signal for making a jump to the proper layer is generated by a layer-jump-signal generator circuit 206. The signal is transmitted through the switches 203 to the driver 204 for layer jump. These steps are repeated until the proper layer comes into focus.

It can be seen that when the medium having layers that differ from each other in the ratio between the levels of reproduced signals at data areas and mirror areas (the level of reproduced signals at data areas/the level of reproduced signals at mirror areas) is measured for the levels of reproduced signals at data areas and mirror areas by the decision circuit 222 before the ratio of the levels is determined by the operation circuit 223 and used in a layer judgment, the layer number can be determined and the proper layer can be accessed and recorded with reliability. Besides, there is the advantage that recording access time is extremely short even when compared with a method of making a layer judgment by reading information from the pit areas of the substrate after tracking.

It is also apparent that when the medium having layers that differ from each other in the ratio between the levels of reproduced signals at data areas and mirror areas (the level of reproduced signals at data areas/the level of reproduced signals at mirror areas) is measured for the levels of reproduced signals at data areas and mirror areas by the decision circuit 222 before the ratio of the levels is determined by the operation circuit 223 and used in a layer judgment, the layer number can be determined and the proper layer can be accessed and reproduced with reliability. Besides, there is the advantage that reproducing access time is extremely short even when compared with a method of making a layer judgment by reading information from the pit areas of the substrate after tracking.

Layers farther from the light incident side are under higher effects of the layers on the light incident side, and have greater noise in their reproduced signals. It was thus preferable that the reproduced signals of the first through N-th layers (information planes) at data areas and mirror areas had level ratios as shown in the following expression, or such that layers farther from the light incident side had greater ratios between the levels of reproduced signals at data areas and mirror areas.

layer 1<layer 2< . . . <layer N−1<layer N (N is an integer greater than or equal to 2)

With respect to the ratio between the levels of reproduced signals at data areas and mirror areas of L0, 5% or greater differences in level ratio favorably eliminated decision errors. Differences of 10% or greater yet preferably offered resistance to environmental changes.

Note that the level ratios remain constant even if the layers have different reflectivities, or when reflectivities vary within respective layers. Accordingly, even in the case of a disk with greater variations in reflectivity or for situations where the reflectivities change, an accurate layer judgment can be made for favorable recording/reproduction.

(Characteristics of Information Recording Medium)

The medium having layers with different ratios between the levels of reproduced signals at data areas and mirror areas can be fabricated by changing the shapes of the asperities which are made of continuous or partially-continuous grooves formed in the recording tracks on the information planes. In the case of a double-layered medium, for example, the above-mentioned asperities are formed in a constant groove depth of 42 nm, with different groove widths of 0.36 µm and 0.38 µm for L0 and L1 respectively. This provides L0 and L1 with different level ratios of 0.65 and 0.70, respectively, between the reproduced signals at data areas and mirror areas. This difference allows a layer judgment.

Layers farther from the light incident side are under higher effects of the layers on the light incident side, and have greater noise in their reproduced signals. It was thus preferable that the asperities on the first through N-th layers (information planes) had groove widths as shown in the expression below, or such that the asperities on layers farther from the light incident side had greater groove widths.

layer 1<layer 2< . . . <layer N−1<layer N (N is an integer greater than or equal to 2)

With respect to the groove width of L0, 5% or greater differences in the groove widths of the asperities favorably eliminated decision errors. Differences of 10% or greater yet preferably offered resistance to environmental changes.

The same effects were obtained by varying the asperities in groove depth instead of groove width. For example, when a double-layered medium is formed on a substrate having n' of 1.62, the above-mentioned asperities are formed in a constant groove width of 0.38 µm, with different groove depths of 45 nm ($\lambda/5.6/n'$) and 42 nm ($\lambda/6.0/n'$) for L0 and L1, respectively.

This provides L0 and L1 with different level ratios of 0.65 and 0.70, respectively, between the reproduced signals at data areas and mirror areas. This difference allows a layer judgment.

Layers farther from the light incident side are under higher effects of the layers on the light incident side, and have greater noise in their reproduced signals. It was thus preferable that the asperities on the first through N-th layers (information planes) had groove depths as shown in the expression below, or such that the asperities on layers farther from the light incident side had smaller groove depths.

layer 1>layer 2> ... >layer N−1>layer N (N is an integer greater than or equal to 2)

At groove depths below $\lambda/8/n'$, however, the asperities on the first through N-th layers (information planes) yet preferably had groove depths as shown in the expression below, or such that the asperities on layers farther from the light incident side have greater groove depths which are closer to $\lambda/8/n'$.

layer 1<layer 2< ... <layer N−1<layer N (N is an integer greater than or equal to 2)

With respect to the groove depth of L0, 5% or greater differences in the groove depths of the asperities favorably eliminated decision errors. Differences of 10% or greater yet preferably offered resistance to environmental changes.

Moreover, the same effects were obtained by varying the asperities in both groove width and groove depth. For example, when a double-layered medium is formed on a substrate having n' of 1.62, the above-mentioned asperities of L0 and L1 are formed in different constant groove widths of 0.37 μm and 0.38 μm, and different groove depths of 43 nm ($\lambda/5.9/n'$) and 42 nm ($\lambda/6.0/n'$), respectively. This provides L0 and L1 with different level ratios of 0.65 and 0.70, respectively, between the reproduced signals at data areas and mirror areas. This difference allows a layer judgment.

With respect to the ratio between the levels of reproduced signals at data areas and mirror areas of L0, 5% or greater differences in level ratio resulting from changes to the groove widths and groove depths of the asperities favorably eliminated decision errors. Differences of 10% or greater yet preferably offered resistance to environmental changes. The same effects were obtained by changing the corner shapes of the above-mentioned asperities. Changing the corner shapes of the asperities from one layer to another establishes a difference in the ratio between the levels of reproduced signals at data areas and mirror areas. This difference allows a layer judgment.

Layers farther from the light incident side are under higher effects of the layers on the light incident side, and have greater noise in their reproduced signals. It was thus preferable that the above-described asperities on the 1st through N-th layers (information planes) had smoother corner shapes as getting farther from the light incident side. The corner shapes of the asperities may be combined with the groove widths and/or the groove depths of the asperities to change the ratios between the levels of reproduced signals at data areas and mirror areas.

Embodiment 13

Figure 36:
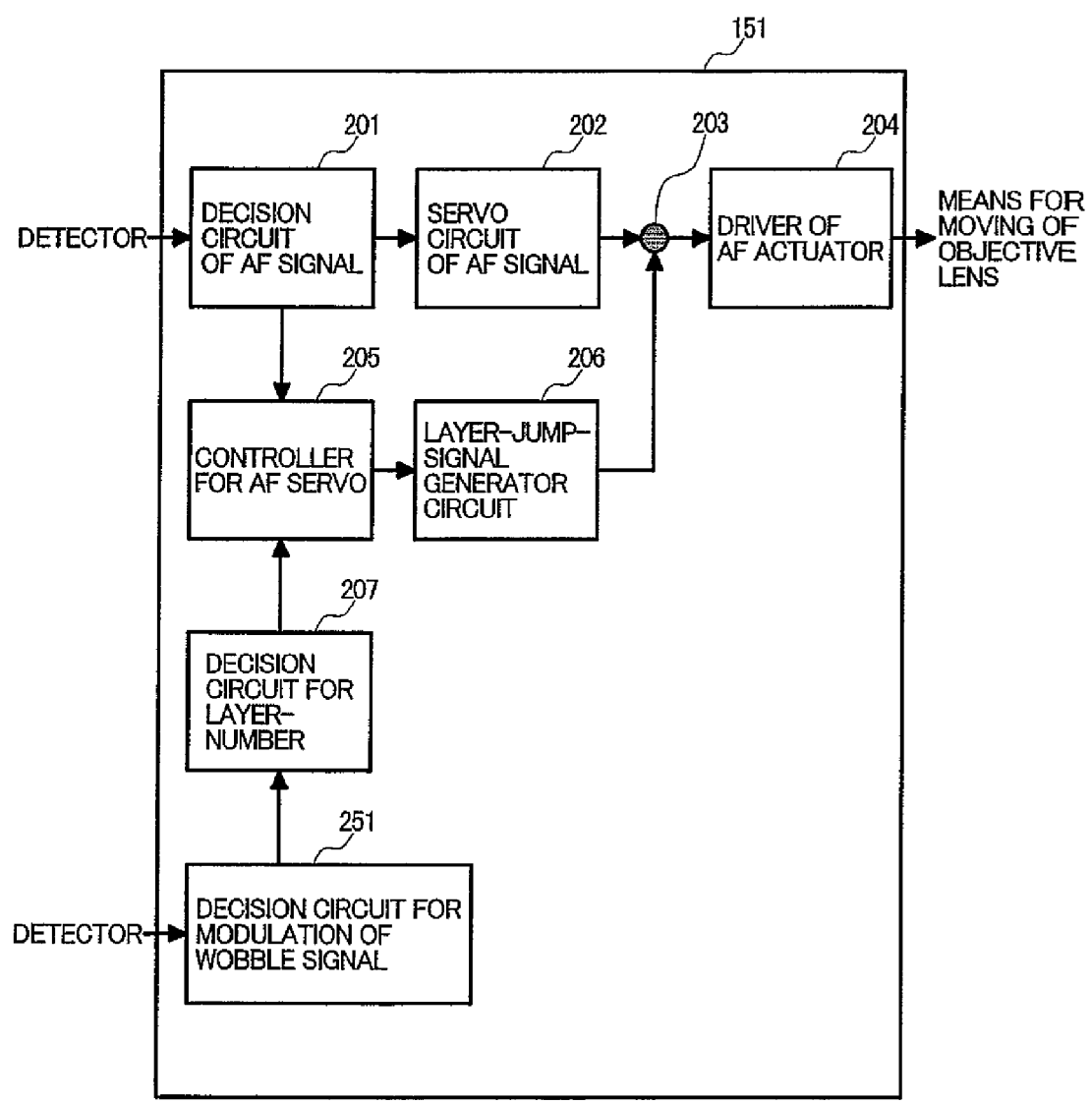
FIG. 36 is a detailed diagram showing another example of the servo controller in the apparatus for recording/reproducing an information recording medium according to the present invention.

A recording/reproducing apparatus was fabricated by modifying the servo controller 151 of the recording/reproducing apparatus described in the embodiment 1. FIG. 35 is a principle diagram, and FIG. 36 is a detailed diagram of the servo controller.

The servo controller 151 includes a decision circuit 201 of auto focus (AF) signal. An AF error signal detected therein is sent to a servo circuit 202 of AF signal so that a signal is transmitted to a driver 204 of AF actuator through a switch 203. Meanwhile, the AF error signal is transmitted to a controller 205 for AF servo, informing of focusing. A wobble signal coming into focus is measured for modulation by a decision circuit 251 for the modulation of a wobble signal. The measurement is transmitted to a decision circuit 207 for layer-number. The layer number, or which information layer is in focus, is determined and transmitted to the controller 205. Here, if a proper layer is in focus, no layer jump is required. In the case of an improper information plane, a signal for making a jump to the proper layer is generated by a layer-jump-signal generator circuit 206. The signal is transmitted through the switches 203 to the driver 204 for layer jump. These steps are repeated until the proper layer comes into focus.

It can be seen that when the medium having layers with different modulations of wobble signals is measured for wobble signal modulation by the decision circuit 251 before layer judgment, the layer number can be determined as shown in FIG. 35 and the proper layer can be accessed and recorded with reliability. Besides, there is the advantage that recording access time is extremely short even when compared with a method of making a layer judgment by reading information from the pit areas of the substrate after tracking.

It is also apparent that when the medium having layers with different modulations of wobble signals is measured for wobble signal modulation by the decision circuit 251 before layer judgment, the layer number can be determined as shown in FIG. 35 and the proper layer can be accessed and reproduced with reliability. Besides, there is the advantage that reproducing access time is extremely short even when compared with a method of making a layer judgment by reading information from the pit areas of the substrate after tracking.

The medium having layers with different modulations of wobble signals can be fabricated by changing the shapes of the asperities which are made of continuous or partially-continuous grooves in the recording tracks on the information planes. Characteristically, the above-mentioned asperities are meandered or deformed at predetermined modulations, and the information planes 1 through N differ from each other in the width of wobbling of the meandering or deformation.

Figure 37:
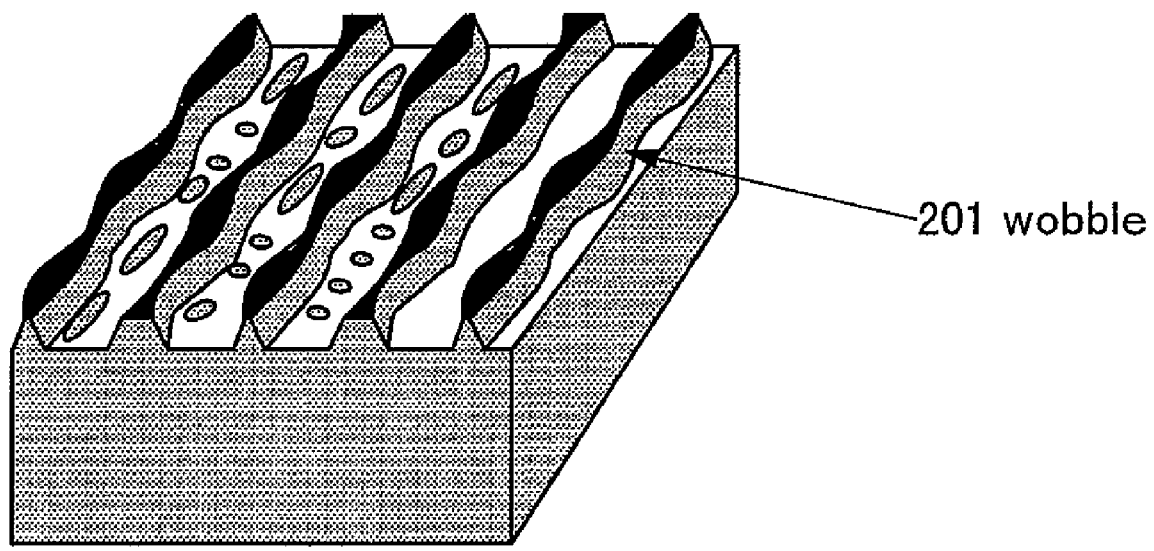
FIG. 37 is a schematic explanatory diagram showing wobbles in the information recording medium according to the present invention.
Figure 38:
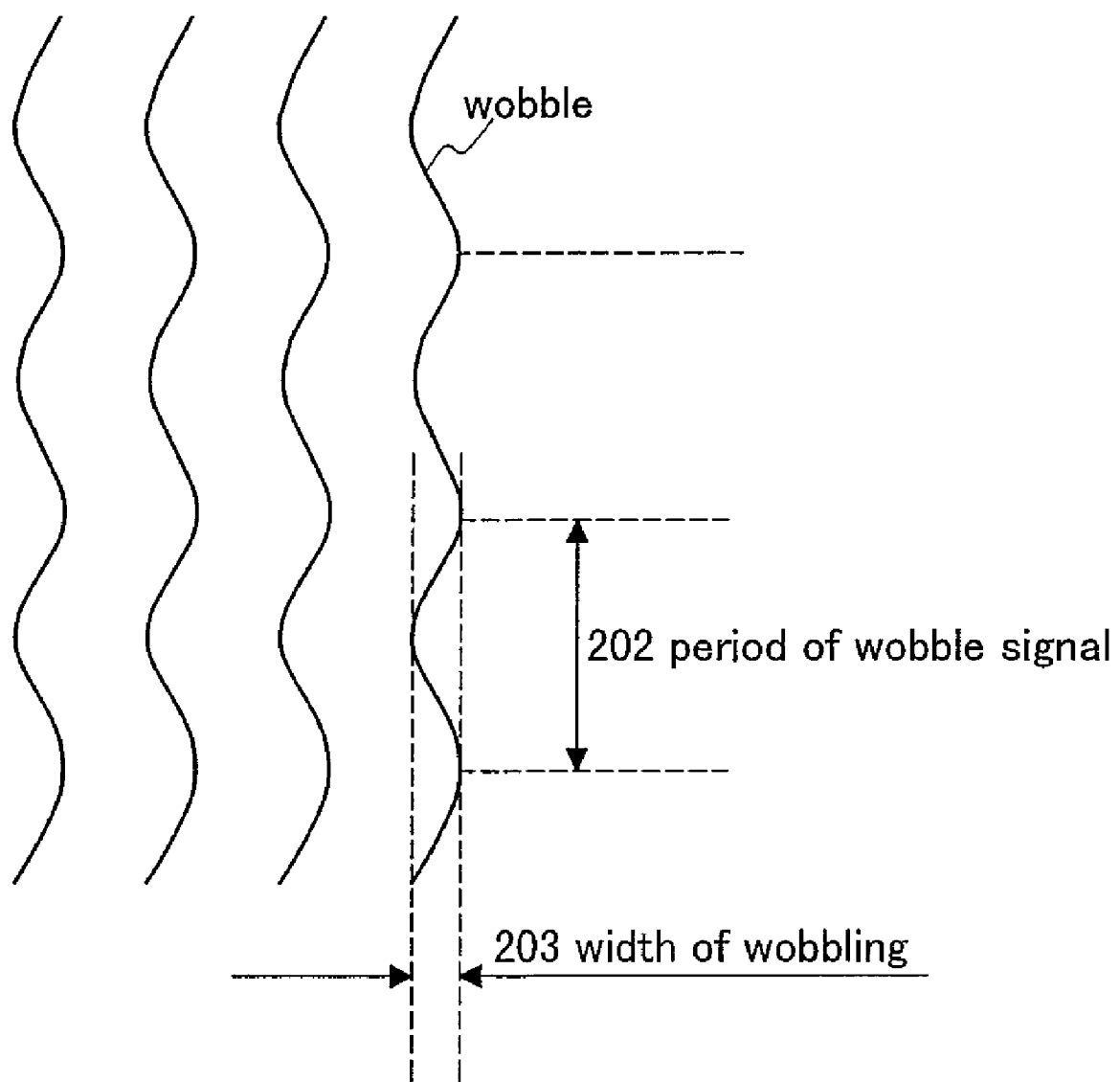
FIG. 38 is a schematic explanatory diagram showing wobbles in the information recording medium according to the present invention.

A wobble means that the asperities are meandered or deformed at a predetermined modulation as shown in a schematic diagram of FIG. 37. FIG. 38 is a plan view, in which a period 202 of a wobble signal refers to a single period of variation of the wobble described above, and a width of wobbling 203 the width of the variation of the wobble. For example, in the case of a double-layered medium, providing L0 and L1 with different widths of wobbling of $\frac{1}{20}$ and $\frac{1}{19}$ of their track pitches establishes a difference between the modulations of wobble signals of L1 and L0. This difference in modulation allows a layer judgment.

That is, layers farther from the light incident side are under higher effects of the layers on the incident side, and have greater noise in their wobble signals. It was thus preferable that layers farther from the light incident side have greater modulations of wobble signals. With respect to the signal modulation of L0, 5% or greater differences in modulation favorably eliminated decision errors. Differences of 10% or greater yet preferably offered resistance to environmental changes.

In respects other than those described above, the present embodiment is identical to the embodiments 1 to 12.

Embodiment 14

Recording/Reproducing Method

Figure 39:
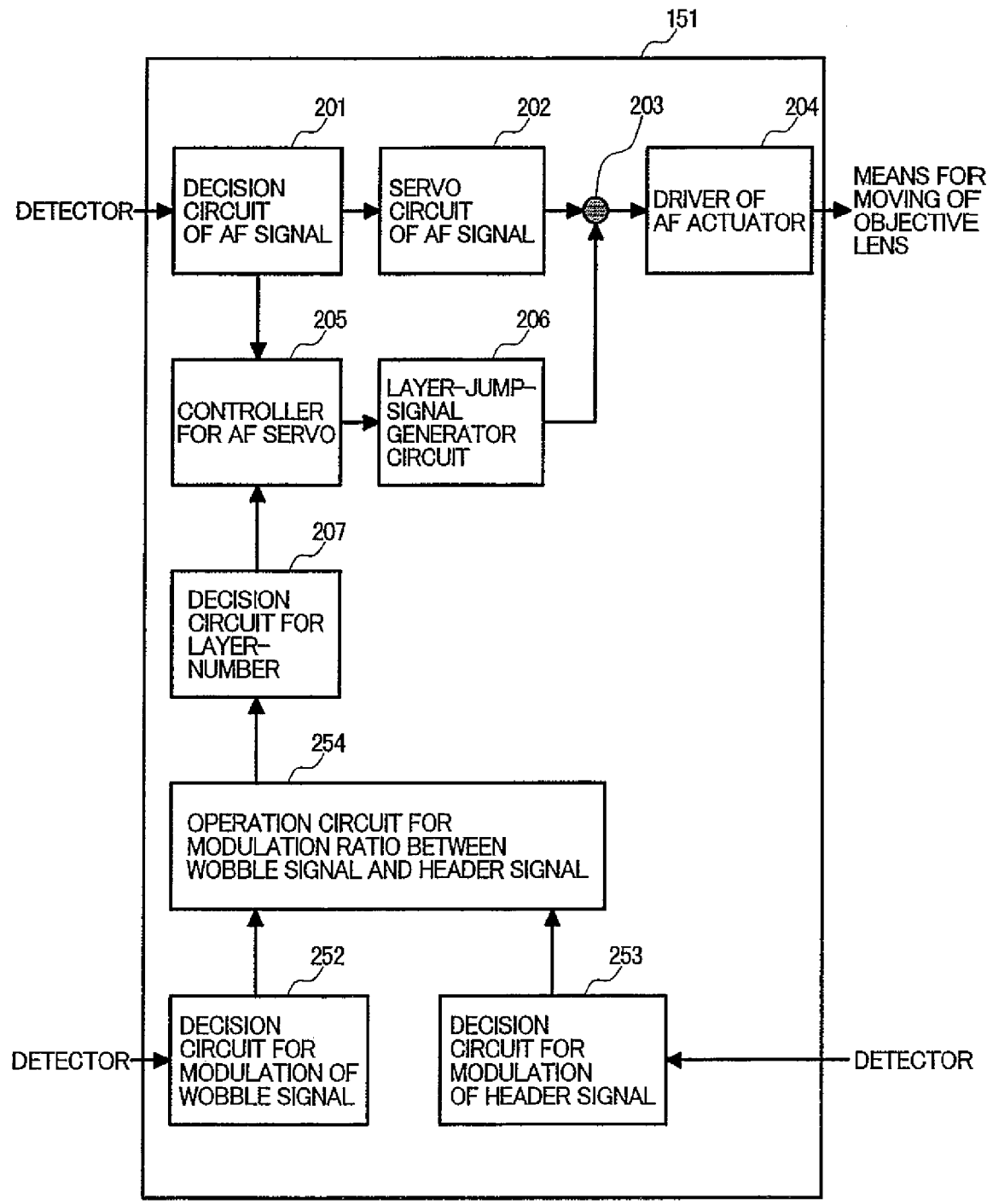
FIG. 39 is a detailed diagram showing another example of the servo controller in the apparatus for recording/reproducing an information recording medium according to the present invention.

Instead of the modulations of wobble signals in the embodiment 13, the ratios between the modulations of wobble signals and the modulations of reproduced signals at pit areas may be measured for the sake of layer judgment. FIG. 39 shows a detailed view of the servo controller for this case.

The servo controller 151 includes a decision circuit 201 of auto focus (AF) signal. An AF error signal detected therein is sent to a servo circuit 202 of AF signal so that a signal is transmitted to a driver 204 of AF actuator through a switch 203. Meanwhile, the AF error signal is transmitted to a controller 205 for AF servo, informing of focusing on a layer (information plane). A wobble signal coming into focus is measured for modulation by a decision circuit 252 for the modulation of a wobble signal. Reproduced signals at pit areas coming into focus are measured for modulation by a decision circuit 253 for the modulation of pit signals. The modulation ratio between the wobble signal and the reproduced signals at pit areas (the modulation of the wobble signal/the modulation of the reproduced signals at pit areas) is calculated by an operation circuit 254 for the modulation ratio between a wobble signal and pit signals. The calculation is transmitted to a decision circuit 207 for layer-number, so that the layer number of the layer in focus is determined and transmitted to the controller 205. Here, if a proper layer is in focus, no layer jump is required. In the case of an improper layer, a signal for making a jump to the proper layer is generated by a layer-jump-signal generator circuit 206. The signal is transmitted through the switches 203 to the driver 204 for layer jump. These steps are repeated until the proper layer comes into focus.

It can be seen that when the medium having layers that differ from each other in the modulation ratio between a wobble signal and reproduced signals at pit areas (the modulation of a wobble signal/the modulation of reproduced signals at pit areas) is measured for the modulation of a wobble signal by the decision circuit 252 and for the modulation of reproduced signals at pit areas by the decision circuit 253 before the ratio between the modulations of the wobble signal and the reproduced signals at pit areas (the modulation of the wobble signal/the modulation of the reproduced signals at pit areas) is determined by the operation circuit 254 and used in a layer judgment, the layer number can be determined and the proper layer can be accessed and recorded with reliability. Besides, there is the advantage that recording access time is extremely short even when compared with a method of making a layer judgment by reading information from the pit areas of the substrate after tracking.

It is also apparent that when the medium having layers that differ from each other in the modulation ratio between a wobble signal and reproduced signals at pit areas (the modulation of a wobble signal/the modulation of reproduced signals at pit areas) is measured for the modulation of a wobble signal by the decision circuit 252 and for the modulation of reproduced signals at pit areas by the decision circuit 253 before the ratio between the modulations of the wobble signal and the reproduced signals at pit areas (the modulation of the wobble signal/the modulation of the reproduced signals at pit areas) is determined by the operation circuit 254 and used in a layer judgment, the layer number can be determined and the proper layer can be accessed and reproduced with reliability. Besides, there is the advantage that reproducing access time is extremely short even when compared with a method of making a layer judgment by reading information from the pit areas of the substrate after tracking.

Layers farther from the light incident side are under higher effects of the layers on the light incident side, and have greater noise in their wobble signals. It was thus preferable that the wobble signals and the pit-area reproduced signals of the first through N-th layers (information planes) had modulation ratios as shown in the expression below, or such that layers farther from the light incident side had greater modulation ratios.

layer 1<layer 2<...<layer N−1<layer N (N is an integer greater than or equal to 2)

With respect to the modulation ratio between the wobble signal and the pit-area reproduced signals of L0, 5% or greater differences in modulation ratio favorably eliminated decision errors. Differences of 10% or greater yet preferably offered resistance to environmental changes.

(Characteristics of Information Recording Medium)

The medium having layers with different modulation ratios between wobble signals and reproduced signals at pit areas can be fabricated by changing the shapes of the asperities which are made of continuous or partially-continuous grooves formed in the recording tracks on the information planes. In the case of a double-layered medium, for example, the above-mentioned asperities are formed of grooves having different widths of wobbling of 0.020 μm and 0.024 μm for L0 and L1, respectively, with a constant pit shape. This provides L0 and L1 with different modulation ratios of 0.05 and 0.06, respectively, between the wobble signals and reproduced signals at pit areas. This difference allows a layer judgment.

Layers farther from the light incident side are under higher effects of the layers on the light incident side, and have greater noise in their wobble signals. It was thus preferable that the grooves constituting the asperities on the first through N-th layers (information planes) had widths of wobbling as shown in the expression below, or such that the grooves constituting the asperities on layers farther from the light incident side had greater widths of wobbling.

layer 1<layer 2<...<layer N−1<layer N (N is an integer greater than or equal to 2)

With respect to the width of wobbling of the grooves constituting the asperities of L0, 5% or greater differences in the width of wobbling favorably eliminated decision errors. Differences of 10% or greater yet preferably offered resistance to environmental changes.

The same effects were obtained by changing the shapes of pits instead of the widths of wobbling of the grooves constituting the asperities. In the case of a double-layered medium, for example, pits are formed in different shapes while the grooves of the asperities are kept at a constant width of 0.38 μm and a constant width of wobbling of 0.024 μm. Assuming that L0 has a pit width of 0.28 μm and L1 a pit width of 0.26 μm, L0 and L1 come to have different modulation ratios of 0.05 and 0.06, respectively, between the wobble signals and reproduced signals at pit areas. This difference allows a layer judgment.

Layers farther from the light incident side are under higher effects of the layers on the light incident side, and have greater noise in their wobble signals. It was thus preferable that the first through N-th layers (information planes) had pit widths as shown in the expression below, or such that layers farther from the light incident side had smaller pit widths.

layer 1>layer 2> . . . >layer N−1>layer N (N is an integer greater than or equal to 2)

With respect to the pit width of L0, 5% or greater differences in pit width favorably eliminated decision errors. Differences of 10% or greater yet preferably offered resistance to environmental changes.

The modulation ratios between wobble signals and reproduced signals at pit areas may also be changed by modifying the widths of wobbling of the grooves constituting the asperities, as well as pit widths. With respect to the modulation ratio of L0, 5% or greater differences in modulation ratio favorably eliminated decision errors. Differences of 10% or greater yet preferably offered resistance to environmental changes.

Note that the modulation ratios remain constant even if the layers have different reflectivities, or when reflectivities vary within respective layers. Accordingly, even in the case of a disk with greater variations in reflectivity or for situations where the reflectivities change, an accurate layer judgment can be made for favorable recording/reproduction.

In respects other than those described above, the present embodiment is identical to the embodiments 1 to 13.

Embodiment 15

Figure 41:
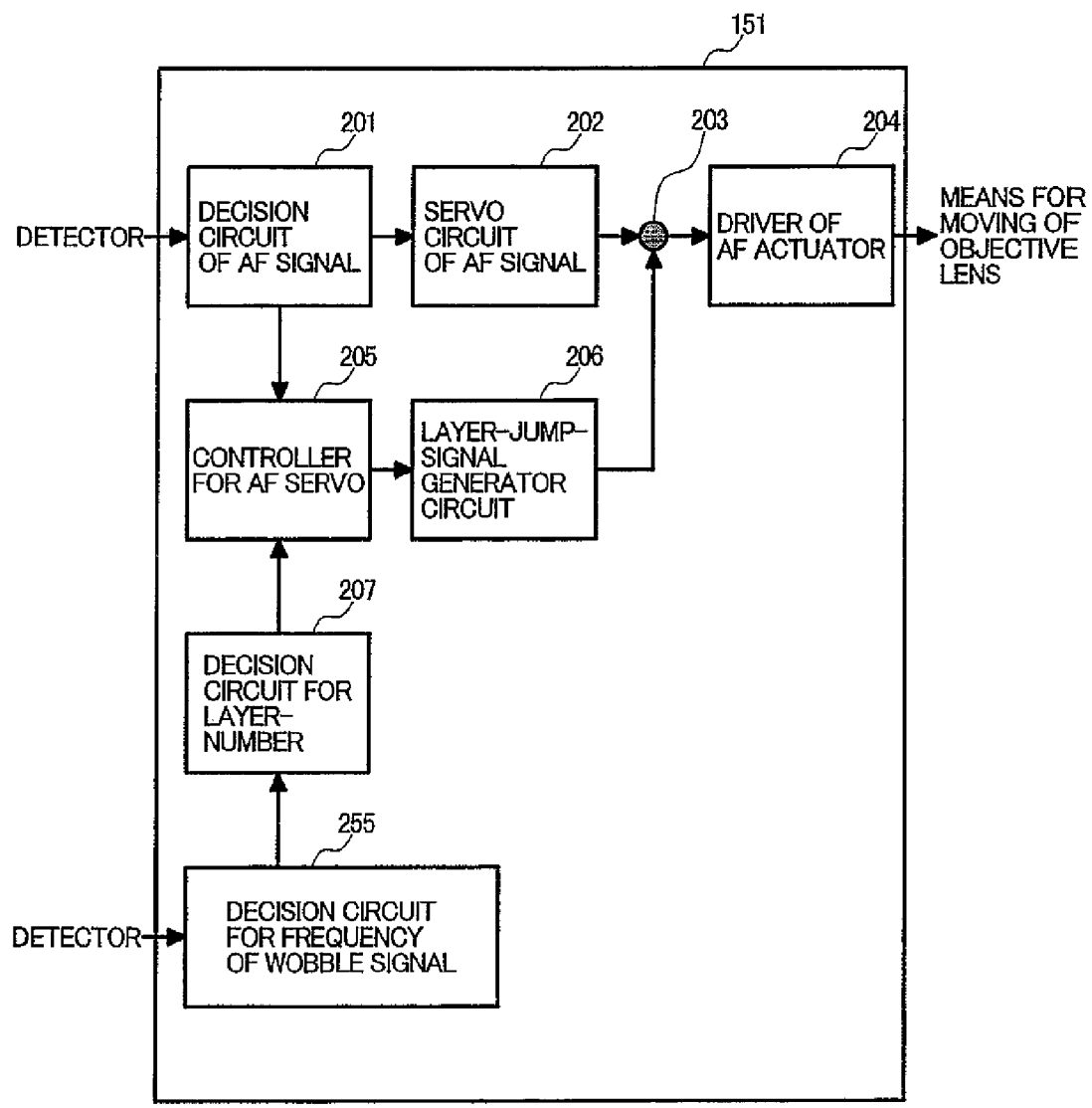
FIG. 41 is a detailed diagram showing another example of the servo controller in the apparatus for recording/reproducing an information recording medium according to the present invention.

A recording/reproducing apparatus was fabricated by modifying the servo controller 151 of the recording/reproducing apparatus described in the embodiment 1. FIG. 40 is a principle diagram, and FIG. 41 is a detailed diagram of the servo controller.

The servo controller 151 includes a decision circuit 201 of auto focus (AF) signal. An AF error signal detected therein is sent to a servo circuit 202 of AF signal so that a signal is transmitted to a driver 204 of AF actuator through a switch 203. Meanwhile, the AF error signal is transmitted to a controller 205 for AF servo, informing of focusing. A wobble signal coming into focus is measured for frequency by a decision circuit 255 for the frequency of a wobble signal. The measurement is transmitted to a decision circuit 207 for layer-number. The layer number, or which information layer is in focus, is determined and transmitted to the controller 205. Here, if a proper layer is in focus, no layer jump is required. In the case of an improper information plane, a signal for making a jump to the proper layer is generated by a layer-jump-signal generator circuit 206. The signal is transmitted through the switches 203 to the driver 204 for layer jump. These steps are repeated until the proper layer comes into focus.

It can be seen that when the medium having layers with different frequencies of wobble signals is measured for wobble signal frequency by the decision circuit 255 before layer judgment, the layer number can be determined as shown in FIG. 40 and the proper layer can be accessed and recorded with reliability. Besides, there is the advantage that recording access time is extremely short even when compared with a method of making a layer judgment by reading information from the pit areas of the substrate after tracking.

It is also apparent that when the medium having layers with different frequencies of wobble signals is measured for wobble signal frequency by the decision circuit 255 before layer judgment, the layer number can be determined as shown in FIG. 40 and the proper layer can be accessed and reproduced with reliability. Besides, there is the advantage that reproducing access time is extremely short even when compared with a method of making a layer judgment by reading information from the pit areas of the substrate after tracking.

The medium having layers with different frequencies of wobble signals can be fabricated by changing the shapes of the asperities which are made of continuous or partially-continuous grooves in the recording tracks on the information planes. Characteristically, the above-mentioned asperities are meandered or deformed at predetermined modulations, and the information planes 1 through N differ from each other in the period of the wobble signal from the meandering or deformation. In the case of a double-layered medium, for example, L0 has a period of wobble signal of 32.76 μm. Meanwhile, L1 has a different period of wobble signal of 32.24 μm, which provides L1 with a different frequency of wobble signal for layer judgment.

That is, layers farther from the light incident side are under higher effects of the layers on the incident side, and have greater noise in their wobble signals. It was thus preferable that layers farther from the light incident side have greater frequencies of wobble signals. With respect to the signal frequency of L0, 5% or greater differences in frequency favorably eliminated decision errors. Differences of 10% or greater yet preferably offered resistance to environmental changes.

Figure 42:
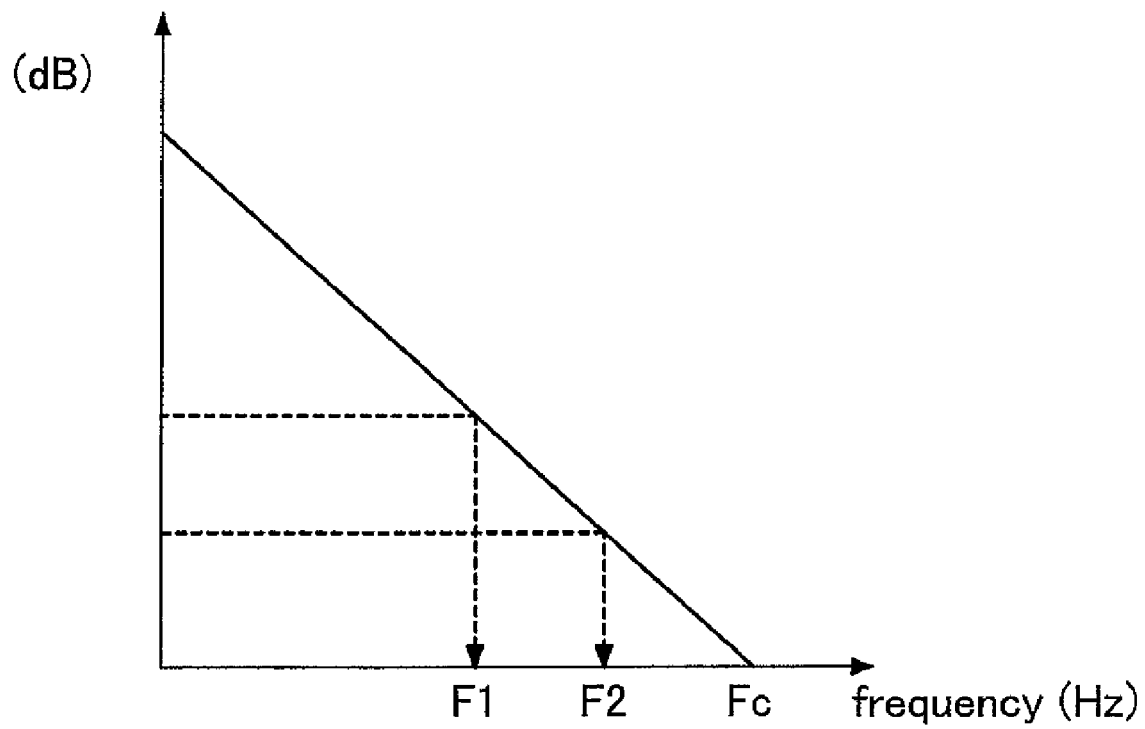
FIG. 42 is a chart for explaining the dependency of the detector gain on frequency.

As shown in FIG. 42, detector gain depends on frequency. The frequency at which the detector gain falls to zero will be referred to as cutoff frequency (Fc). Given that the frequency corresponding to a shortest mark is F2 and the frequency corresponding to a longest mark is F1, the frequencies of wobble signals mentioned above are preferably lower than F1 by 10% or more. This favorably enhances the wobble signals in detectivity. The frequencies of the wobble signals may also range from 10% higher than F1 to the cutoff frequency Fc, whereas the wobble signals should drop in detectivity.

In respects other than those described above, the present embodiment is identical to the embodiments 1 to 14.

Embodiment 16

Recording/Reproducing Method

Figure 43:
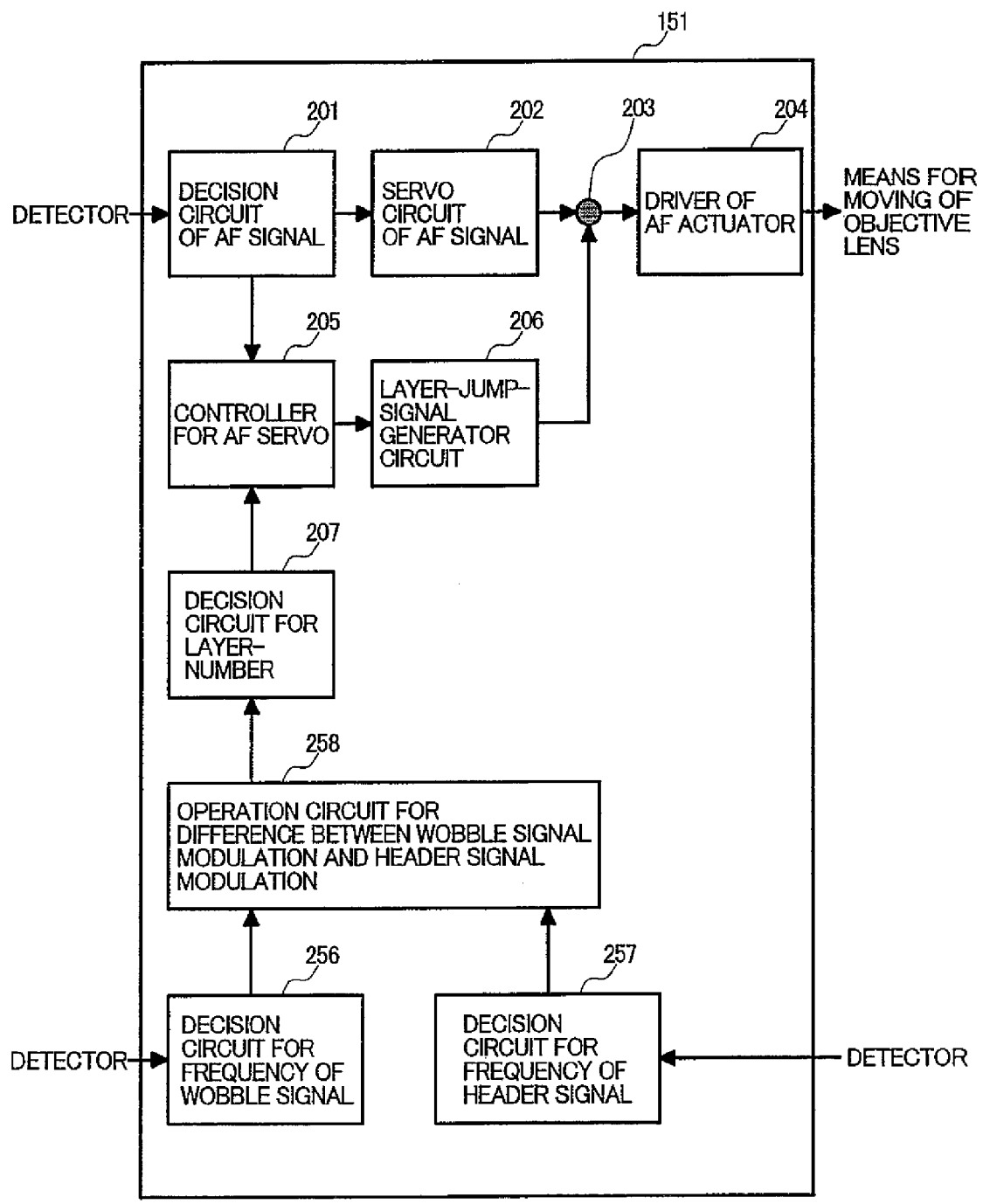
FIG. 43 is a detailed diagram showing another example of the servo controller in the apparatus for recording/reproducing an information recording medium according to the present invention.

Instead of the frequency of a wobble signal in the embodiment 15 a difference between the frequency of a wobble signal and the frequency of reproduced signals at pit areas may be measured for the sake of layer judgment. FIG. 43 shows a detailed view of the servo controller for this case.

The servo controller 151 includes a decision circuit 201 of auto focus (AF) signal. An AF error signal detected therein is sent to a servo circuit 202 of AF signal so that a signal is transmitted to a driver 204 of AF actuator through a switch 203. Meanwhile, the AF error signal is transmitted to a controller 205 for AF servo, informing of focusing on a layer (information plane). A wobble signal coming into focus is measured for frequency (Fw) by a decision circuit 256 for the frequency of a wobble signal. Reproduced signals at pit areas coming into focus are measured for frequency by a decision circuit 257 for the frequency (Fp) of pit signals. The frequency difference F between the wobble signal and the reproduced signals at pit areas (F=Fw×z−Fp, where Z is an integer not smaller than 1) is calculated by an operation circuit 258 for the difference between wobble signal frequency and pit signal frequency. The calculation is transmitted to a decision circuit 207 for layer-number, so that the layer number of the layer in focus is determined and transmitted to the controller 205. Here, if a proper layer is in focus, no layer jump is required. In the case of an improper layer, a signal for making a jump to the proper layer is generated by a layer-jump-signal generator circuit 206. The signal is transmitted through the switches 203 to the driver 204 for layer jump. These steps are repeated until the proper layer comes into focus.

It can be seen that when the medium having layers that differ from each other in the frequency difference F between a wobble signal and reproduced signals at pit areas is measured for the frequency of a wobble signal (Fw) by the decision circuit 256 and for the frequency of reproduced signals at pit areas (Fp) y the decision circuit 257 before the frequency difference F between the wobble signal and the reproduced signals at pit areas (F=Fw×z–Fp, where Z is an integer not smaller than 1) is determined by the operation circuit 258 and used in a layer judgment, the layer number can be determined and the proper layer can be accessed and recorded with reliability. Besides, there is the advantage that recording access time is extremely short even when compared with a method of making a layer judgment by reading information from the pit areas of the substrate after tracking.

It is also apparent that when the medium having layers that differ from each other in the frequency difference F between a wobble signal and reproduced signals at pit areas is measured for the frequency of a wobble signal (Fw) by the decision circuit 256 and for the frequency of reproduced signals at pit areas (Fp) by the decision circuit 257 before the frequency difference F between the wobble signal and the reproduced signals at pit areas (F=Fw×z–Fp, where Z is an integer not smaller than 1) is determined by the operation circuit 258 and used in a layer judgment, the layer number can be determined and the proper layer can be accessed and reproduced with reliability. Besides, there is the advantage that reproducing access time is extremely short even when compared with a method of making a layer judgment by reading information from the pit areas of the substrate after tracking.

Layers farther from the light incident side are under higher effects of the layers on the light incident side, and have greater noise in their wobble signals. It was thus preferable that the wobble signals and the pit-area reproduced signals of the first through N-th layers (information planes) had frequency differences F as shown in the expression below, or such that layers farther from the light incident side had greater frequency differences F.

layer 1<layer 2< ... <layer N–1<layer N (N is an integer greater than or equal to 2)

With respect to the frequency difference between the wobble signal and the pit-area reproduced signals of L0, 5% or greater deviations in frequency difference F favorably eliminated decision errors. Deviations of 10% or greater yet preferably offered resistance to environmental changes. The above-mentioned z preferably ranged between 50 and 200 to facilitate the judgment of the calculation of frequency difference F.

(Characteristics of Information Recording Medium)

The medium having layers that differ from each other in the frequency difference F between a wobble signal and reproduced signals at pit areas can be fabricated by changing the shapes of the asperities which are made of continuous or partially-continuous grooves formed in the recording tracks on the information planes. In the case of a double-layered medium, for example, L0 and L1 are formed with the asperities having different periods of wobble signals of 10 μm and 11 μm, respectively, with a constant pit period. Given that z is 100 and a pit frequency is 15 MHz, L0 has a frequency difference F0 of 5 MHz between its wobble signal and reproduced signals at pit areas, and L1 has a different frequency difference F of 4.1 MHz between its wobble signal and reproduced signals at pit areas. This difference allows a layer judgment.

Layers farther from the light incident side are under higher effects of the layers on the light incident side, and have greater noise in their wobble signals. It was thus preferable that the wobble signals of the grooves of the asperities and the pit-area reproduced signals of the first through N-th layers (information planes) had frequency differences F as shown in the expression below, or such that layers farther from the light incident side had greater frequency differences F between the wobble signals of the grooves of the asperities and the reproduced signals at pit areas.

layer 1<layer 2< ... <layer N–1<layer N (N is an integer greater than or equal to 2)

With respect to the frequency difference between the wobble signal of the grooves of the asperities and the pit-area reproduced signals of L0, 5% or greater deviations in frequency difference favorably eliminated decision errors. Deviations of 10% or greater yet preferably offered resistance to environmental changes.

The same effects were obtained by changing the shapes of pits instead of the periods of wobble signals of the grooves constituting the asperities. In the case of a double-layered medium, for example, pits are formed in different shapes while the grooves of the asperities are kept at a constant width of 0.38 μm and a constant period of wobble signal of 10 μm. Assuming that L0 has a pit period of 0.60 μm and L1 a pit period of 0.52 μm, L0 and L1 have different frequency differences F of 5.0 MHz and 6.0 MHz, respectively, between the wobble signals and reproduced signals at pit areas at Z=100. This difference allows a layer judgment. A pit period refers to the duration from the beginning of a first pit to the beginning of the next pit.

Layers farther from the light incident side are under higher effects of the layers on the light incident side, and have greater noise in their wobble signals. It was thus preferable that the first through N-th layers (information planes) had pit periods as shown in the expression below, or such that layers farther from the light incident side had smaller pit periods.

layer 1>layer 2> ... >layer N–1>layer N (N is an integer greater than or equal to 2)

With respect to the frequency difference between the wobble signal of the grooves of the asperities and the pit-area reproduced signals of L0, 5% or greater deviations in frequency difference F favorably eliminated decision errors. Deviations of 10% or greater yet preferably offered resistance to environmental changes.

The frequency differences F between wobble signals and reproduced signals at pit areas may also be changed by modifying both the frequencies of wobble signals of the asperity grooves and the frequencies of the pit-area signals. With respect to the frequency difference F of L0, 5% or greater deviations in frequency difference favorably eliminated decision errors. Deviations of 10% or greater yet preferably offered resistance to environmental changes.

Aside from the frequency differences F between wobble signals and reproduced signals at pit areas, the operation circuit 258 for the difference between wobble signal frequency and pit signal frequency may be replaced with an operation circuit for the sum of wobble signal frequency and pit signal frequency for the sake of layer judgment. For the plurality of frequencies, at least either of the frequencies of a wobble signal or reproduced signals at pit areas can be used in combination with the sum or difference thereof.

Note that the differences F or sums of the frequencies of wobble signals and reproduced signals at pit areas remain constant even if the layers have different reflectivities, or when reflectivities vary within respective layers. Accordingly, even in the case of a disk with greater variations in reflectivity or for situations where the reflectivities change, an accurate layer judgment can be made for favorable recording/reproduction.

In respects other than those described above, the present embodiment is identical to the embodiments 1 to 15.

Embodiment 17

Recording/Reproducing Method

Figure 44:
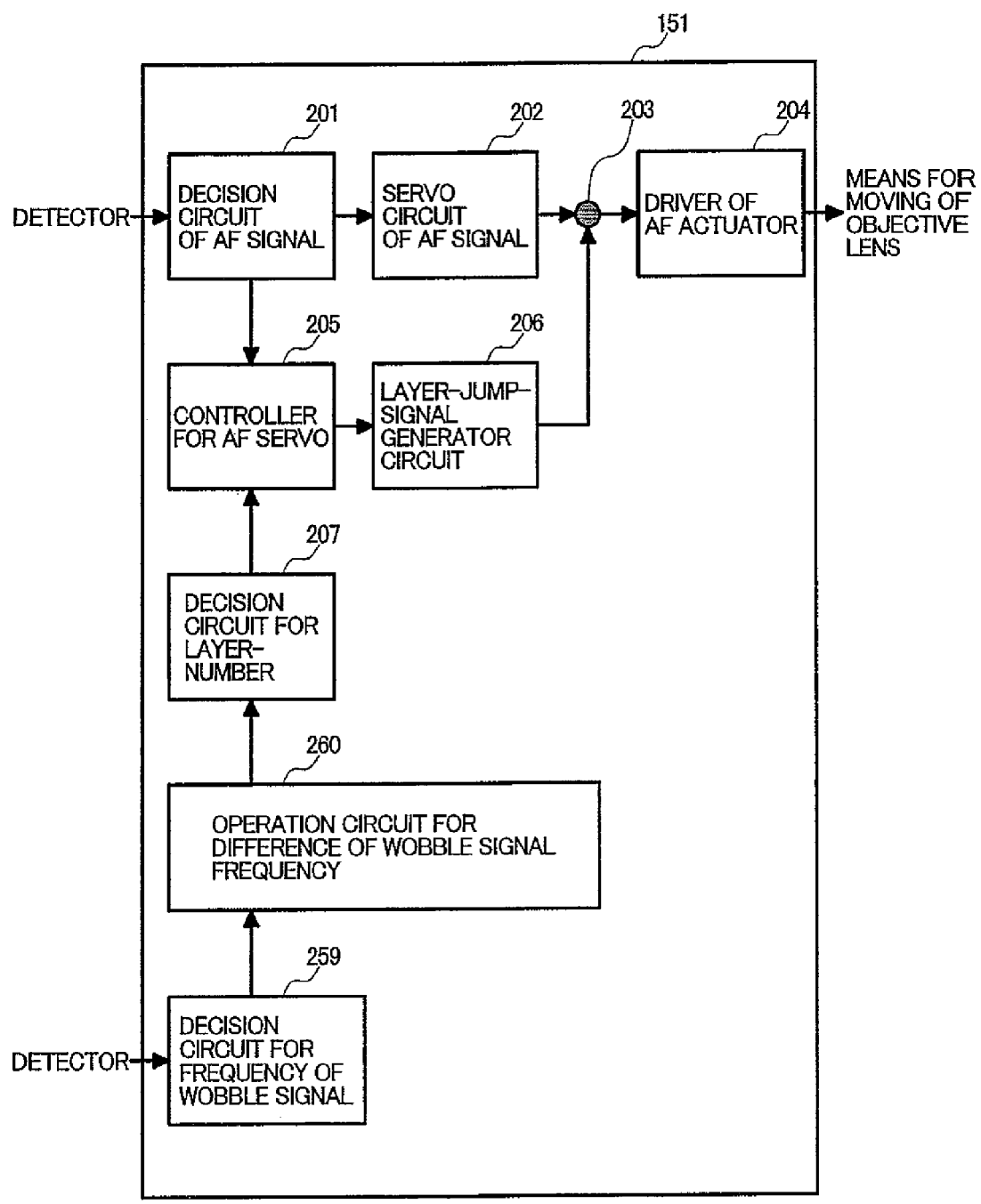
FIG. 44 is a detailed diagram showing another example of the servo controller in the apparatus for recording/reproducing an information recording medium according to the present invention.

Instead of the frequency of a wobble signal in the embodiment 15, a difference between the frequencies of a plurality of wobble signals may be measured for the sake of layer judgment. FIG. 44 shows a detailed view of the servo controller for this case.

The servo controller 151 includes a decision circuit 201 of auto focus (AF) signal. An AF error signal detected therein is sent to a servo circuit 202 of AF signal so that a signal is transmitted to a driver 204 of AF actuator through a switch 203. Meanwhile, the AF error signal is transmitted to a controller 205 for AF servo, informing of focusing on a layer (information plane). Wobble signals coming into focus are measured for frequency (Gp, Gs) by a decision circuit 259 for the frequency of a wobble signal. The difference G between the frequencies of the wobble signals (G=Gp−Gs) is calculated by an operation circuit 260 for the difference of wobble signal frequencies. The calculation is transmitted to a decision circuit 207 for layer-number. The layer number of the layer in focus is determined and transmitted to a controller 205 for AF servo. Here, if a proper layer is in focus, no layer jump is required. In the case of an improper layer, a signal for making a jump to the proper layer is generated by a layer-jump-signal generator circuit 206. The signal is transmitted through the switches 203 to the driver 204 for layer jump. These steps are repeated until the proper layer comes into focus.

It can be seen that when the medium including layers each having a plurality of frequencies of wobble signals, the difference G between the frequencies of the wobble signals (G=Gp−Gs) varying from one layer to another, is measured for the frequencies (Gp, Gs) of the wobble signals by the decision circuit 259 before the difference G between the frequencies of the wobble signals (G=Gp−Gs) is calculated by the operation circuit 260 and used in a layer judgment, the layer number can be determined and the proper layer can be accessed and recorded with reliability. Besides, there is the advantage that recording access time is extremely short even when compared with a method of making a layer judgment by reading information from the pit areas of the substrate after tracking.

It is also apparent that when the medium including layers each having a plurality of frequencies of wobble signals, the difference G between the frequencies of the wobble signals (G=Gp−Gs) varying from one layer to another, is measured for the frequencies (Gp, Gs) of the wobble signals by the decision circuit 259 before the difference G between the frequencies of the wobble signals (G=Gp−Gs) is calculated by the operation circuit 260 and used in a layer judgment, the layer number can be determined and the proper layer can be accessed and reproduced with reliability. Besides, there is the advantage that reproducing access time is extremely short even when compared with a method of making a layer judgment by reading information from the pit areas of the substrate after tracking.

Figure 45:
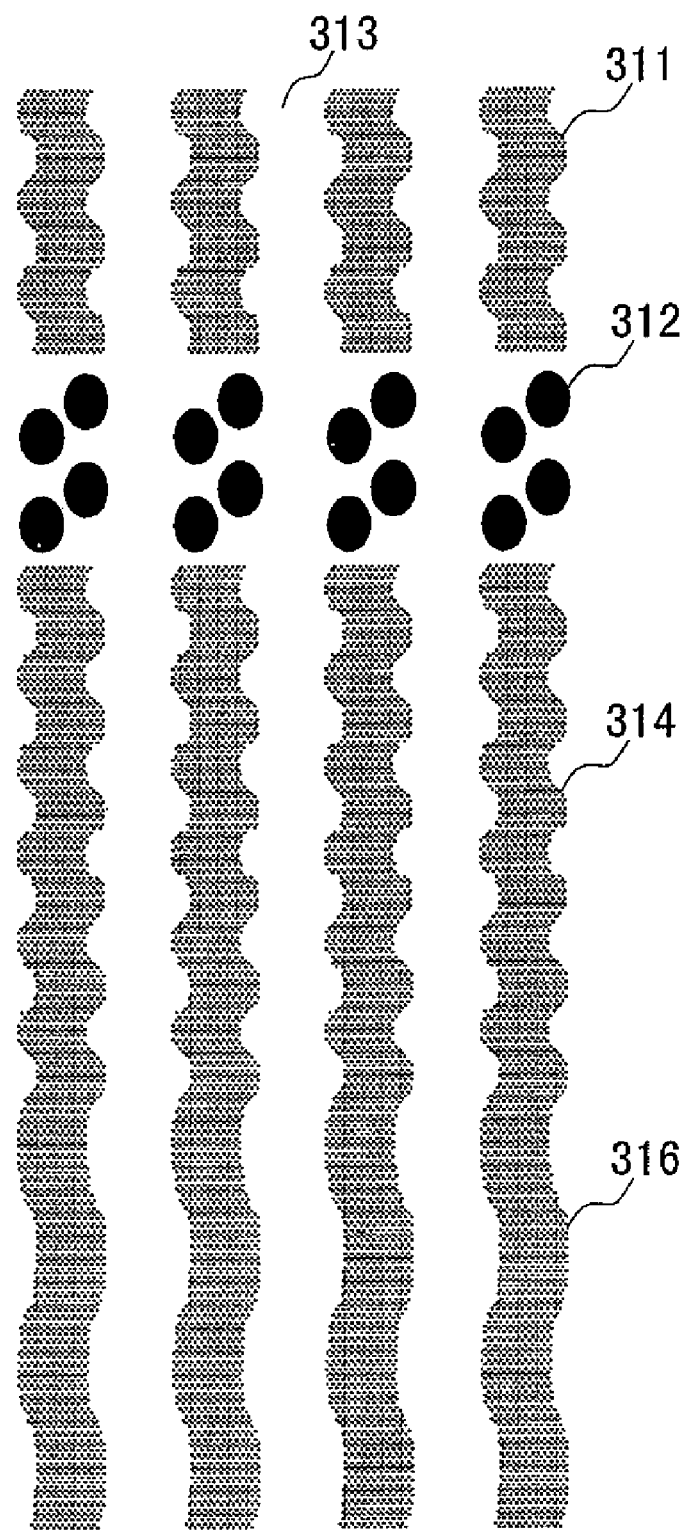
FIG. 45 is a schematic explanatory diagram showing asperities with different frequencies of wobbles on the information recording medium according to the present invention.

FIG. 45 shows an example of wobble in a medium having a plurality of frequencies of wobble signals. Groove portions 311 have short-period wobble 314 and long-period wobble 316.

Layers farther from the light incident side are under higher effects of the layers on the light incident side, and have greater noise in their wobble signals. It was thus preferable that the wobble signals of the first through N-th layers (information planes) had frequency differences G as shown in the expression below, or such that layers farther from the light incident side had greater frequency differences G.

layer 1<layer 2< . . . <layer N−1<layer N (N is an integer greater than or equal to 2)

With respect to the frequency difference G between the wobble signals of L0, 5% or greater deviations in frequency difference favorably eliminated decision errors. Deviations of 10% or greater yet preferably offered resistance to environmental changes.

Aside from the difference G between the frequencies of wobble signals, the sum G' of the frequencies of wobble signals (G'=Gp+Gs) may be used. The difference and/or sum of the frequencies of three or more wobble signals may also be used in combination. Here, either one of Gp and Gs was preferably kept constant across the layers, for the wobble signal could be used as a synchronizing signal.

(Characteristics of Information Recording Medium)

The medium having layers with different frequency differences G of wobble signals can be fabricated by changing the shapes of the asperities which are made of continuous or partially-continuous grooves formed in the recording tracks on the information planes. In the case of a double-layered medium, for example, L0 has periods of wobble signals of 32.76 μm and 32.24 μm, and L1 has periods of wobble signals of 32.76 μm and 31.20 μm. This establishes a difference between the frequency differences G of wobble signals of L1 and L0. The layers can be judged based on this difference.

Layers farther from the light incident side are under higher effects of the layers on the light incident side, and have greater noise in their wobble signals. It was thus preferable that the wobble signals of the first through N-th layers (information planes) had frequency differences G as shown in the expression below, or such that layers farther from the light incident side had greater differences G between the frequencies of wobble signals.

layer 1<layer 2< . . . <layer N−1<layer N (N is an integer greater than or equal to 2)

With respect to the frequency difference G between the wobble signals from the asperities of L0, 5% or greater deviations in frequency difference favorably eliminated decision errors. Deviations of 10% or greater yet preferably offered resistance to environmental changes.

Aside from the frequency difference G of the wobble signals, the operation circuit 260 for the difference of wobble signal frequencies may be replaced with an operation circuit for the sum of wobble signal frequencies so that the sum G' of the frequencies of the wobble signals (G'=Gp+Gs) is measured for the sake of layer judgment. The sum and difference of three or more wobble signal frequencies may be used in combination.

Layers farther from the light incident side are under higher effects of the layers on the light incident side, and have greater noise in their wobble signals. It was thus preferable that the wobble signals of the first through N-th layers (information planes) had frequency sums G' as shown in the expression below, or such that layers farther from the light incident side had smaller sums G' of the frequencies of the wobble signals from the asperities.

layer 1>layer 2> ... >layer N−1>layer N (N is an integer greater than or equal to 2)

With respect to the sum G' of the frequencies of the wobble signals from the asperities of L0, 5% or greater differences in the sum of frequencies favorably eliminated decision errors. Differences of 10% or greater yet preferably offered resistance to environmental changes.

Note that the differences G and sums G' of the frequencies of wobble signals remain constant even if the layers have different reflectivities, or when reflectivities vary within respective layers. Accordingly, even in the case of a disk with greater variations in reflectivity or for situations where the reflectivities change, an accurate layer judgment can be made for favorable recording/reproduction.

In respects other than those described above, the present embodiment is identical to the embodiments 1 to 16.

Embodiment 18

Figure 46:
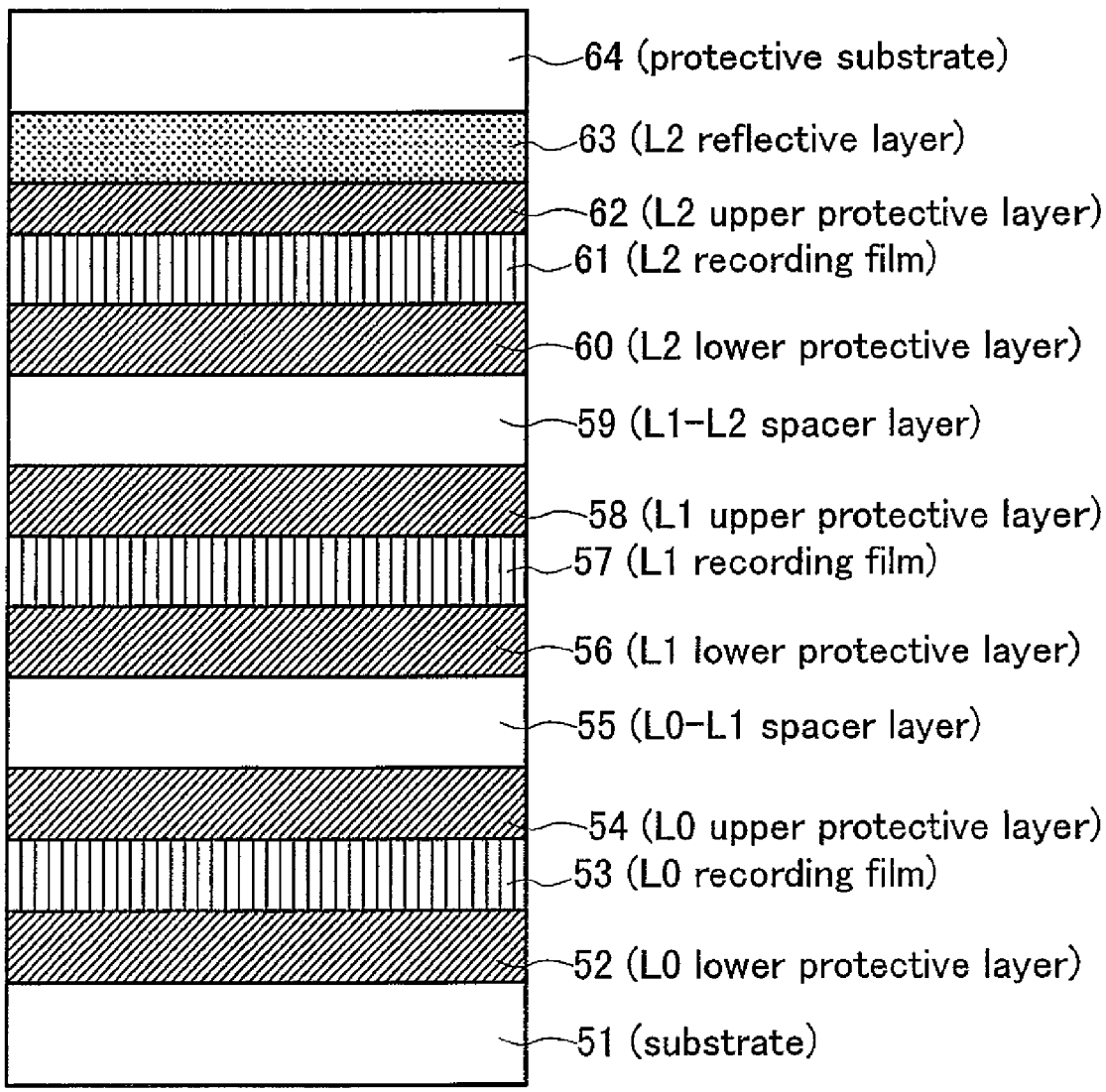
FIG. 46 is a schematic diagram showing the sectional structure of a multilayer disklike information recording medium according to the present invention.

Composition and Fabrication Method 2 for Information Recording Medium of Present Invention FIG. 46 is a schematic diagram showing the cross-sectional structure of another example of the multilayer disklike information recording medium according to the present invention. Media having three or more layers were fabricated in this way. Here, a three-layered medium is shown as an example.

Initially, an L2 reflective layer 63, an L2 upper protective layer 62, an L2 recording film 61, and an L2 lower protective layer 60 were successively formed on a 12-cm-diameter 0.6-mm-thick polycarbonate protective substrate 64 which has tracking grooves in its surface. The L2 reflective layer 63 consisted of an $Ag_{98}Pd_1Cu_1$ film of approximately 80 nm in thickness. The L2 upper protective layer 62 consisted of a $(ZnS)_{80}(SiO_2)_{20}$ film of approximately 80 nm in thickness, laminated with a $Cr_2O_3$ film of approximately 5 nm in thickness. The L2 recording film 61 was made of $Ge_5Sb_2Te_8$ in a thickness of approximately 18 nm. The L2 lower protective layer 60 consisted of a $Cr_{40}O_{57}N_3$ film of approximately 5 nm in thickness, laminated with a $(ZnS)_{80}(SiO_2)_{20}$ film of approximately 80 nm in thickness.

Subsequently, an L1-L2 spacer layer 59 having tracking grooves in its surface was formed by a photopolymerization method (2P method) of transferring tracking grooves from a stamper by using ultraviolet light curing resin. L1 was formed thereon. More specifically, an L1 upper protective layer 58, an L1 recording film 57, and an L1 lower protective layer 56 were successively formed on the L1-L2 spacer layer 59. The L1 upper protective layer 58 consisted of a $(ZnS)_{80}(SiO_2)_{20}$ film of approximately 100 nm in thickness, laminated with a $Cr_2O_3$ film of approximately 5 nm in thickness. The L1 recording film 57 was made of $Ge_5Sb_2Te_8$ in a thickness of 5 nm. The L1 lower protective layer 56 consisted of a $Cr_{40}O_{57}N_3$ film of approximately 5 nm in thickness, laminated with a $(ZnS)_{80}(SiO_2)_{20}$ film of approximately 95 nm in thickness.

Next, an L0-L1 spacer layer 59 was formed by the same 2P method as mentioned above. An L0 upper protective layer 54, an L0 recording film 53, and an L0 lower protective layer 52 were successively formed on the L0-L1 spacer layer 55. The L0 upper protective layer 54 consisted of a $(ZnS)_{80}(SiO_2)_{20}$ film of approximately 100 nm in thickness, laminated with a $Cr_2O_3$ film of approximately 5 nm in thickness. The L0 recording film 53 was made of $Ge_5Sb_2Te_8$ in a thickness of 5 nm. The L0 lower protective layer 52 consisted of a $Cr_{40}O_{57}N_3$ film of approximately 5 nm in thickness, laminated with a $(ZnS)_{80}(SiO_2)_{20}$ film of approximately 95 nm in thickness. Finally, a substrate 51 was bonded thereto. The laminated films were formed in a magnetron sputtering system. Thereby, a multilayer disk member was obtained.

The initialization and the recording/reproducing method are the same as those of the double-layered medium. This permits recording/reproduction of three or more layers on one side. As for recording/reproducing characteristics, ingredients, and the like, the layer farthest from the light incident side, i.e. L2 in the case of a three-layered medium and Ln−1 in the case of an n-layered medium, was identical to L1 of the double-layered medium. Other layers, i.e. L0 and L1 in the case of a three-layered medium and L0 through Ln−2 in the case of an n-layered medium, were identical to L0 of the double-layered medium.

In respects other than those described above, the present embodiment is identical to the embodiments 1 to 16.

The methods for recording/reproducing information described in the embodiments 1-16 are effective when used by themselves, whereas they are preferably used in combination for improved reliability. Moreover, optical disks having layers of information planes having materials, thicknesses, and laminating order other than those described in the embodiments above, such as a multilayer information recording medium having phase-change recording films, a multilayer information recording medium having dyes in its recording films, a multilayer information recording medium having ROM information, and combinations thereof, were favorably improved in the reliability of information plane detection and/or in the speed of the detection, allowing faster and surer recording/reproduction.

As has been described, according to the present invention, optical disks having layers of information planes can be improved in the reliability of information plane detection and/or in the speed of the detection, allowing faster and surer recording/reproduction.

While there has been described what are at present considered to be preferred embodiments of the present invention, it will be understood that various modifications may be made thereto, and it is intended that the appended claims cover all such modifications as fall within the true spirit and scope of the invention.

A method for recording information, A method for reproducing information, An apparatus for recording information, An apparatus for reproducing information according to the present invention are as follows:

(1) A method for recording information by irradiating with light a recording track on an information recording medium having a plurality of layers to be irradiated with light for information recording, the method comprising the step of identifying a layer to record information on by the modulation of a tracking error signal generated in tracking said recording track.

(2) A method for recording information by irradiating with light a recording track on an information recording medium having a plurality of layers to be irradiated with light for information recording, the method comprising the step of identifying a layer to record information on by the sum levels of signals reproduced from said layers.

(3) A method for recording information by irradiating with light a recording track on an information recording medium having a plurality of layers to be irradiated with light for information recording, said layers being divided into respective predetermined numbers of sectors, the method comprising the step of identifying a layer to record information on by the time between the detection of one sector and the detection of the next sector.

(4) A method for recording information by irradiating with light a recording track on an information recording medium having a plurality of layers to be irradiated with light for information recording, said layers being divided into respective predetermined numbers of sectors, the method comprising the step of identifying a layer to record information on by the number of sectors detected within a predetermined time.

(5) A method for recording information by irradiating with light a recording track on an information recording medium having a plurality of layers to be irradiated with light for information recording, the method comprising the step of identifying a layer to record information on by the modulations of reproduced signals from said layers.

(6) A method for recording information by irradiating with light a recording track on an information recording medium having a plurality of layers to be irradiated with light for information recording, said plurality of layers being divided into respective predetermined numbers of sectors, said sectors each having at least a pit area and a data area, the method comprising the step of identifying a layer to record information on by the ratio between the modulations of reproduced signals at said pit area and said data area.

(7) A method for recording information by irradiating with light a recording track on an information recording medium having a plurality of layers to be irradiated with light for information recording, said layers having recording tracks with asperities made of continuous or discontinuous grooves, said asperities being meandered or deformed at predetermined modulations in the longitudinal directions of said grooves, the method comprising the step of identifying a layer to record information on by the modulation of signals resulting from the meandering or deformation.

(8) A method for recording information by irradiating with light a recording track on an information recording medium having a plurality of layers to be irradiated with light for information recording, said layers having recording tracks with asperities made of continuous or discontinuous grooves, said asperities being meandered or deformed in the longitudinal directions of said grooves at periods predetermined layer by layer, the method comprising the step of identifying a layer to record information on by the frequency of signals resulting from the meandering or deformation.

(9) A method for reproducing information by irradiating with light a recording track on an information recording medium having a plurality of layers to be irradiated with light for information reproduction, the method comprising the step of identifying a layer to reproduce information from by the modulation of a tracking error signal generated in tracking said recording track.

(10) A method for reproducing information by irradiating with light a recording track on an information recording medium having a plurality of layers to be irradiated with light for information reproduction, the method comprising the step of identifying a layer to reproduce information from by the sum levels of signals reproduced from said layers.

(11) A method for reproducing information by irradiating with light a recording track on an information recording medium having a plurality of layers to be irradiated with light for information reproduction, said layers being divided into respective predetermined numbers of sectors, the method including the step of identifying a layer to reproduce information from by the time between the detection of one sector and the detection of the next sector.

(12) A method for reproducing information by irradiating with light a recording track on an information recording medium having a plurality of layers to be irradiated with light for information reproduction, said layers being divided into respective predetermined numbers of sectors, the method comprising the step of identifying a layer to reproduce information from by the number of sectors detected within a predetermined time.

(13) A method for reproducing information by irradiating with light a recording track on an information recording medium having a plurality of layers to be irradiated with light for information reproduction, the method comprising the step of identifying a layer to reproduce information from by the modulations of reproduced signals from said layers.

(14) A method for reproducing information by irradiating with light a recording track on an information recording medium having a plurality of layers to be irradiated with light for information reproduction, said plurality of layers being divided into respective predetermined numbers of sectors, said sectors each having at least a pit area and a data area, the method comprising the step of identifying a layer to reproduce information from by the ratio between the modulations of reproduced signals at said pit area and said data area.

(15) A method for reproducing information by irradiating with light a recording track on an information recording medium having a plurality of layers to be irradiated with light for information reproduction, said layers having recording tracks with asperities made of continuous or discontinuous grooves, said asperities being meandered or deformed in the longitudinal directions of said grooves at modulations predetermined layer by layer, the method comprising the step of identifying a layer to reproduce information from by the modulation of signals resulting from the meandering or deformation.

(16) A method for reproducing information by irradiating with light a recording track on an information recording medium having a plurality of layers to be irradiated with light for information reproduction, said layers having recording tracks with asperities made of continuous or discontinuous grooves, said asperities being meandered or deformed in the longitudinal directions of said grooves at periods predetermined layer by layer, the method comprising the step of identifying a layer to reproduce information from by the frequency of signals resulting from the meandering or deformation.

(17) An apparatus for recording information for recording information by irradiating with light a recording track on an information recording medium having a plurality of layers to be irradiated with light for information recording, the apparatus comprising: light irradiation means for irradiating said information recording medium with light; light detecting means for detecting light reflected from said information recording medium; tracking error signal modulation detecting means for detecting the modulation of a tracking error signal for tracking said recording track by using a detection signal from said light detection means; and layer judging means for judging a layer under tracking based on the modulation detected by said tracking error signal modulation detecting means.

(18) An apparatus for recording information for recording information by irradiating with light a recording track on an information recording medium having a plurality of layers to be irradiated with light for information recording, the apparatus comprising: light irradiation means for irradiating said information recording medium with light; light detecting means for detecting light reflected from said information recording medium; and layer judging means for judging a layer based on the sum level of light detected by said light detecting means.

(19) An apparatus for recording information for recording information by irradiating with light a recording track on an information recording medium having a plurality of layers to be irradiated with light for information recording, said layers of said information recording medium being divided into respective predetermined numbers of sectors, the apparatus comprising: light irradiation means for irradiating said information recording medium with light; light detecting means for detecting light reflected from said information recording medium; time measuring means for measuring the time between the detection of one sector and the detection of the next sector by using a detection signal from said light detecting means; and layer judging means for judging a layer based on the time detected by said time detecting means.

(20) An apparatus for recording information for recording information by irradiating with light a recording track on an information recording medium having a plurality of layers to be irradiated with light for information recording, said layers of said information recording medium being divided into respective predetermined numbers of sectors, the apparatus comprising: light irradiation means for irradiating said information recording medium with light; light detecting means for detecting light reflected from said information recording medium; sector number detecting means for detecting the number of sectors detected within a predetermined time by using a detection signal from said light detecting means; and layer judging means for judging a layer based on the number of sectors detected by said sector number detecting means.

(21) An apparatus for recording information for recording information by irradiating with light a recording track on an information recording medium having a plurality of layers to be irradiated with light for information recording, the apparatus comprising: light irradiation means for irradiating said information recording medium with light; light detecting means for detecting light reflected from said information recording medium; signal modulation detecting means for detecting the modulation of a reproduced signal detected by said light detecting means; and layer judging means for judging a layer based on the modulation detected by said signal modulation detecting means.

(22) An apparatus for recording information for recording information by irradiating with light a recording track on an information recording medium having a plurality of layers to be irradiated with light for information recording, said layers of said information recording medium being divided into predetermined numbers of sectors, said sectors each having at least a pit area and a data area, the apparatus comprising: light irradiation means for irradiating said information recording medium with light; light detecting means for detecting light reflected from said information recording medium;
signal modulation ratio detecting means for detecting the ratio between the modulations of reproduced signals at said pit area and said data area by using a detection signal from said light detecting means; and layer judging means for judging a layer based on the value of the ratio detected by said signal modulation ratio detecting means.

(23) An apparatus for recording information for recording information by irradiating with light a recording track on an information recording medium having a plurality of layers to be irradiated with light for information recording, said layers having recording tracks with asperities made of continuous or discontinuous grooves, said asperities being meandered or deformed in the longitudinal directions of said grooves at modulations predetermined layer by layer, the apparatus comprising: light irradiation means for irradiating said information recording medium with light; light detecting means for detecting light reflected from said information recording medium; wobble modulation detecting means for detecting a wobble modulation out of a detection signal from said light detecting means; and layer judging means for judging a layer based on the wobble modulation detected by said wobble modulation detecting means.

(24) An apparatus for recording information for recording information by irradiating with light a recording track on an information recording medium having a plurality of layers to be irradiated with light for information recording, said layers having recording tracks with asperities made of continuous or discontinuous grooves, said asperities being meandered or deformed in the longitudinal directions of said grooves at periods predetermined layer by layer, the apparatus comprising: light irradiation means for irradiating said information recording medium with light; light detecting means for detecting light reflected from said information recording medium; wobble frequency detecting means for detecting a wobble frequency out of a detection signal from said light detecting means; and layer judging means for judging a layer based on the wobble frequency detected by said wobble frequency detecting means.

(25) An apparatus for reproducing information for reproducing information by irradiating with light a recording track on an information recording medium having a plurality of layers to be irradiated with light for information reproduction, the apparatus comprising: light irradiation means for irradiating said information recording medium with light; light detecting means for detecting light reflected from said information recording medium; tracking error signal modulation detecting means for detecting the modulation of a tracking error signal for tracking said recording track by using a detection signal from said light detection means; and layer judging means for judging a layer under tracking based on the modulation detected by said tracking error signal modulation detecting means.

(26) An apparatus for reproducing information for reproducing information by irradiating with light a recording track on an information recording medium having a plurality of layers to be irradiated with light for information reproduction, the apparatus comprising: light irradiation means for irradiating said information recording medium with light; light detecting means for detecting light reflected from said information recording medium; and layer judging means for judging a layer based on the sum level of light detected by said light detecting means.

(27) An apparatus for reproducing information for reproducing information by irradiating with light a recording track on an information recording medium having a plurality of layers to be irradiated with light for information reproduction, said layers of said information recording medium being divided into respective predetermined numbers of sectors, the apparatus comprising: light irradiation means for irradiating said information recording medium with light; light detecting means for detecting light reflected from said information recording medium; time measuring means for measuring the time between the detection of one sector and the detection of the next sector by using a detection signal from said light detecting means; and layer judging means for judging a layer based on the time detected by said time detecting means.

(28) An apparatus for reproducing information for reproducing information by irradiating with light a recording track on an information recording medium having a plurality of layers to be irradiated with light for information reproduction, said layers of said information recording medium being divided into respective predetermined numbers of sectors, the apparatus comprising: light irradiation means for irradiating said information recording medium with light; light detecting means for detecting light reflected from said information recording medium; sector number detecting means for detecting the number of sectors detected within a predetermined time by using a detection signal from said light detecting means; and layer judging means for judging a layer based on the number of sectors detected by said sector number detecting means.

(29) An apparatus for reproducing information for reproducing information by irradiating with light a recording track on an information recording medium having a plurality of layers to be irradiated with light for information reproduction, the apparatus comprising: light irradiation means for irradiating said information recording medium with light; light detecting means for detecting light reflected from said information recording medium; signal modulation detecting means for detecting the modulation of a reproduced signal detected by said light detecting means; and layer judging means for judging a layer based on the modulation detected by said signal modulation detecting means.

(30) An apparatus for reproducing information for reproducing information by irradiating with light a recording track on an information recording medium having a plurality of layers to be irradiated with light for information reproduction, said layers of said information recording medium being divided into predetermined numbers of sectors, said sectors each having at least a pit area and a data area, the apparatus comprising: light irradiation means for irradiating said information recording medium with light; light detecting means for detecting light reflected from said information recording medium; signal modulation ratio detecting means for detecting the ratio between reproduced signal modulations between said pit area and said data area by using a detection signal from said light detecting means; and layer judging means for judging a layer based on the value of the ratio detected by said signal modulation ratio detecting means.

(31) An apparatus for reproducing information for reproducing information by irradiating with light a recording track on an information recording medium having a plurality of layers to be irradiated with light for information reproduction, said layers having recording tracks with asperities made of continuous or discontinuous grooves, said asperities being meandered or deformed in the longitudinal directions of said grooves at modulations predetermined layer by layer, the apparatus comprising: light irradiation means for irradiating said information recording medium with light; light detecting means for detecting light reflected from said information recording medium; wobble modulation detecting means for detecting a wobble modulation out of a detection signal from said light detecting means; and layer judging means for judging a layer based on the wobble modulation detected by said wobble modulation detecting means.

(32) An apparatus for reproducing information for reproducing information by irradiating with light a recording track on an information recording medium having a plurality of layers to be irradiated with light for information reproduction, said layers having recording tracks with asperities made of continuous or discontinuous grooves, said asperities being meandered or deformed in the longitudinal directions of said grooves at periods predetermined layer by layer, the apparatus comprising: light irradiation means for irradiating said information recording medium with light; light detecting means for detecting light reflected from said information recording medium; wobble frequency detecting means for detecting a wobble frequency out of a detection signal from said light detecting means; and layer judging means for judging a layer based on the wobble frequency detected by said wobble frequency detecting means.

What is claimed is:

1. An information recording medium comprising:
   a plurality of layers for recording or reproduction of information by irradiation of light; and
   information for identifying a tracking error signal for determining a layer number being recorded in each of the plurality of layers;
   wherein a modulation of the tracking error signal is different in each of the plurality of layers.

2. An information recording medium according to claim 1, wherein a sum level of a reproduced signal is different in dependence on the layer from which the reproduced signal is reproduced.

3. An information recording medium according to claim 1, further comprising:
   a recording track formed in the layer; and
   a plurality of information blocks formed in the recording track;
   wherein a number of the information blocks is different in dependence on the layer.

4. An information recording medium according to claim 1, wherein a length of a mirror area of a layer is different in dependence on the layer.

* * * * *